US012516556B2

(12) United States Patent
Ferri et al.

(10) Patent No.: US 12,516,556 B2
(45) Date of Patent: Jan. 6, 2026

(54) VEHICLE OUTSIDE DOOR HANDLE WITH RADAR MODULE AND THERMAL MANAGEMENT

(71) Applicant: Magna Electronics Inc., Auburn Hills, MI (US)

(72) Inventors: James J. Ferri, Maple (CA); Kurt M. Schatz, Uxbridge (CA); Kasper M. Pilested, Newmarket (CA); Samuel R. Baruco, Aurora (CA)

(73) Assignee: Magna Electronics Inc., Auburn Hills, MI (US)

( * ) Notice: Subject to any disclaimer, the term of this patent is extended or adjusted under 35 U.S.C. 154(b) by 513 days.

(21) Appl. No.: 17/597,626

(22) PCT Filed: Jul. 14, 2020

(86) PCT No.: PCT/CA2020/050979
§ 371 (c)(1),
(2) Date: Jan. 14, 2022

(87) PCT Pub. No.: WO2021/007667
PCT Pub. Date: Jan. 21, 2021

(65) Prior Publication Data
US 2022/0349220 A1 Nov. 3, 2022

Related U.S. Application Data

(60) Provisional application No. 63/017,286, filed on Apr. 29, 2020, provisional application No. 63/000,004, (Continued)

(51) Int. Cl.
*E05B 81/76* (2014.01)
*G01S 7/02* (2006.01)
*G01S 13/87* (2006.01)

(52) U.S. Cl.
CPC .............. *E05B 81/77* (2013.01); *G01S 7/027* (2021.05); *G01S 13/87* (2013.01)

(58) Field of Classification Search
CPC .......... E05B 81/77; G01S 7/027; G01S 13/87
See application file for complete search history.

(56) References Cited

U.S. PATENT DOCUMENTS 5,497,305 A 3/1996 Pastrick et al.
5,671,996 A 9/1997 Bos et al.
(Continued)

FOREIGN PATENT DOCUMENTS

CN 108461915 A * 8/2018
DE 102014216353 A1 * 2/2015 ........... G01D 11/245
(Continued)

OTHER PUBLICATIONS

International Search Report and Written Opinion dated Oct. 8, 2020 for corresponding PCT Application No. PCT/CA2020/050979, filed Jul. 14, 2020.

*Primary Examiner* — Vladimir Magloire
(74) *Attorney, Agent, or Firm* — HONIGMAN LLP

(57) ABSTRACT

A vehicle exterior component, such as a handle assembly, a light module, a minor housing, or an applique holds a radar sensor. A stand-alone radar module for mounting within a vehicle exterior component comprises a module housing defining an interior space configured to hold a radar module including a heat source, and a sealing material extending between the radar module and the module housing for blocking moisture and other contaminants. Several different arrangements attaching a heat sink to a radar IC for dissipating heat from the radar IC are provided.

31 Claims, 51 Drawing Sheets

Related U.S. Application Data filed on Mar. 26, 2020, provisional application No. 62/913,328, filed on Oct. 10, 2019, provisional application No. 62/875,569, filed on Jul. 18, 2019.

(56) References Cited

U.S. PATENT DOCUMENTS

| | | |
|---|---|---|
| 5,938,321 A | 8/1999 | Bos et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,176,602 B1 | 1/2001 | Pastrick et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,583,988 B1 * | 6/2003 | Lyons ................ H05K 7/20854 165/185 |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,907,643 B2 | 6/2005 | Koops et al. |
| 6,919,549 B2 | 7/2005 | Bamji et al. |
| 6,977,619 B2 | 12/2005 | March et al. |
| 7,053,357 B2 | 5/2006 | Schwarte |
| 7,126,525 B2 | 10/2006 | Suzuki et al. |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,407,203 B2 | 8/2008 | Huizenga et al. |
| 7,408,627 B2 | 8/2008 | Bamji et al. |
| 8,013,780 B2 | 9/2011 | Lynam |
| 8,027,029 B2 | 9/2011 | Lu et al. |
| 8,333,492 B2 | 12/2012 | Dingman et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 9,036,026 B2 | 5/2015 | Dellantoni et al. |
| 9,146,898 B2 | 9/2015 | Ihlenburg et al. |
| 9,233,645 B2 * | 1/2016 | Schofield ............... B60K 35/28 |
| 9,290,970 B2 | 3/2016 | De Wind et al. |
| 9,484,626 B2 | 11/2016 | Dykhouse |
| 9,575,160 B1 | 2/2017 | Davis et al. |
| 9,599,702 B1 | 3/2017 | Bordes et al. |
| 9,647,325 B2 | 5/2017 | Geary et al. |
| 9,689,967 B1 | 6/2017 | Stark et al. |
| 9,753,121 B1 | 9/2017 | Davis et al. |
| 10,850,595 B2 | 12/2020 | Miu et al. |
| 11,542,732 B2 | 1/2023 | Schatz |
| 11,746,575 B2 | 9/2023 | Cervone et al. |
| 11,866,983 B2 | 1/2024 | Schatz et al. |
| 2006/0152406 A1 | 7/2006 | Leblanc et al. |
| 2010/0007463 A1 | 1/2010 | Dingman et al. |
| 2010/0088855 A1 | 4/2010 | Ruse et al. |
| 2010/0245066 A1 | 9/2010 | Sarioglu et al. |
| 2013/0242586 A1 | 9/2013 | Huizen et al. |
| 2017/0172020 A1 * | 6/2017 | Ye ........................ H05K 9/0084 |
| 2017/0222311 A1 | 8/2017 | Hess et al. |
| 2017/0254873 A1 | 9/2017 | Koravadi |
| 2017/0274778 A1 * | 9/2017 | van Boheemen ....... H01F 27/36 |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0106051 A1 | 4/2019 | Huizen et al. |
| 2019/0339382 A1 | 11/2019 | Hess et al. |
| 2020/0015357 A1 * | 1/2020 | Kim ........................ H01Q 1/22 |
| 2020/0102773 A1 | 4/2020 | Sobecki |
| 2020/0122631 A1 | 4/2020 | Huizen et al. |
| 2020/0130646 A1 | 4/2020 | Peterson |
| 2022/0187416 A1 | 6/2022 | Miu et al. |
| 2022/0282534 A1 | 9/2022 | Peterson et al. |

FOREIGN PATENT DOCUMENTS

| | | | |
|---|---|---|---|
| EP | 1411369 A1 | 4/2004 | |
| EP | 2458691 A1 * | 5/2012 | ......... H01R 13/5216 |
| EP | 3605032 A1 * | 2/2020 | ........... G01F 23/284 |
| WO | WO-2015101494 A1 * | 7/2015 | ........... H05K 1/0284 |

* cited by examiner

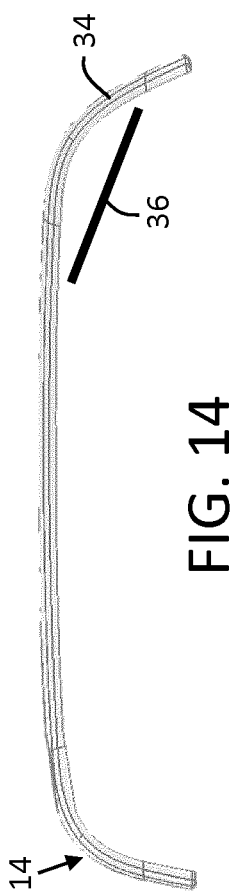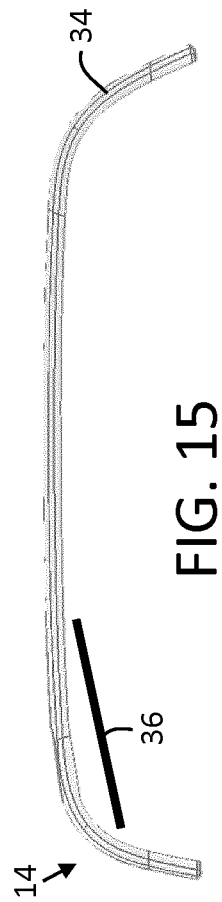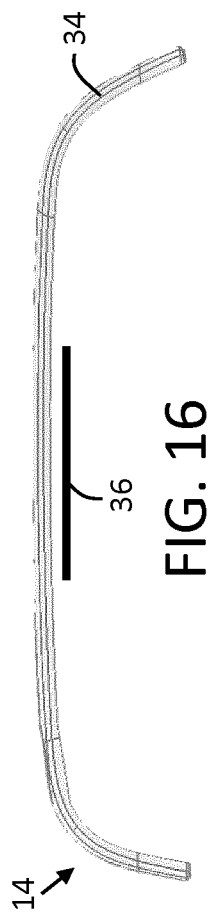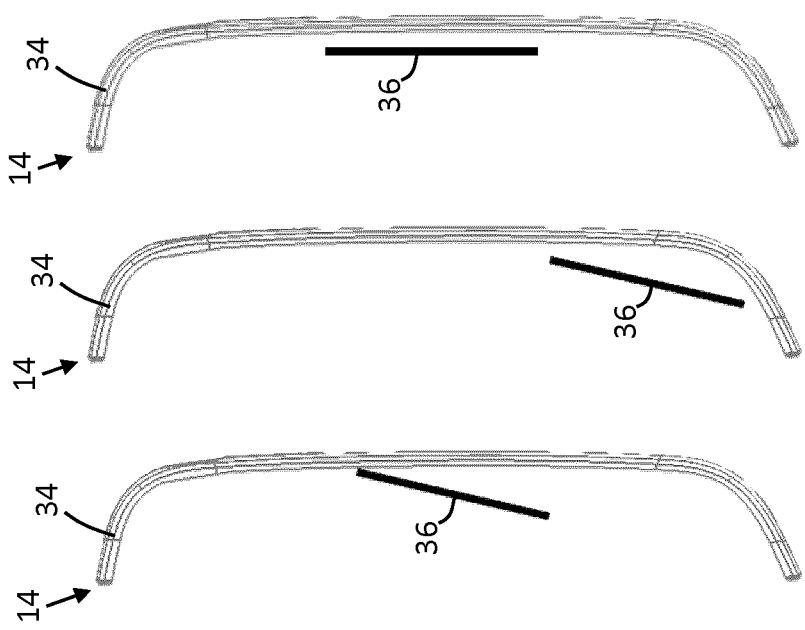

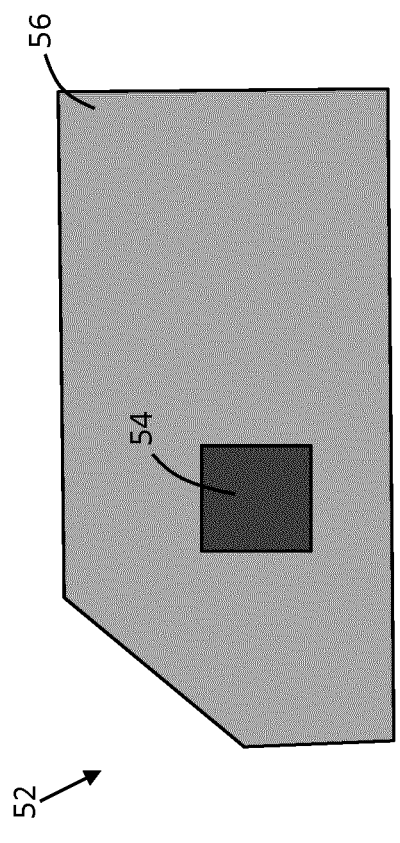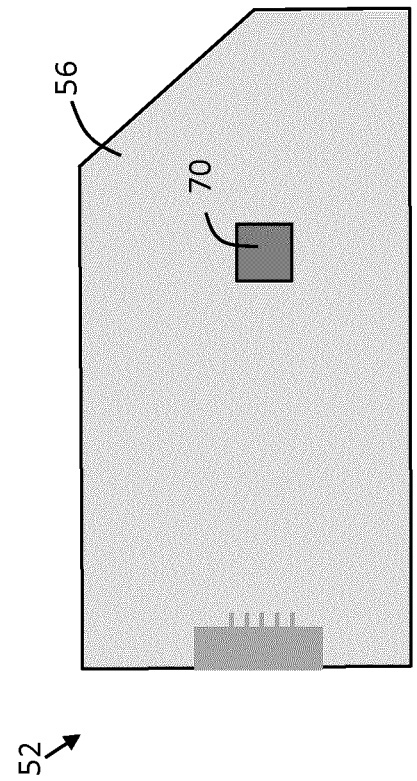

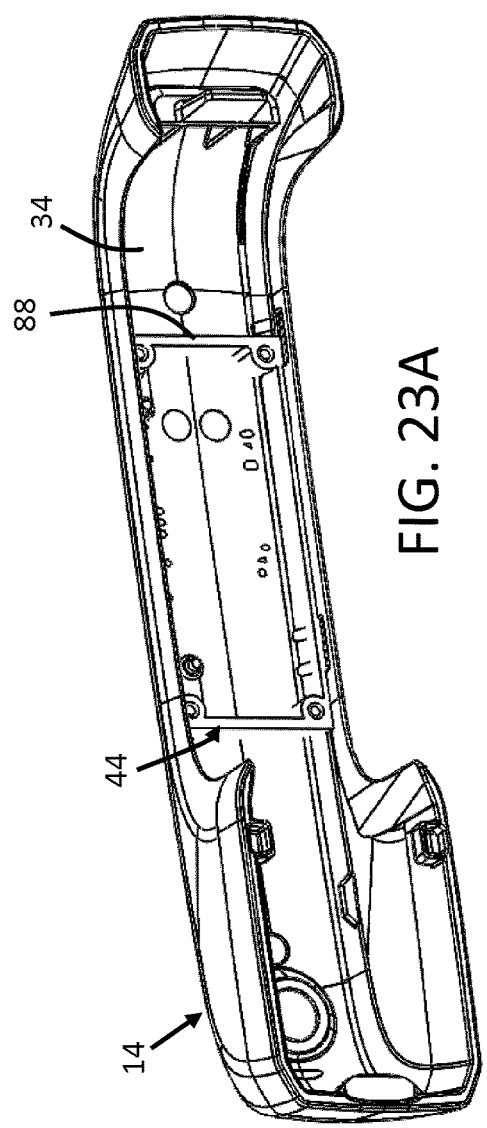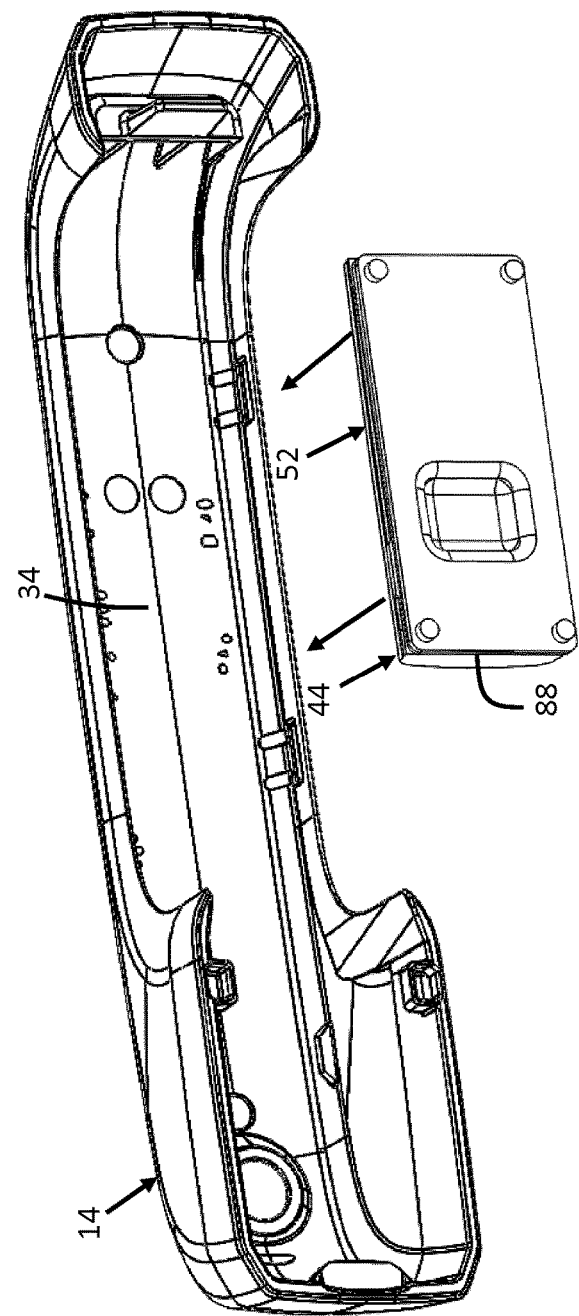
FIG. 23A
FIG. 23B

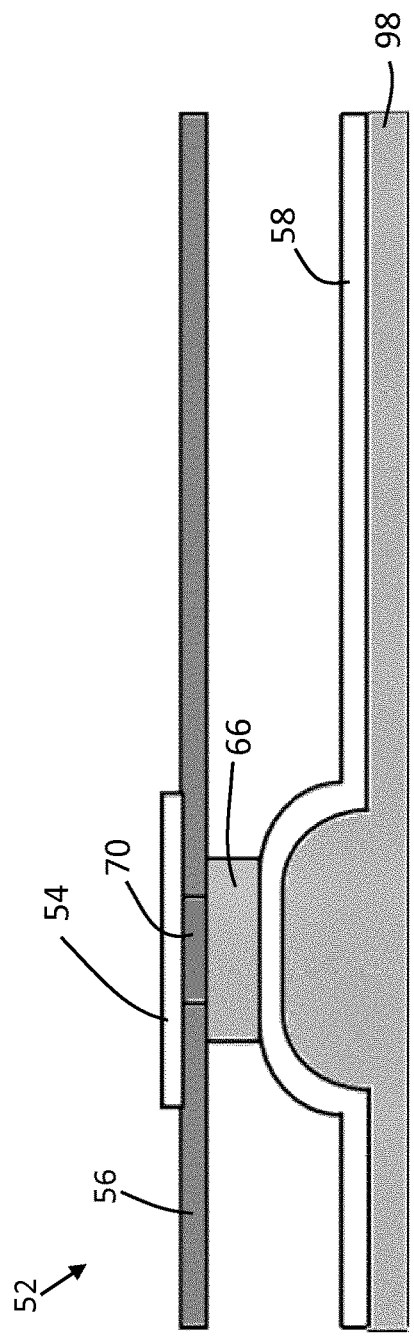
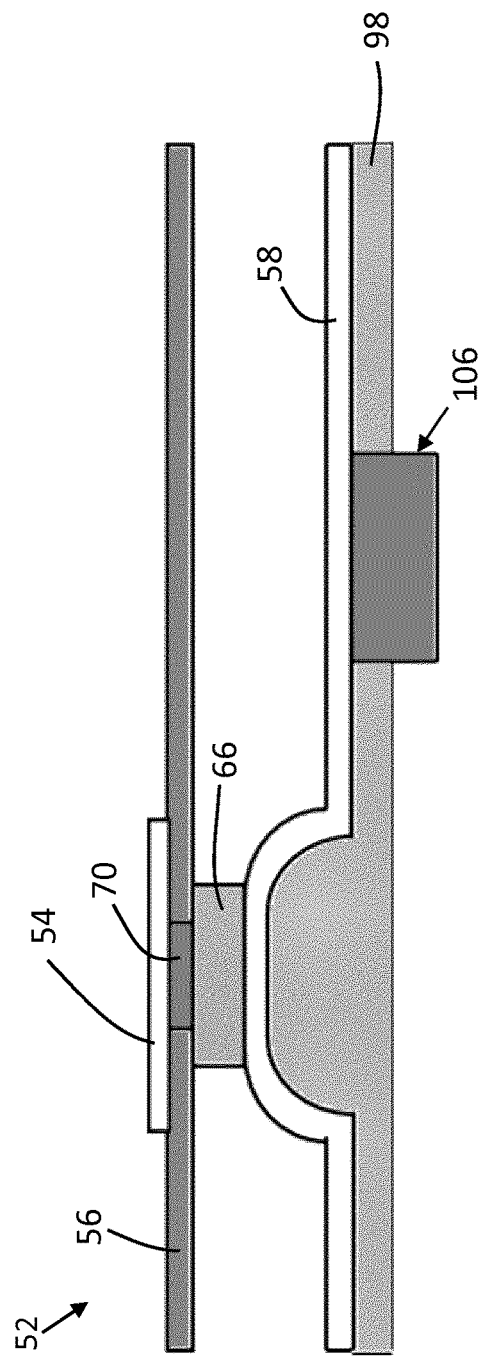

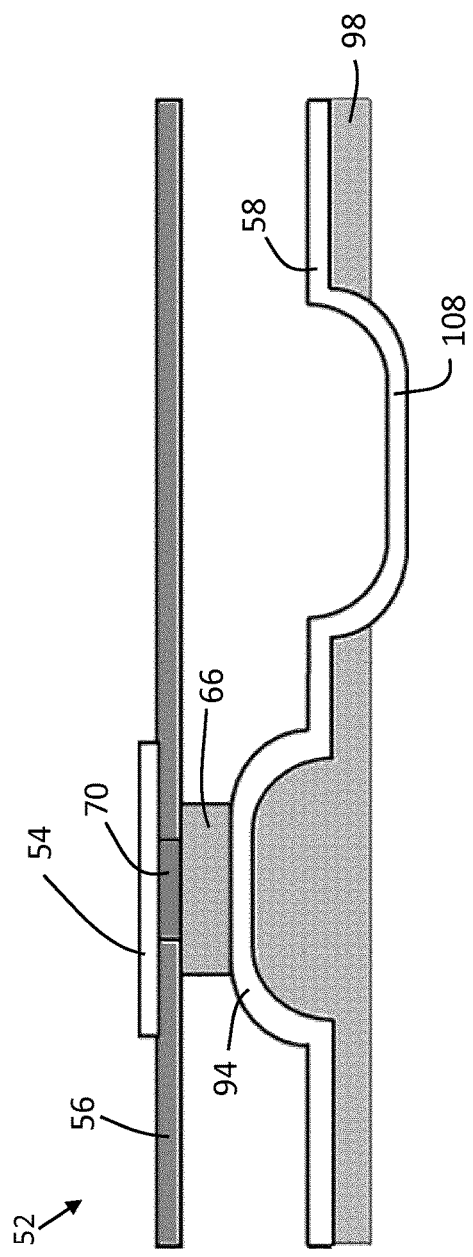
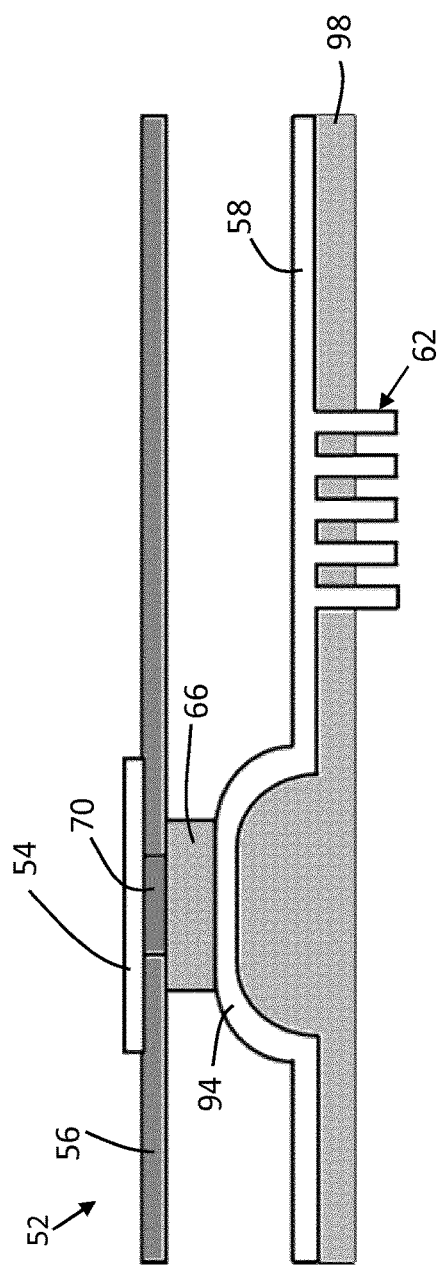
FIG. 26
FIG. 27

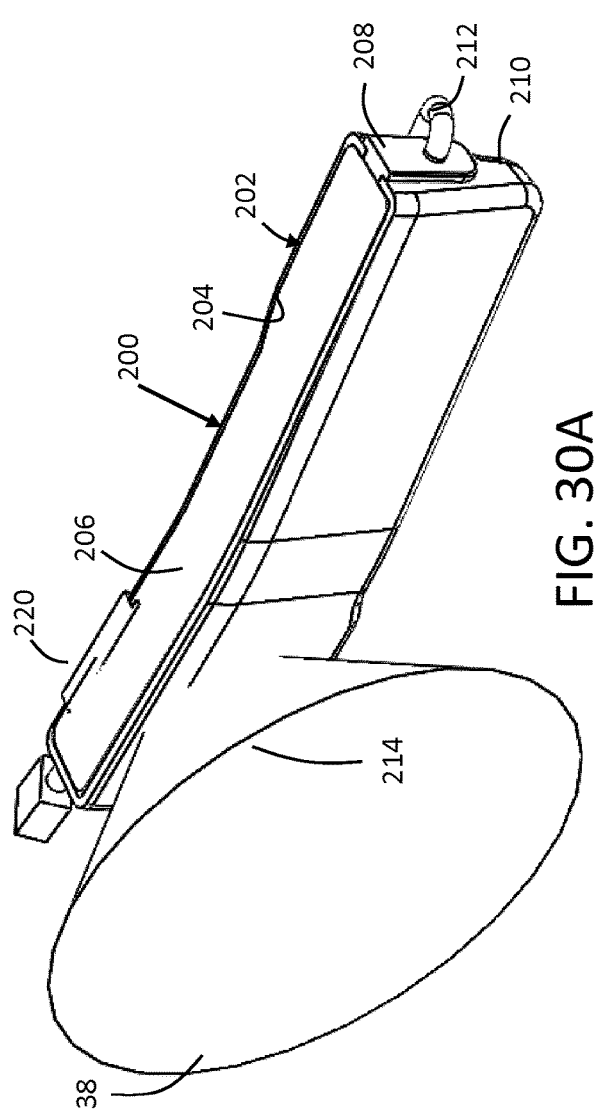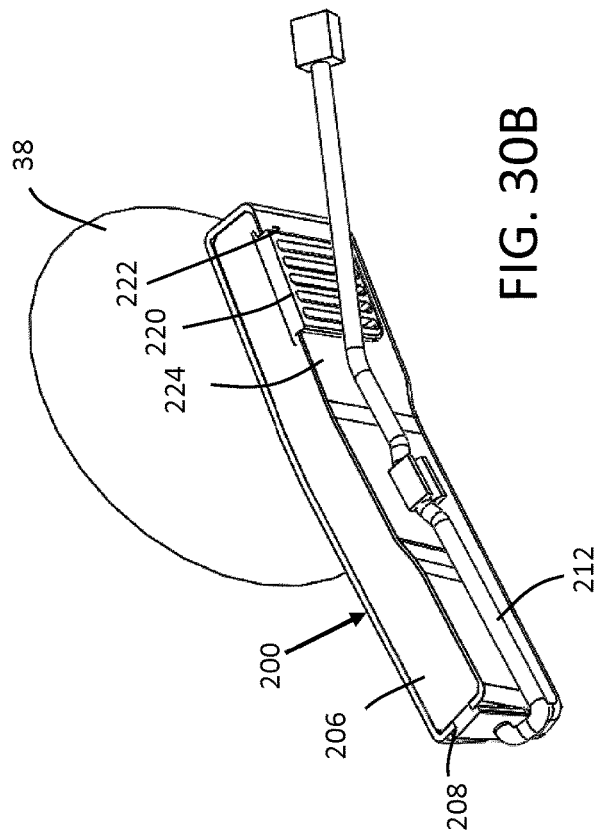
FIG. 30A
FIG. 30B

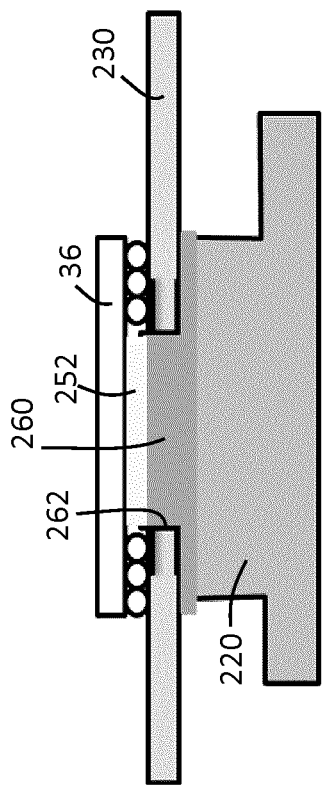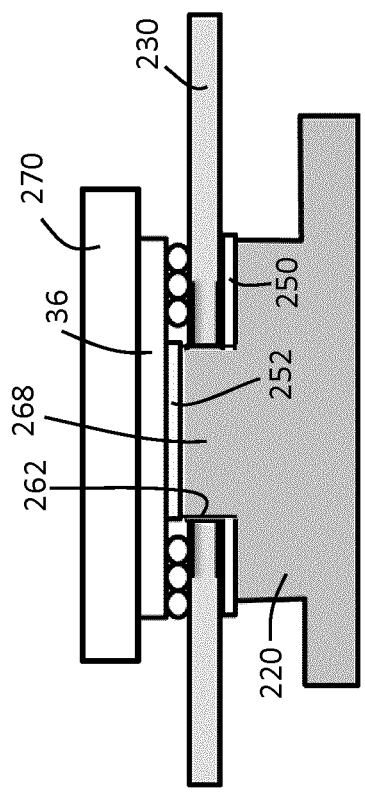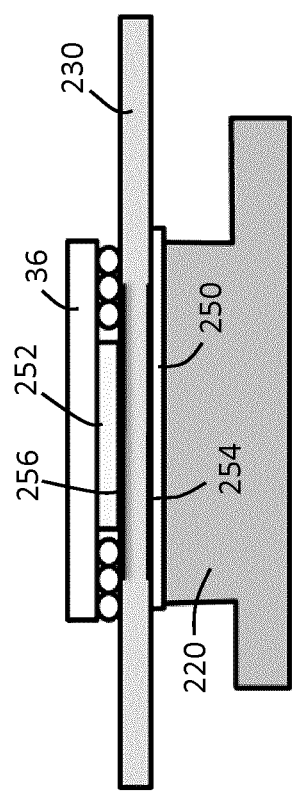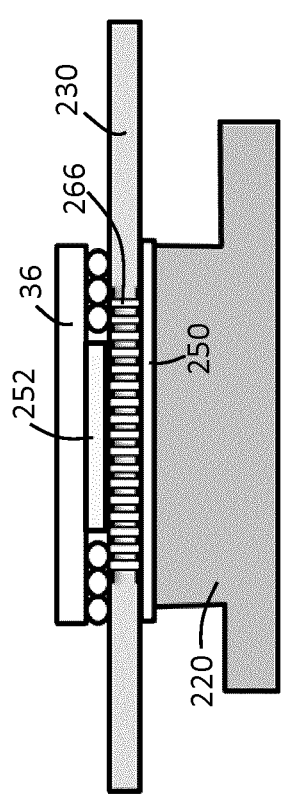
FIG. 35A
FIG. 35B
FIG. 35C
FIG. 35D

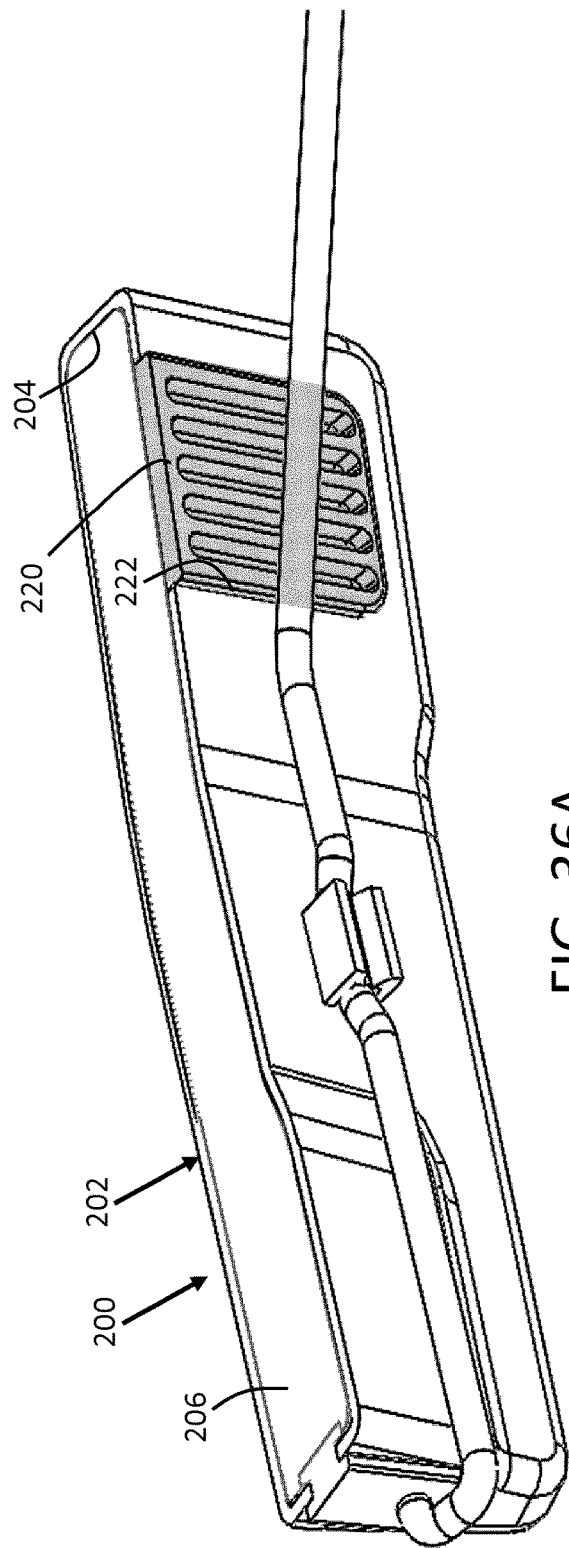
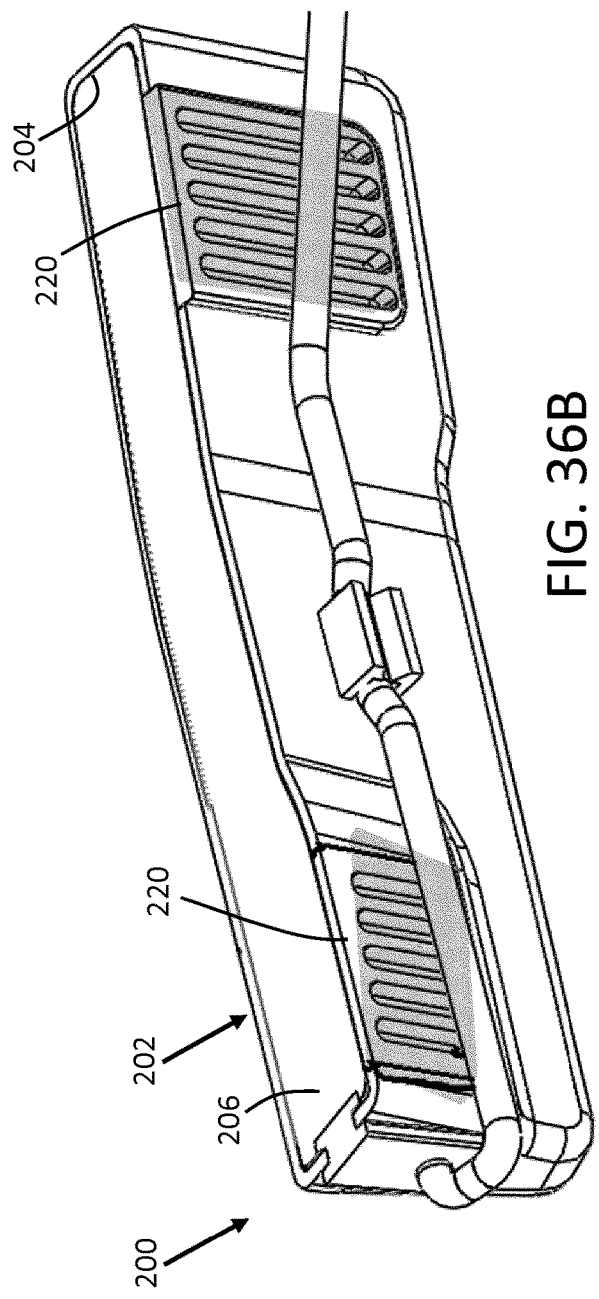
FIG. 36A
FIG. 36B

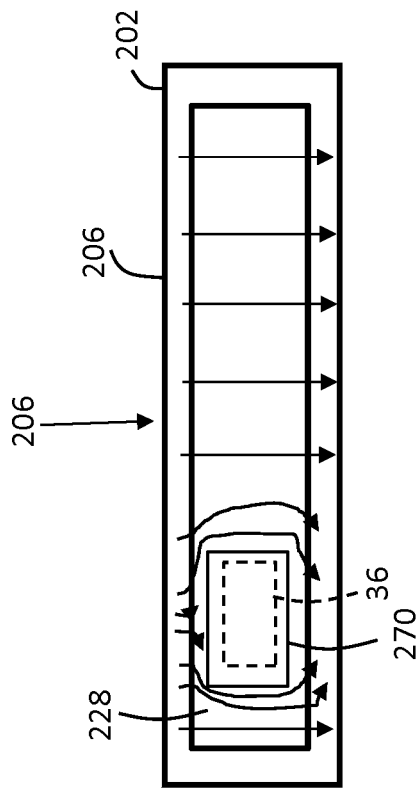
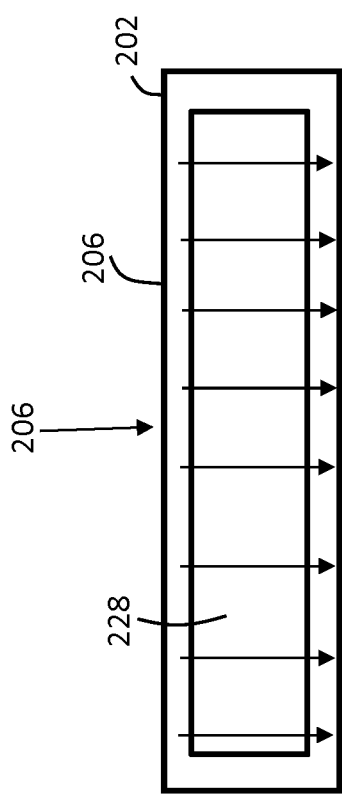
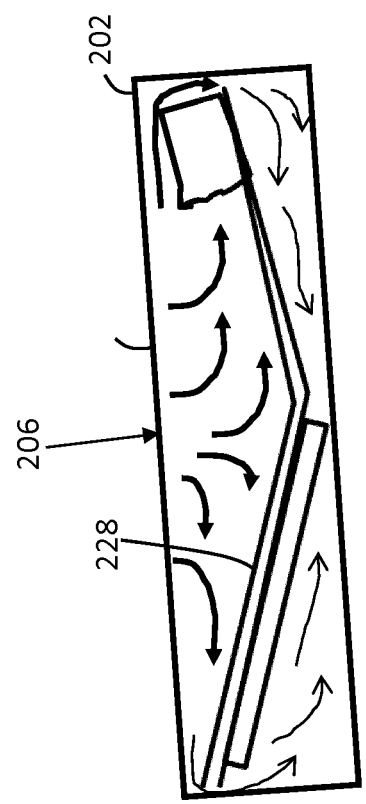

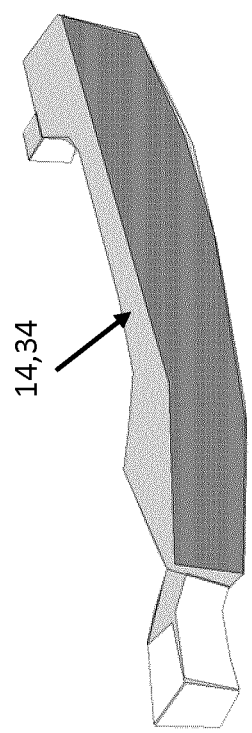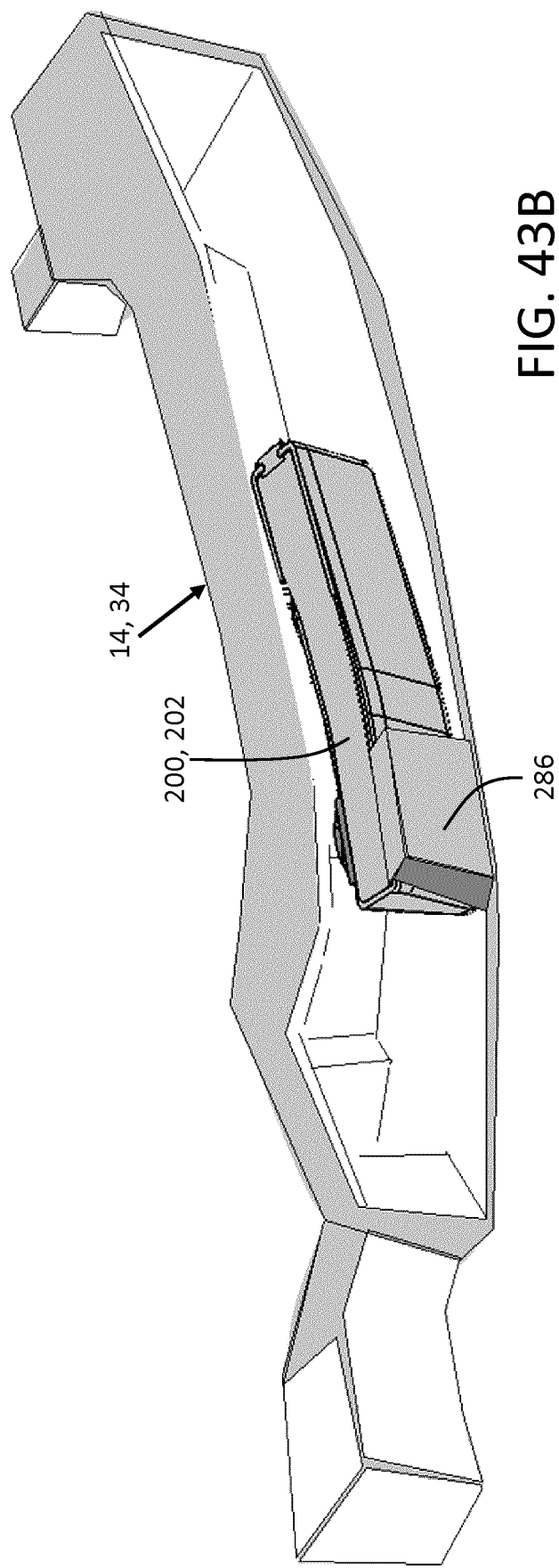

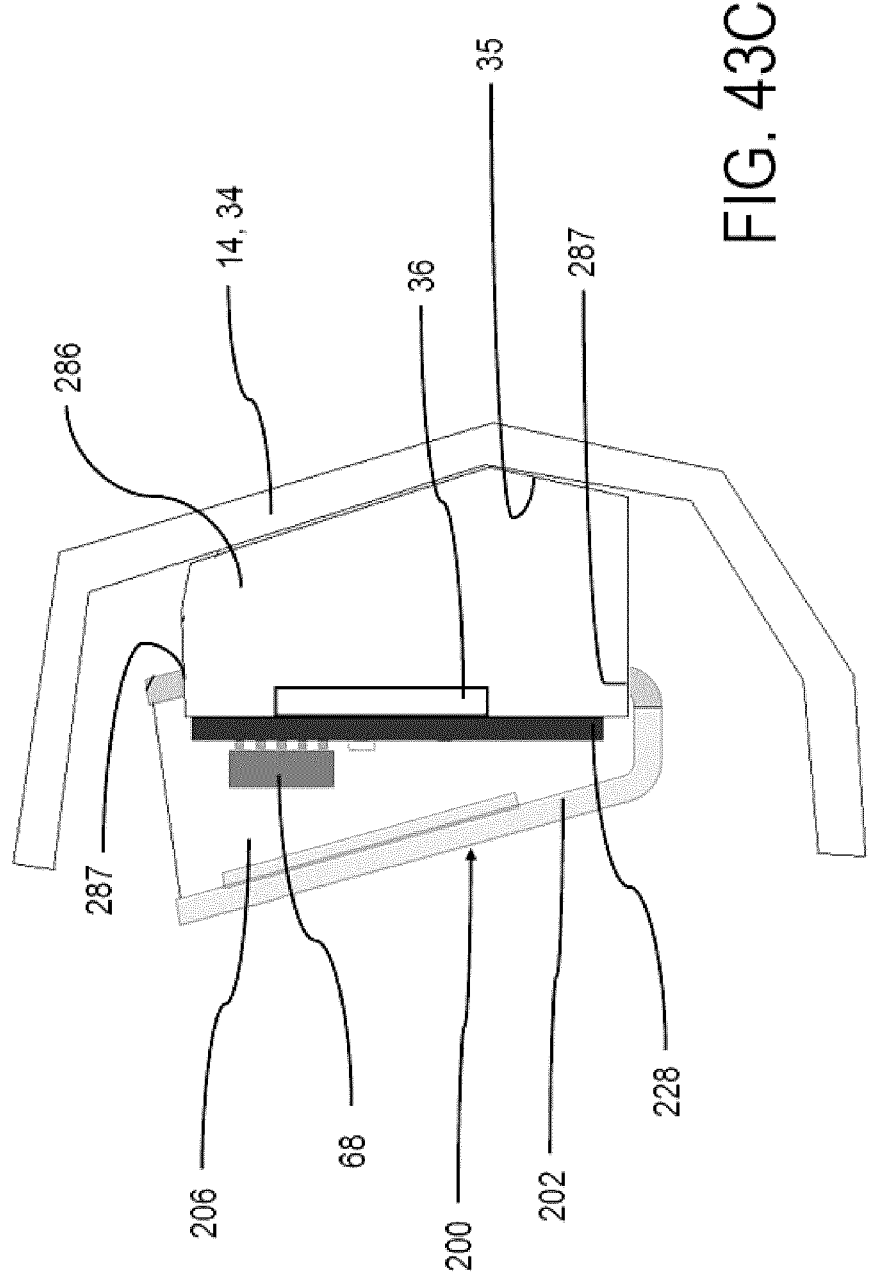

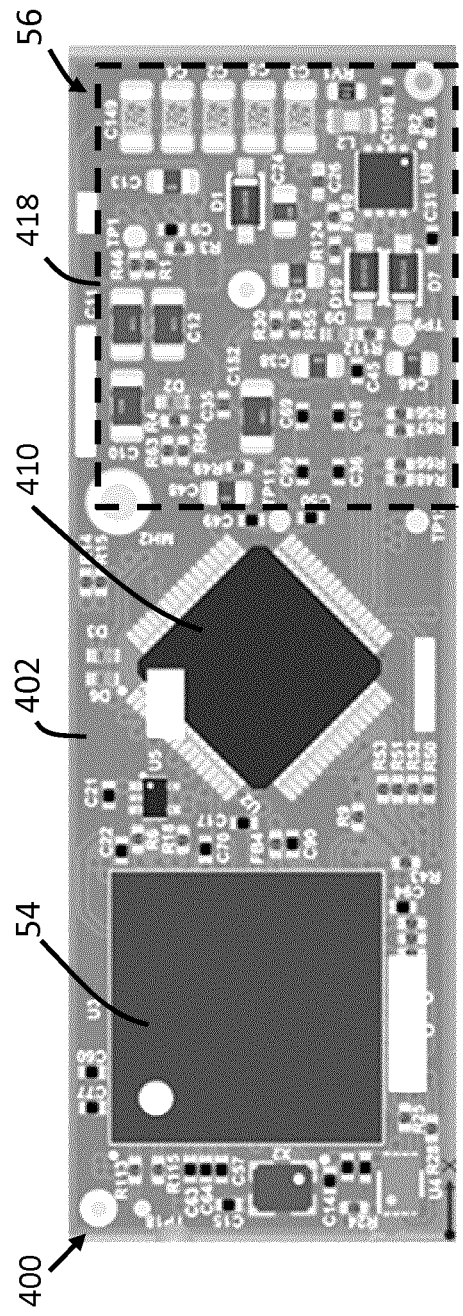
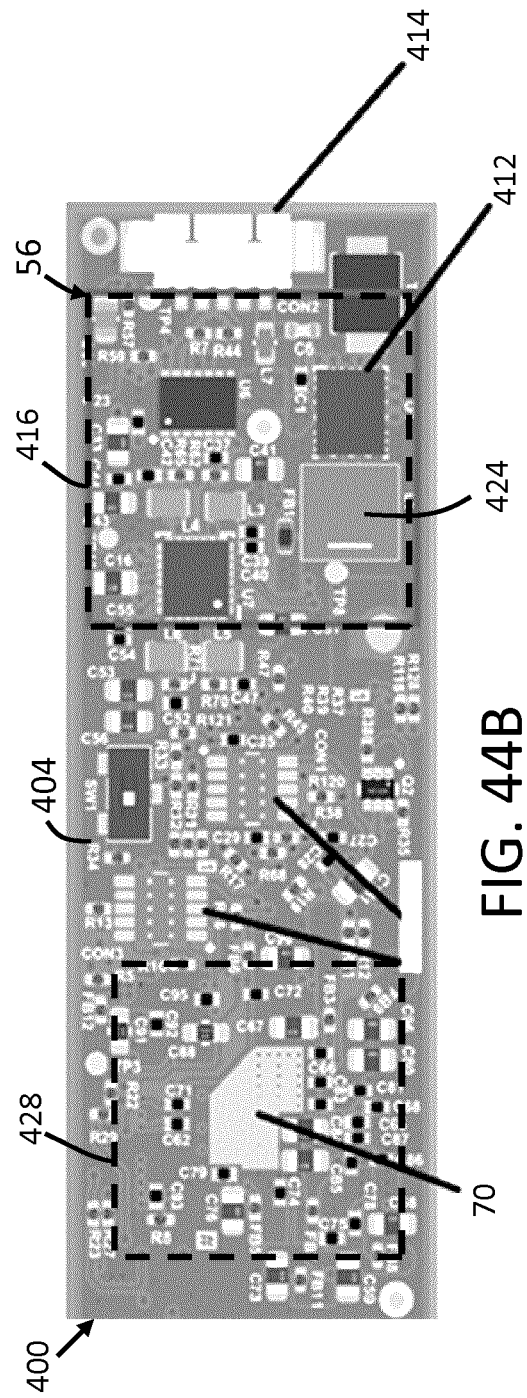
FIG. 44A
FIG. 44B

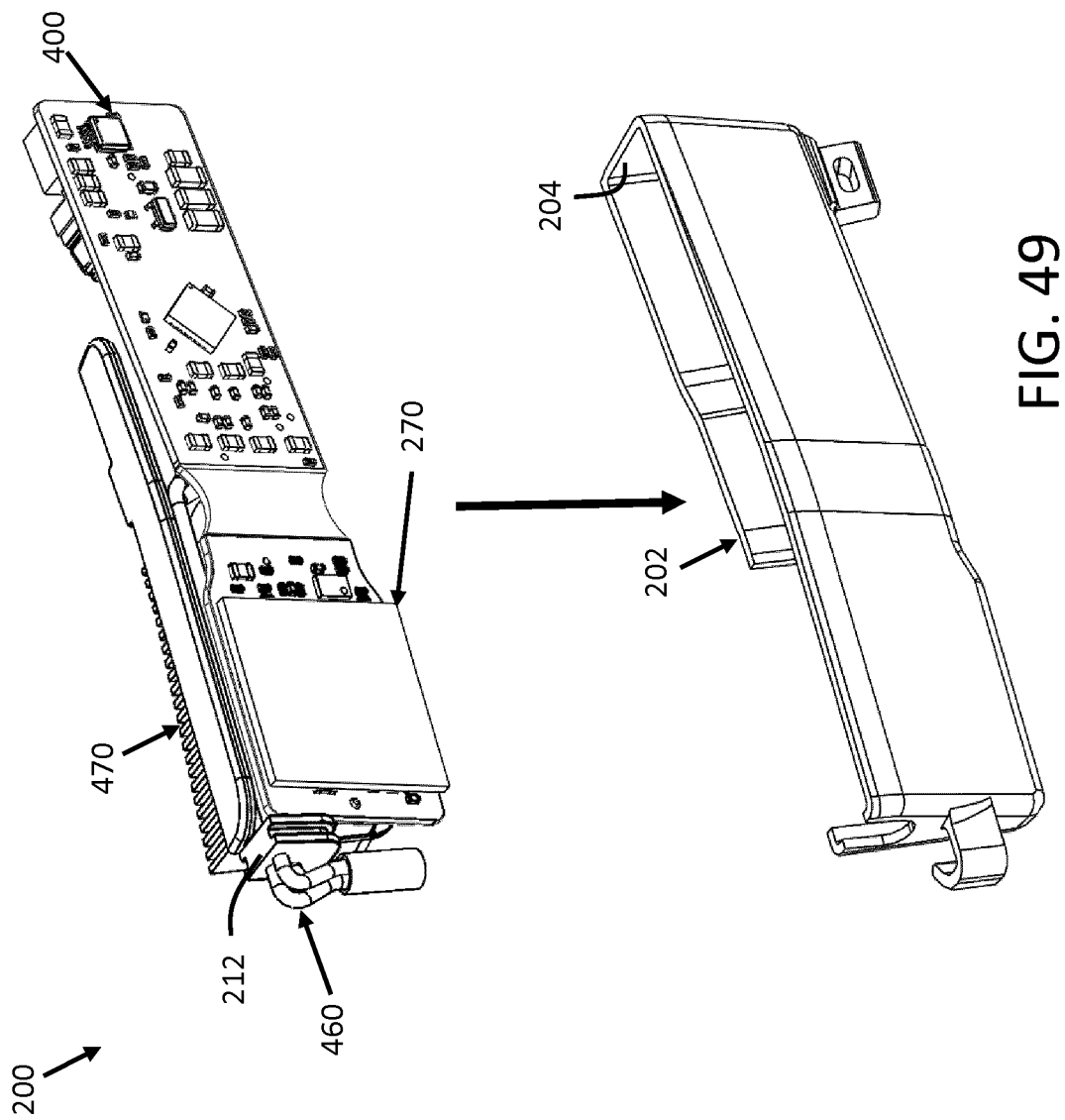

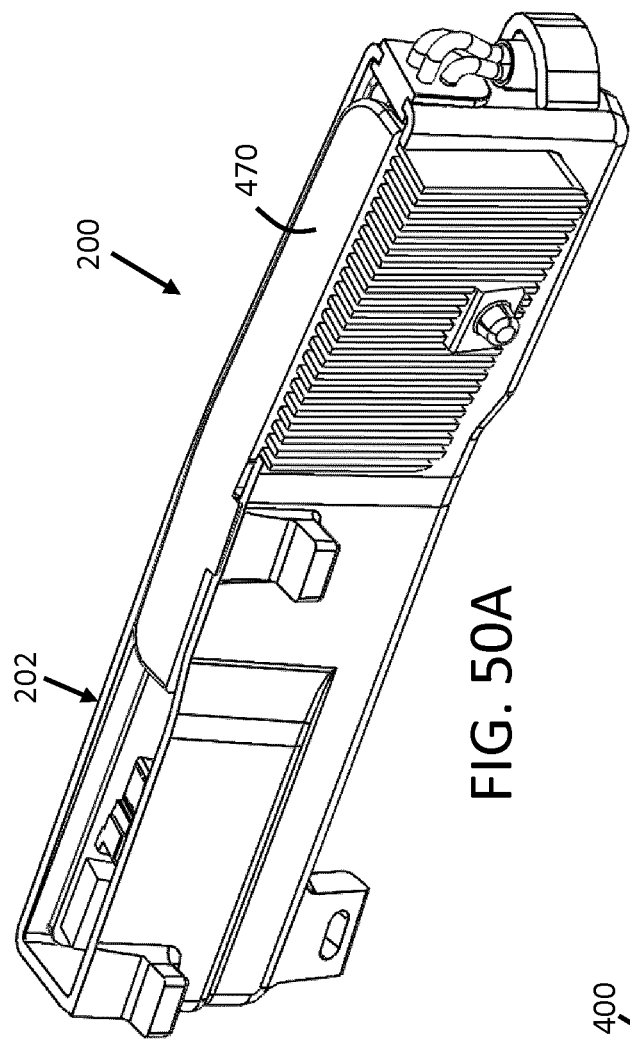
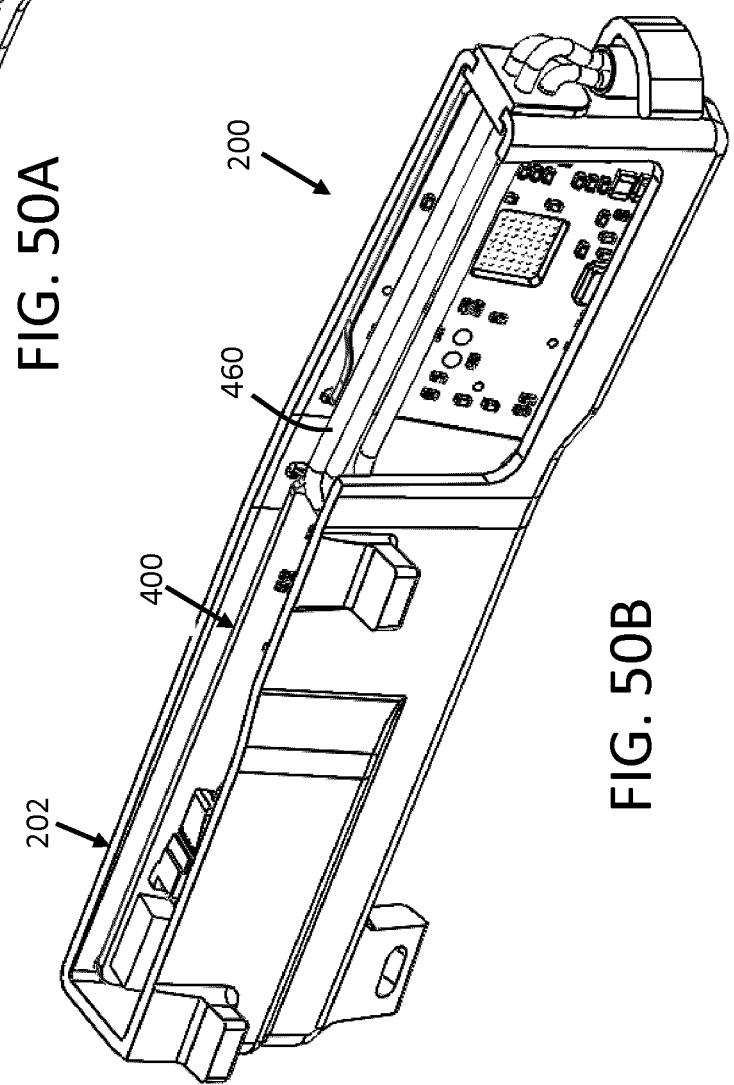
FIG. 50A
FIG. 50B

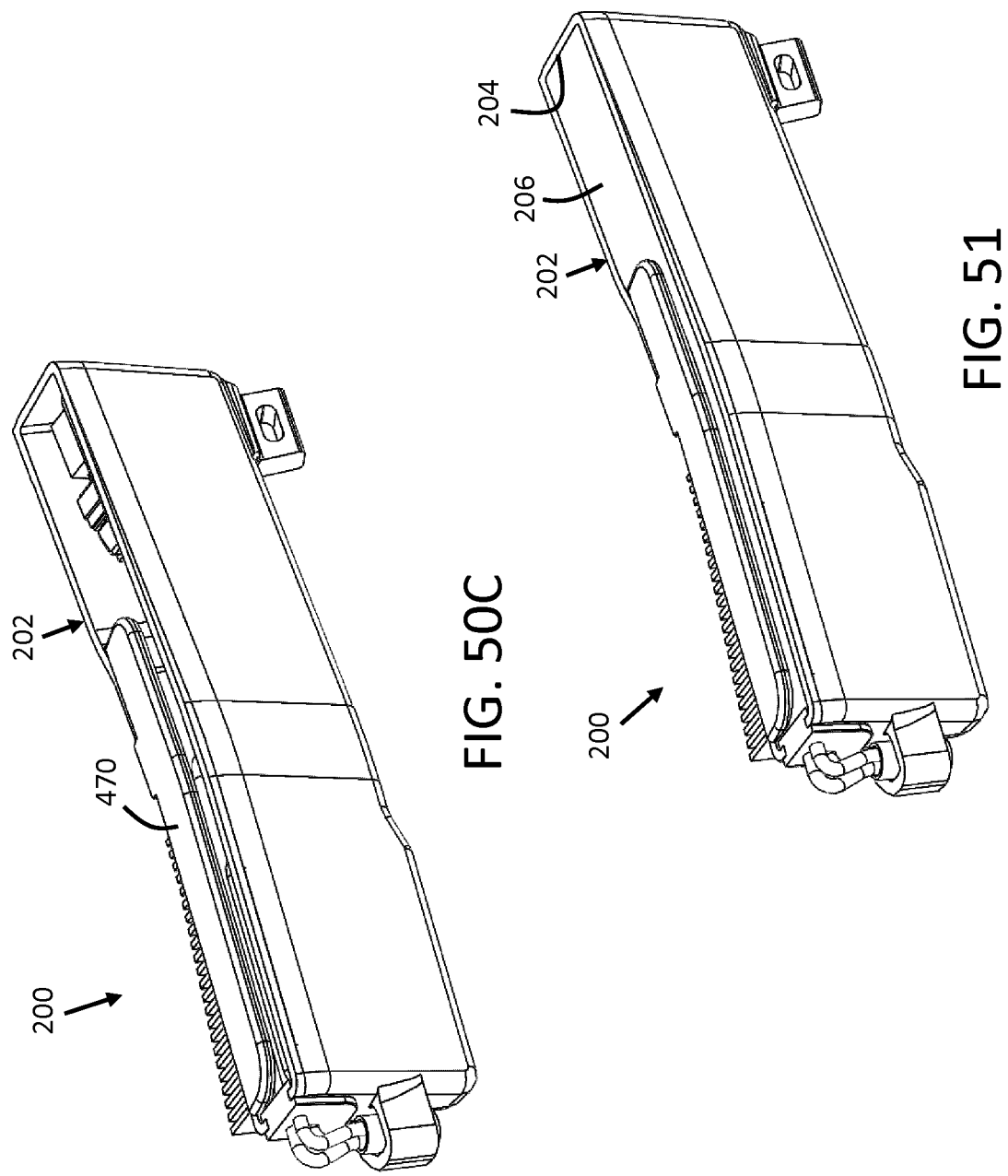

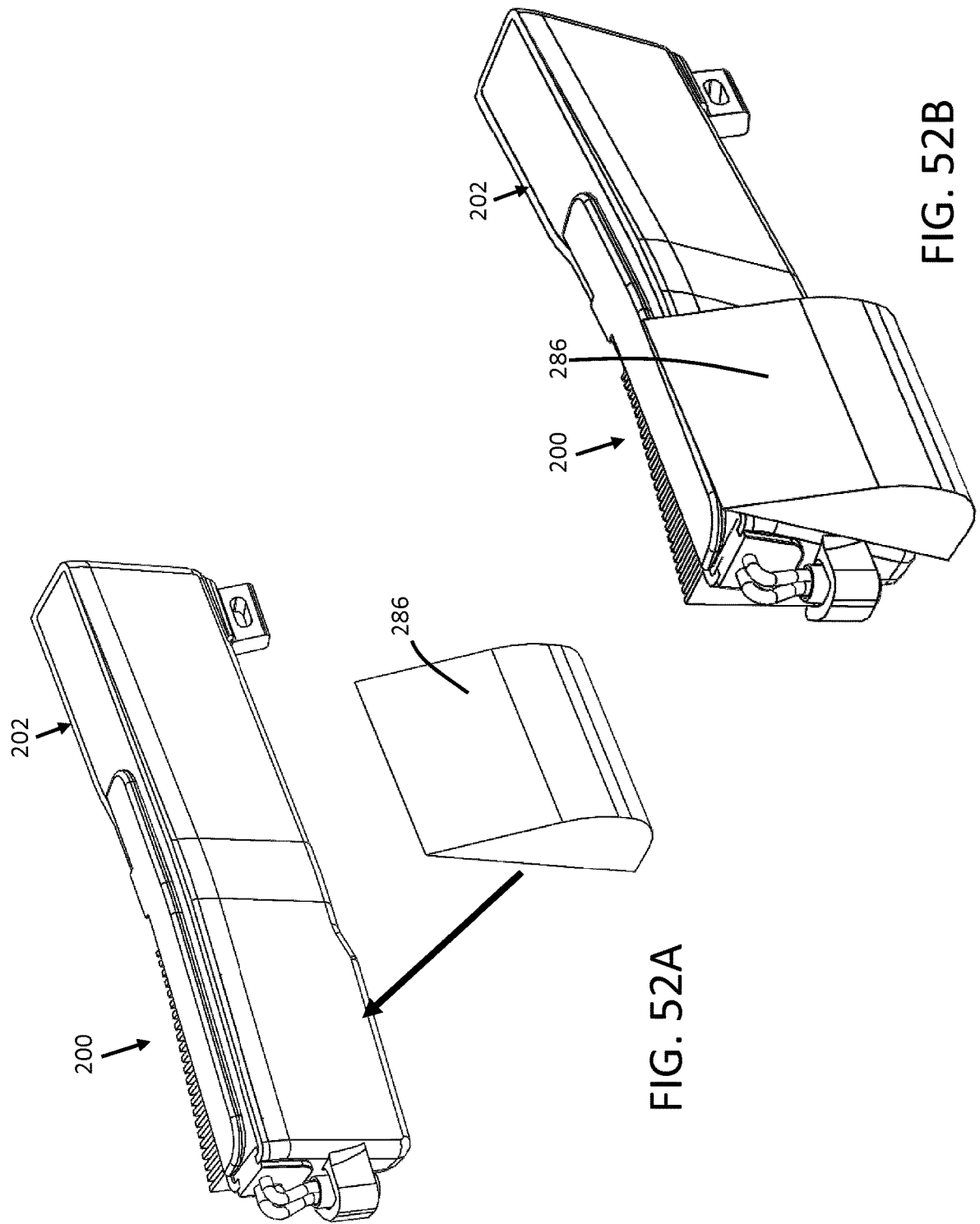

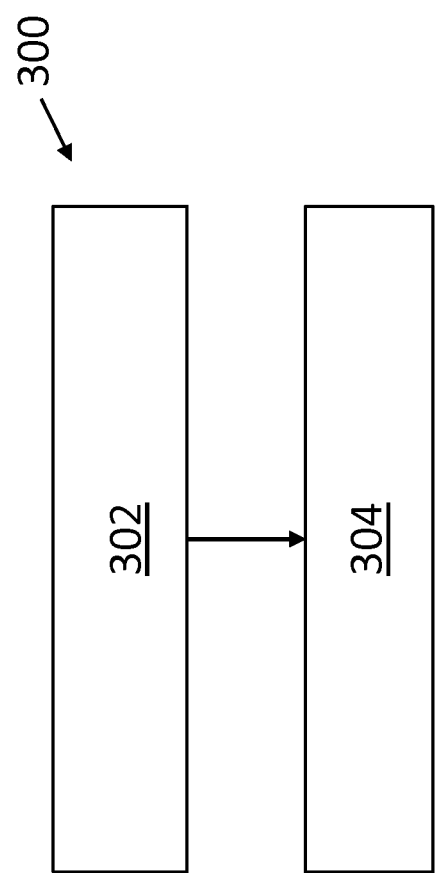

VEHICLE OUTSIDE DOOR HANDLE WITH RADAR MODULE AND THERMAL MANAGEMENT

CROSS-REFERENCE TO RELATED APPLICATIONS

This application is a 371 national phase filing of PCT Application No. PCT/CA2020/050979, filed Jul. 14, 2020, which claims the benefit of U.S. Provisional Application No. 62/875,569, filed Jul. 18, 2019, titled "Vehicle Outside Door Handle with Radar Module and Thermal Management", and U.S. Provisional Application No. 62/913,328, filed Oct. 10, 2019, titled "Vehicle Outside Door Handle with Radar Module and Thermal Management", and U.S. Provisional Application No. 63/000,004, filed Mar. 26, 2020, titled "Radar Sensor Printed Circuit Board Arrangement for Radome Assembly", and U.S. Provisional Application No. 63/017,286, filed Apr. 29, 2020, titled "Vehicle Outside Door Handle with Radar Module and Thermal Management", the contents of which are hereby incorporated by reference in their entirety.

FIELD

The present disclosure relates to a handle assembly for a vehicle closure. More specifically, the present disclosure relates to a handle assembly with a radar sensor.

BACKGROUND

This section provides background information related to the present disclosure which is not necessarily prior art.

Radar sensors are commonly used for non-contact object detection in vehicles. Vehicles commonly include external components such as handles or side light modules that may be used to house one or more components of a radar sensor. However, such external components present several considerations, such as limited packaging space and heat dissipation constraints.

Also, radar sensors and associated hardware commonly generates heat that must be managed to prevent overheating that can adversely impact the operation of the radar sensor and/or other devices.

SUMMARY

This section provides a general summary of the disclosure, and is not a comprehensive disclosure of its full scope or all of its features.

It is an objective of the present disclosure to provide a vehicle exterior component comprising a module housing defining an interior space configured to hold a radar module including a heat source, and a sealing material extending between the radar module and the module housing for blocking moisture and other contaminants.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a partial perspective view of a vehicle;
FIG. 1A is a side view of a vehicle;
FIG. 2 is a diagrammatic top view of a vehicle in accordance with an illustrative embodiment;
FIG. 3 is a cut-away top view of a portion of a handle assembly in accordance with an embodiment of the disclosure;
FIG. 3A is a cut-away side view of a portion of a handle assembly in accordance with an embodiment of the disclosure;
FIG. 3B is a perspective view of a partially transparent handle assembly in accordance with an embodiment of the disclosure;
FIG. 4 is a schematic cut-away top view of a handle assembly in accordance with an embodiment of the disclosure;
FIG. 5 is a cut-away top view of a vehicle exterior component in accordance with an embodiment of the disclosure;
FIG. 6 is a cut-away top view of a portion of a handle assembly in accordance with an embodiment of the disclosure;
FIG. 7 is a cut-away top view of a portion of a handle assembly in accordance with an embodiment of the disclosure;
FIG. 8 is a cut-away top view of a portion of a handle assembly in accordance with an embodiment of the disclosure;
FIG. 9 is a cut-away side view of a portion of a handle assembly in accordance with an embodiment of the disclosure;
FIG. 10 is a cut-away side view of a portion of a handle assembly in accordance with an embodiment of the disclosure;
FIGS. 11-13 are cut-away side views of a handle assembly in accordance with embodiments of the disclosure;
FIGS. 14-16 are cut-away top views of a handle assembly in accordance with embodiments of the disclosure;
FIG. 17 is a sectional schematic diagram showing approximate relative size and placement of components of a radar module in accordance with aspects of the disclosure;
FIG. 18 is a sectional schematic diagram showing approximate relative size and placement of components of a radar module in accordance with aspects of the disclosure;
FIG. 19 is a sectional schematic diagram showing approximate relative size and placement of components of a radar module within a vehicle component in accordance with aspects of the disclosure;
FIG. 20 is a sectional schematic diagram showing approximate relative size and placement of components of a radar module within a vehicle component in accordance with aspects of the disclosure;
FIG. 20A is an exploded perspective view of a radar module within a vehicle component in accordance with aspects of the disclosure;
FIG. 20B is a perspective view of a radar module in accordance with aspects of the disclosure;
FIG. 20C is a sectional view of a radar module within a vehicle component in accordance with aspects of the disclosure;
FIG. 20D is a sectional schematic diagram of a radar module in accordance with aspects of the disclosure;
FIG. 20E is a front view of a printed circuit board of a radar module in accordance with aspects of the disclosure;
FIG. 20F is a rear view of the printed circuit board of FIG. 20E;

FIG. 23A is a perspective view of a handle assembly in accordance with aspects of the disclosure;

FIG. 23B is a perspective view of a handle assembly in accordance with aspects of the disclosure;

FIG. 24 is a sectional schematic diagram showing approximate relative size and placement of components of a radar module in accordance with aspects of the disclosure;

FIG. 25 is a sectional schematic diagram showing approximate relative size and placement of components of a radar module in accordance with aspects of the disclosure;

FIG. 26 is a sectional schematic diagram showing approximate relative size and placement of components of a radar module in accordance with aspects of the disclosure;

FIG. 27 is a sectional schematic diagram showing approximate relative size and placement of components of a radar module in accordance with aspects of the disclosure;

FIG. 30A is a perspective view of a radar module in accordance with aspects of the disclosure;

FIG. 30B is another perspective view of the radar of FIG. 30A;

FIG. 35A is a schematic cut-away of a first arrangement of a heat sink in thermally-conductive communication with a radar IC;

FIG. 35B is a schematic cut-away of a second arrangement of a heat sink in thermally-conductive communication with a radar IC;

FIG. 35C is a schematic cut-away of a third arrangement of a heat sink in thermally-conductive communication with a radar IC;

FIG. 35D is a schematic cut-away of a fourth arrangement of a heat sink in thermally-conductive communication with a radar IC;

FIG. 36A is a perspective view of a radar module with a heat sink in accordance with aspects of the disclosure;

FIG. 36B is a perspective view of a radar module with multiple heat sinks in accordance with aspects of the disclosure;

FIG. 39A is a side-view schematic flow diagram showing filling of potting material from a top of the radar module assembly of FIG. 38B;

FIG. 39B is a top-view schematic flow diagram showing a filling of potting material from a side of the alternative radar module assembly of FIG. 38C;

FIG. 39C is a side-view schematic flow diagram showing filling of potting material from a top of the radar module assembly of FIG. 38B with the potting shown flowing around a radar-transparent pad overlying a radar IC;

FIG. 43A is a perspective view of a handle assembly in accordance with aspects of the disclosure;

FIG. 43B is a cut-away perspective view of the handle assembly of FIG. 43A, showing a radar module and a radar-transparent pad disposed therein;

FIG. 43C is a side cut-away perspective view of the handle assembly of FIG. 43B, showing a radar module and a radar-transparent pad disposed therein in accordance with another illustrative embodiment;

FIG. 44A is a top view of an illustrative example circuit card assembly (CCA) of a radar module in accordance with aspects of the disclosure;

FIG. 44B is a bottom view of the illustrative example circuit card assembly in accordance with aspects of the disclosure;

FIG. 49 is a graphic illustration showing a fourth assembly step of the radar module assembly in accordance with aspects of the disclosure;

FIG. 50A is a rear perspective view showing the radar module assembly after the fourth assembly step in accordance with aspects of the disclosure;

FIG. 50B is a rear perspective view showing the radar module assembly after the fourth assembly step and without a heat sink in accordance with aspects of the disclosure;

FIG. 50C is a front perspective view showing the radar module assembly after the fourth assembly step in accordance with aspects of the disclosure;

FIG. 51 is a front perspective view showing the radar module assembly after a fifth assembly step in accordance with aspects of the disclosure;

FIG. 52A is a graphic illustration showing a sixth assembly step of the radar module assembly in accordance with aspects of the disclosure; and FIG. 52B is a front perspective view showing the radar module assembly after the sixth assembly step in accordance with aspects of the disclosure; and FIG. 53 is a method of assembling a radar module, in accordance with aspects of the disclosure.

Corresponding reference numerals indicate corresponding parts throughout the several views of the drawings.

DETAILED DESCRIPTION

Figure 1:
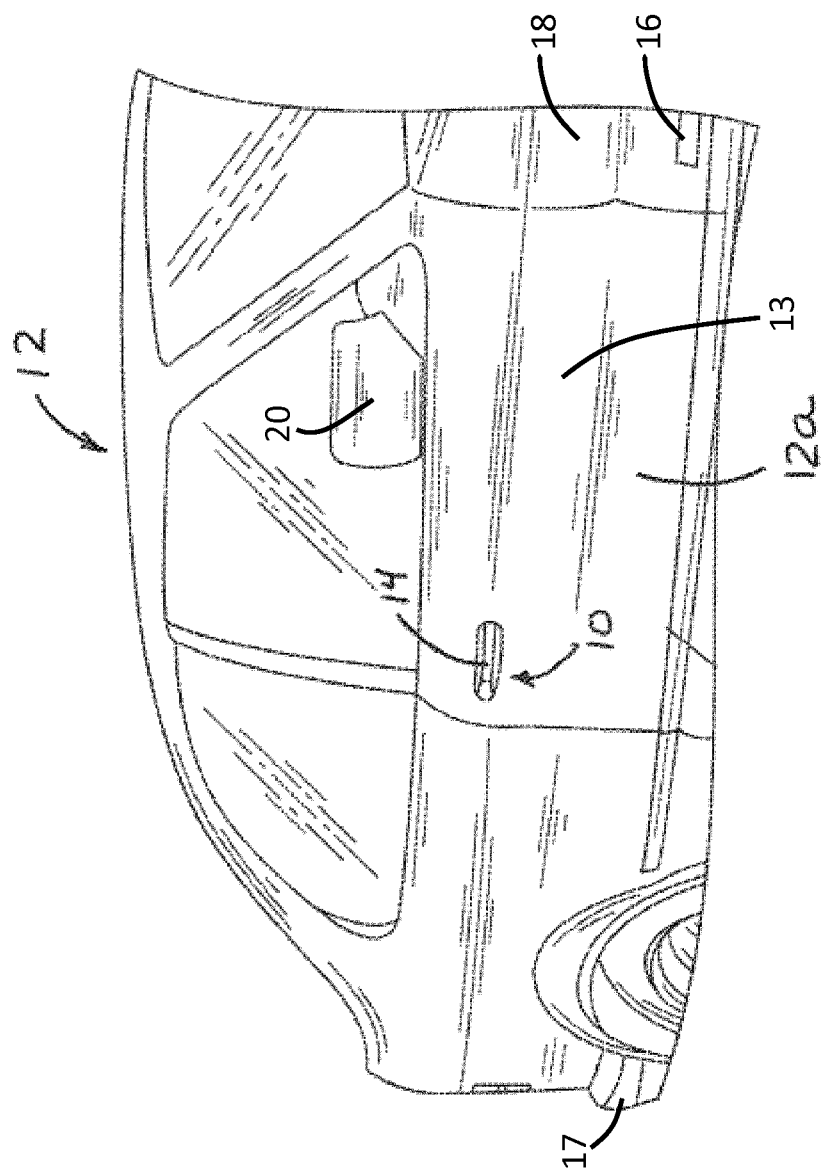

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a number of example embodiments of vehicle exterior components that are configured to hold one or more parts of a radar sensor, and which addresses the constraints of limited space and management of heat that is generated by operation of the radar sensor. In some embodiments, the radar sensor includes parts having a maximum operating temperature of 125 degrees C. at an ambient temperature of 80 degrees C. The present disclosure also provides example embodiments that provide water resistance to prevent the radar sensor from being adversely affected by exposure to moisture.

Referring initially to FIG. 1, an example motor vehicle 12 is shown to include an exterior surface 10 that includes a side door 12a having an outer panel 13 with a handle assembly 14 disposed thereupon. A side light module 16 also extends from a vehicle side 18.

Figure 1A:
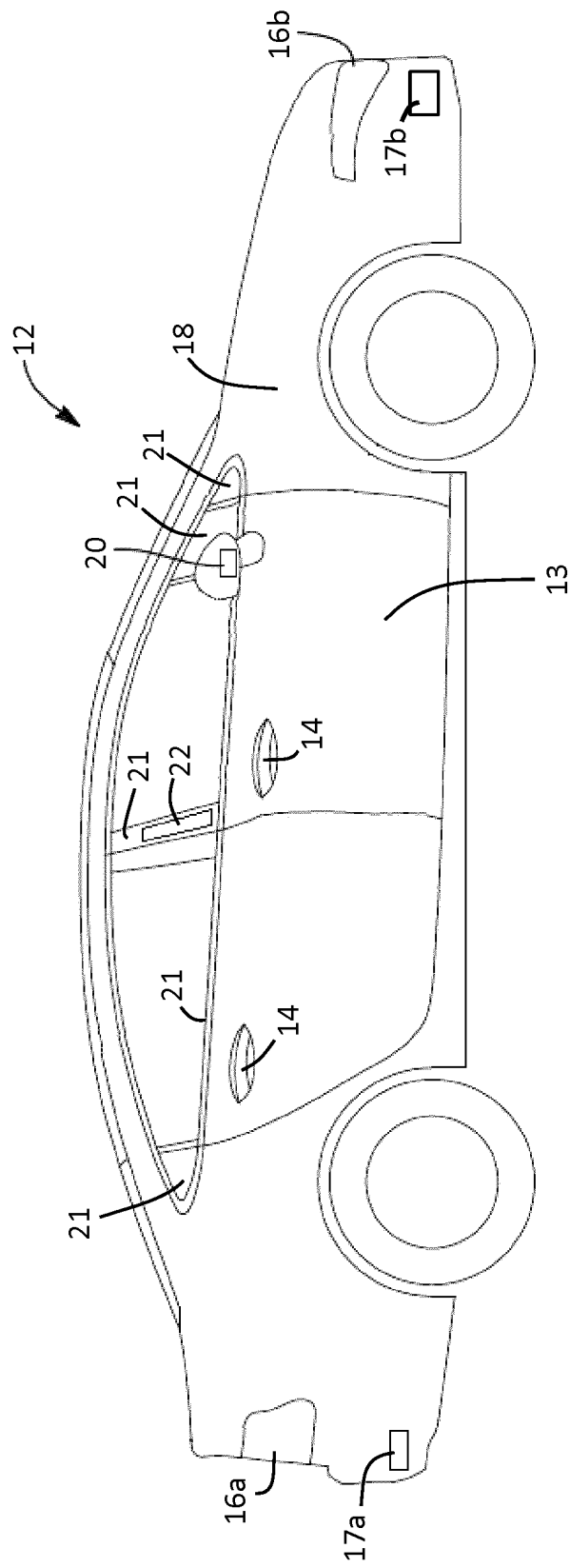

FIG. 1A shows a side view of the example motor vehicle 12 including a tail light assembly 16b, a headlight assembly 16*b*, a rear bumper 17*a*, a front bumper 17*b*, a side mirror assembly 20, various trim pieces 21, and an applique 22, such as a keypad mounted to a pillar of a door. In other words, the example motor vehicle 12 includes several vehicle exterior components 13, 14, 16, 16*a*, 16*b*, 17*a*, 17*b*, 20, 21, 22 that may be used to hold one or more components of a radar sensor. Other exterior components 13, 14, 16, 16*a*, 16*b*, 17*a*, 17*b*, 20, 21, 22 besides those listed explicitly above may also hold one or more components of the radar sensor and may incorporate one or more aspects of the designs shown in the present disclosure. For example, the exterior component may take the form of a body panel, a trim panel, and/or a roof-mounted structure, such as an antenna pod or a luggage rail.

In some embodiments, a radar sensor disposed within one or more exterior components 13, 14, 16, 16*a*, 16*b*, 17*a*, 17*b*, 20, 21, 22 may be used for non-contact object detection (NCOD), such as, for example, to sense a user approaching and/or interacting with a closure such as the side door 12*a* or a tailgate or lift gate of the vehicle 12. In some embodiments, the radar sensor disposed within one or more exterior components 13, 14, 16, 16*a*, 16*b*, 17*a*, 17*b*, 20, 21, 22 may be used for an advanced driver-assistance system (ADAS) such as, for example, to sense the position of other vehicles, objects, or terrain while the vehicle 12 is in motion.

Figure 2:
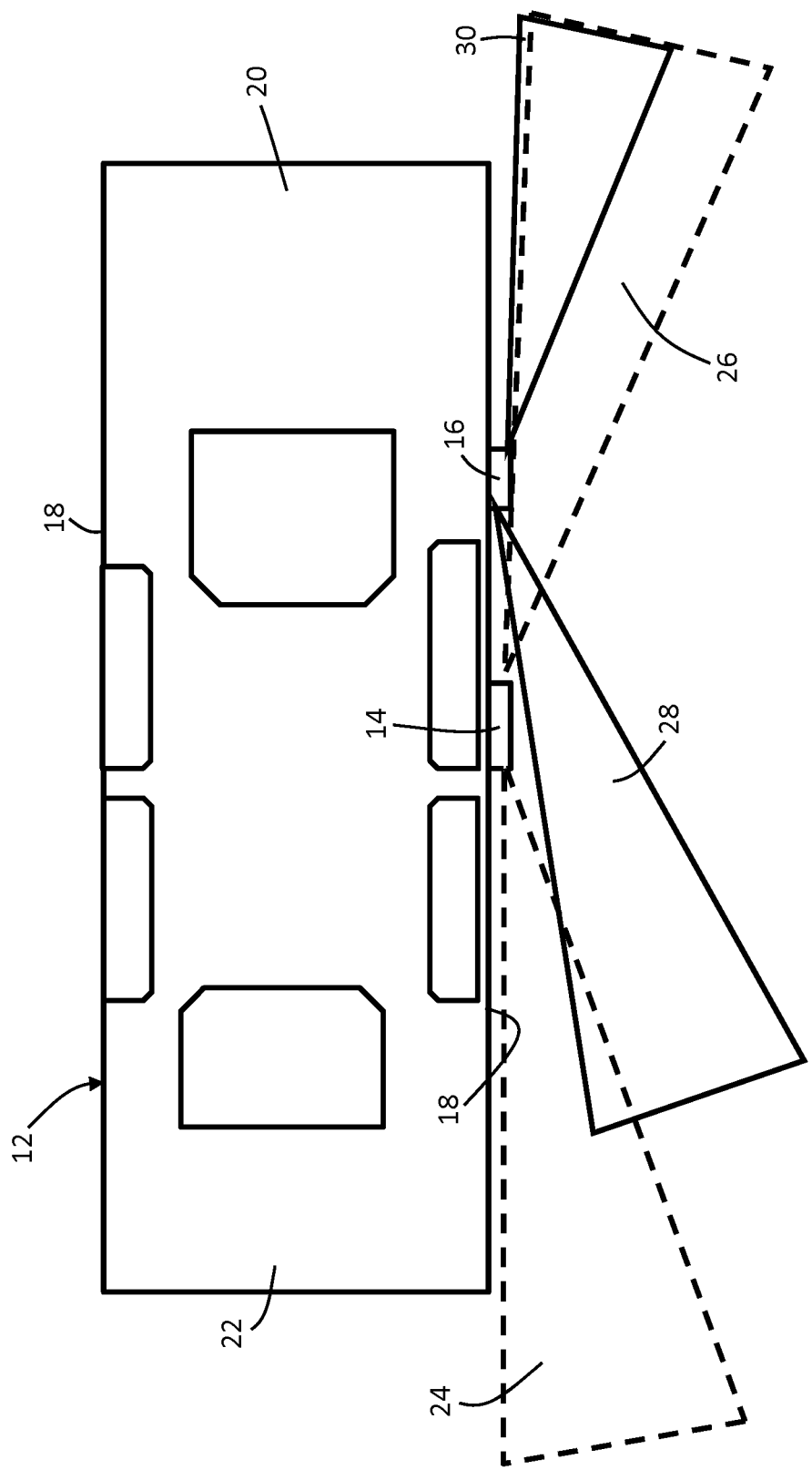

FIG. 2 is a diagrammatic top view of a vehicle 12 in accordance with an illustrative embodiment. As shown in FIG. 2, the vehicle 12 includes front side doors 12*a* and rear side doors 12*b*, each having a handle assembly 14. A side light module 16 extends outwardly from a side of the vehicle 12. The handle assembly 14 has a first field of view (FOV) 24 that extends in a rearward direction along the side 18 of the vehicle 12, and a second field of view 26 that extends in a forward direction along the side 18 of the vehicle 12. Similarly, the side light module 16 has a third field of view 28 that extends in a rearward direction along the side 18 of the vehicle 12, and a fourth field of view 30 that extends in a forward direction along the side 18 of the vehicle 12. One or more of the fields of view may angle away from the side 18 of the vehicle 12, at least to some extent as a result of obstruction by one or more other vehicle exterior components 14, 16.

Figure 3:
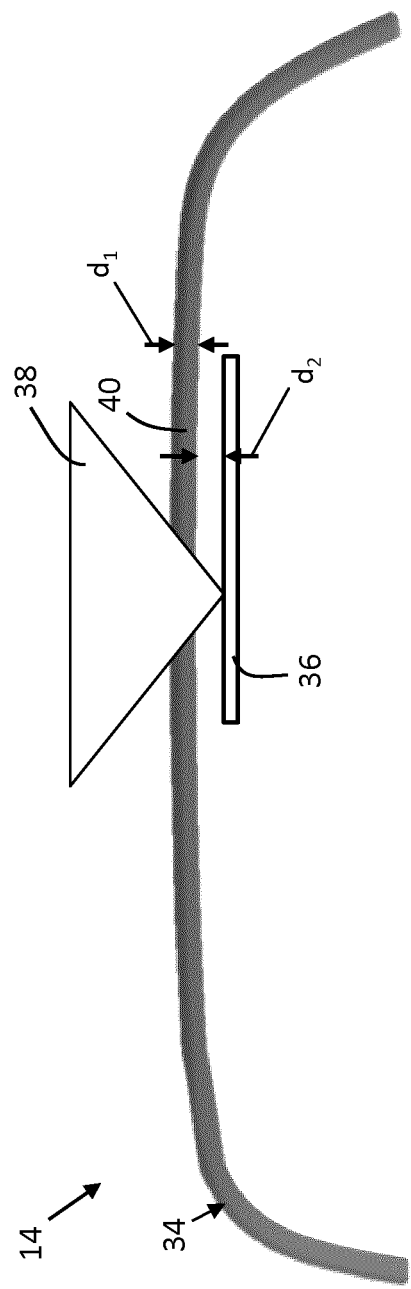

FIG. 3 is a cut-away top view of a portion of a handle assembly 14 in accordance with an embodiment of the disclosure. Specifically, the handle assembly 14 includes a handle cover 34 with a radar antenna 36 disposed therein and configured to generate and transmit radio frequency (RF) radiation 38 through the handle cover 34. Specifically, the RF radiation 38 propagates through a portion of the handle cover 34, which may be called a radome region 40. In order to optimize transmission of the RF radiation 38 through the handle cover 34, the radome region 40 may be configured to have a thickness with a predetermined first distance $d_1$ or an integer (n) multiple of the predetermined first distance $d_1$. The predetermined first distance $d_1$ may be determined to maximize radar transmission through the radome region 40. Likewise, the radar antenna 36 may be spaced apart from the radome region 40 by a predetermined second distance $d_2$ or an integer (n) multiple of the predetermined second distance $d_2$ to optimize transmission of the RF radiation 38 through the handle cover 34.

Figure 3A:
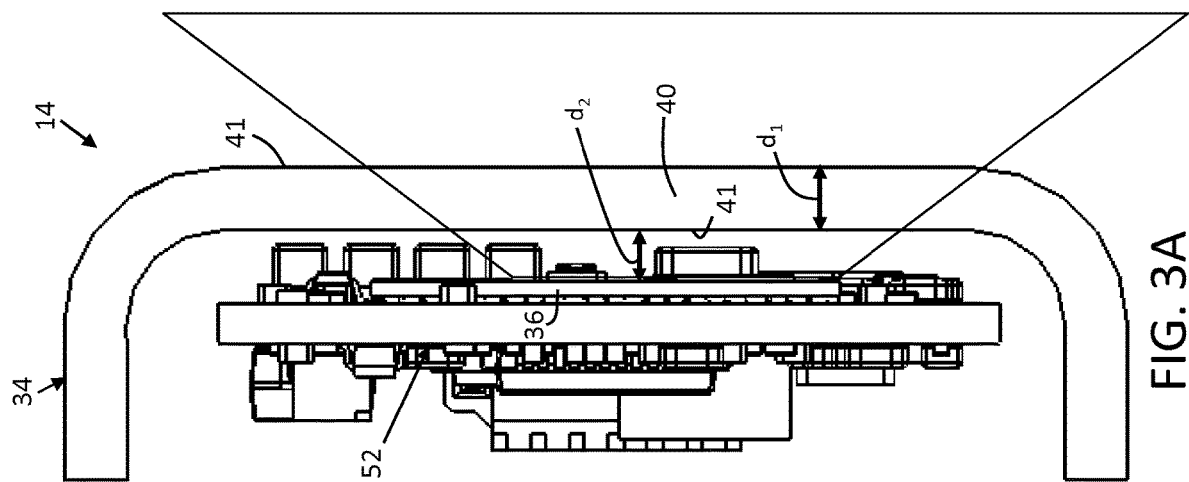

FIG. 3A is a cut-away side view of a portion of a handle assembly 14 in accordance with an embodiment of the disclosure. Specifically, FIG. 3A includes a radar module 52 disposed within the handle cover 34. The radome region 40 of FIG. 3A includes flat surfaces 41 extending parallel to the antenna 36 and parallel one another and spaced apart from one another by the predetermined first distance $d_1$. The radome region 40 is spaced apart from the antenna 36 by an air gap having the predetermined second distance $d_2$.

Figure 3B:
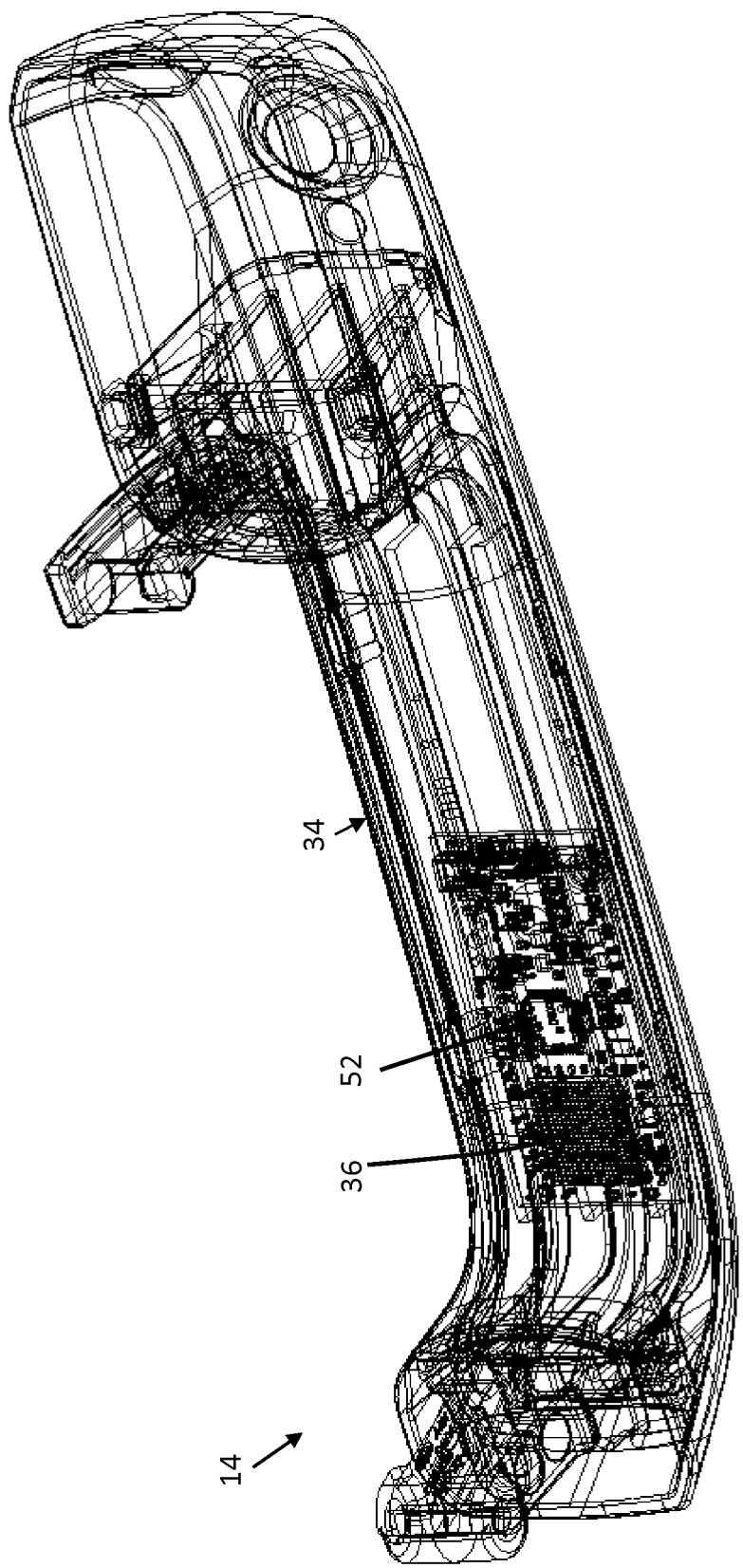
Figure 4:
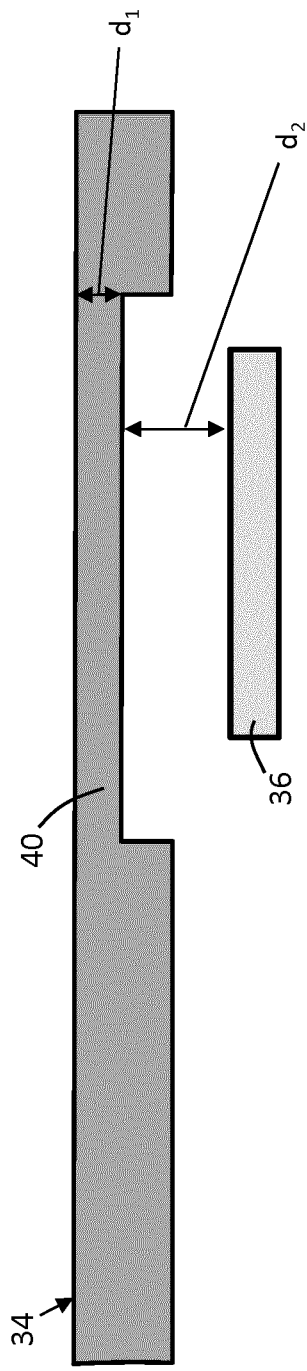

FIG. 3B is a perspective view of a partially transparent handle assembly 14 in accordance with an embodiment of the disclosure. Specifically, the handle assembly 14 includes the radar module 52 disposed within the handle cover 34, mounted near a front of the handle assembly 14, with the antenna 36 angled slightly forwards and downwards. FIG. 4 is a schematic cut-away top view of a handle assembly 14 in accordance with an embodiment of the disclosure, showing the radome region 40 being thinner than other regions outside of the radome region 40.

Figure 5:
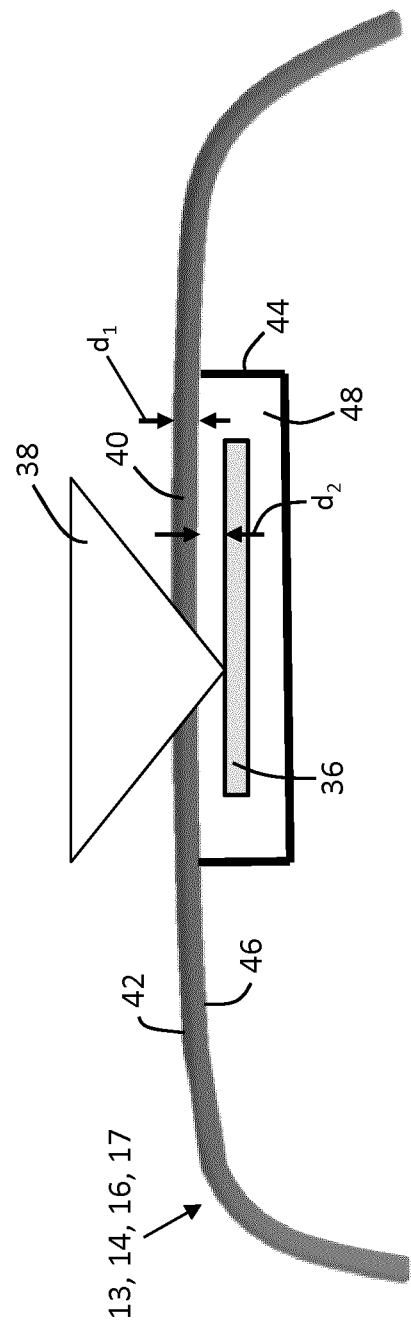

FIG. 5 is a cut-away top view of a vehicle exterior component 13, 14, 16, 17 in accordance with some embodiments of the disclosure. Specifically, the vehicle exterior component 13, 14, 16, 17 includes a class-A surface 42 that is intended to be directly viewed and/or touched by a user. In other words, the radome includes the class-A surface 42, so there is no air gap between the radome 40 and the class-A surface 42. A housing 44 is sealed against an interior surface 46 opposite the class-A surface 42. The housing 44 defines an interior space 48 configured to hold the radar antenna 36. The housing 44 may be configured to be watertight to prevent moisture from affecting the radar antenna 36.

Figure 8:
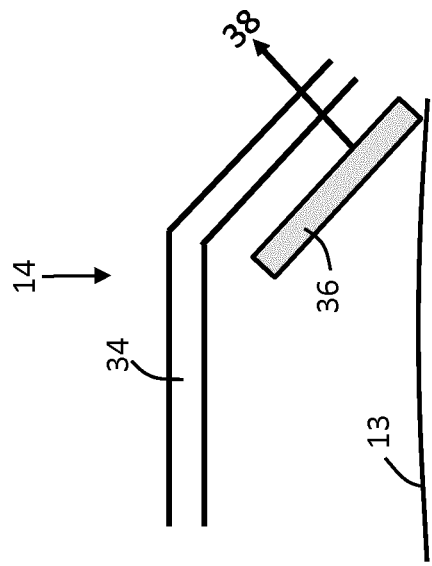
Figure 7:
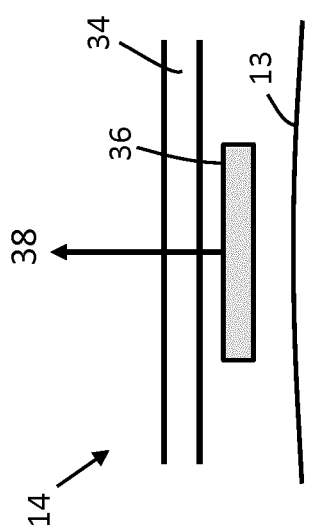
Figure 6:
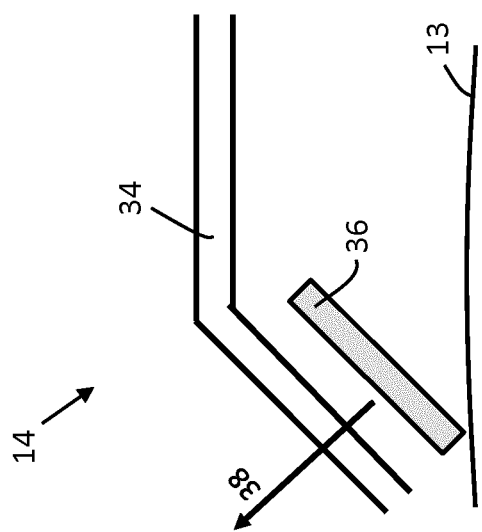

FIGS. 6-8 each show a cut-away top view of a portion of a handle assembly 14 in accordance with embodiments of the disclosure. Specifically, FIG. 6 shows the radar antenna 36 configured to project the RF radiation 38, which may also be called "Radar Emission", in a rearward direction at an oblique angle to the outer panel 13 of a door of the vehicle 12. In other words, the configuration shown in FIG. 6 allows the radar antenna 36 to have a field of view that is focused toward a rear area of the vehicle 12, and the configuration shown in FIG. 8 allows the radar antenna 36 to have a field of view that is focused toward a front area of the vehicle 12. FIG. 7 shows the radar antenna 36 configured to project the RF radiation 38 outwardly and perpendicularly to the outer panel 13 of a door of the vehicle 12. FIG. 8 shows the radar antenna 36 configured to project the RF radiation 38 in a forward direction at an oblique angle to the outer panel 13 of the door of the vehicle 12.

Figure 10:
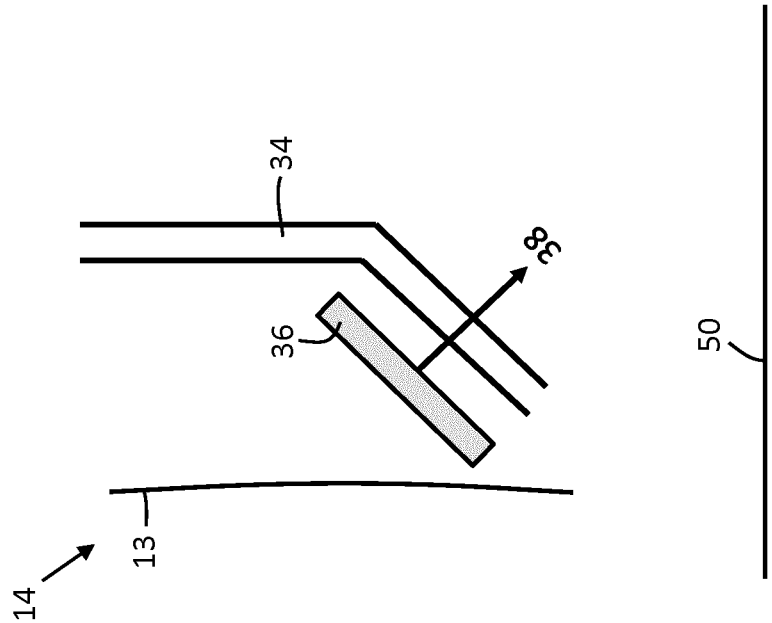
Figure 9:
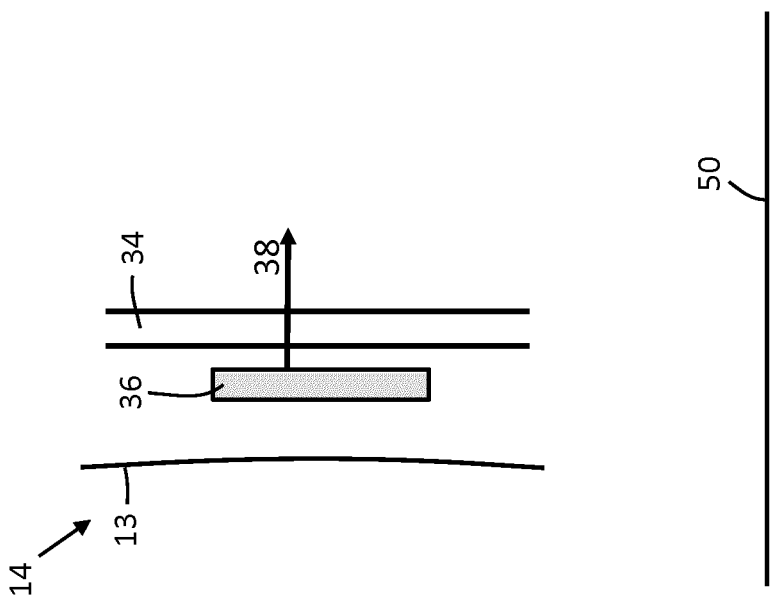

FIGS. 9-10 each show a cut-away side view of a portion of a handle assembly 14 in accordance with embodiments of the disclosure. Specifically, FIG. 9 shows the radar antenna 36 configured to project the RF radiation 38 perpendicularly to the outer panel 13 and outwardly parallel to a ground surface 50. FIG. 10 shows the radar antenna 36 configured to project the RF radiation 38 at an oblique angle to the outer panel 13 and downwardly toward the ground surface 50. In other words, the configuration shown in FIG. 10 allows the radar antenna 36 to have a field of view that is focused on or near a lower area of the vehicle.

FIGS. 11-13 are cut-away side views of a handle assembly 14 in accordance with embodiments of the disclosure. Specifically, FIG. 11 shows the radar antenna 36 disposed within a central portion of the handle cover 34 and tilted downwardly relative thereto. FIG. 12 shows the radar antenna 36 disposed within a lower portion of the handle cover 34 and tilted downwardly relative thereto. FIG. 13 shows the radar antenna 36 disposed within a central portion of the handle cover 34 and extending generally parallel thereto.

FIGS. 14-16 are cut-away top views of a handle assembly 14 in accordance with embodiments of the disclosure. Specifically, FIG. 14 shows the radar antenna 36 disposed within a forward portion of the handle cover 34 and tilted forward relative thereto. FIG. 15 shows the radar antenna 36 disposed within a rearward portion of the handle cover 34 and tilted rearward relative thereto. FIG. 16 shows the radar antenna 36 disposed within a central portion of the handle cover 34 and extending generally parallel thereto.

Figure 17:
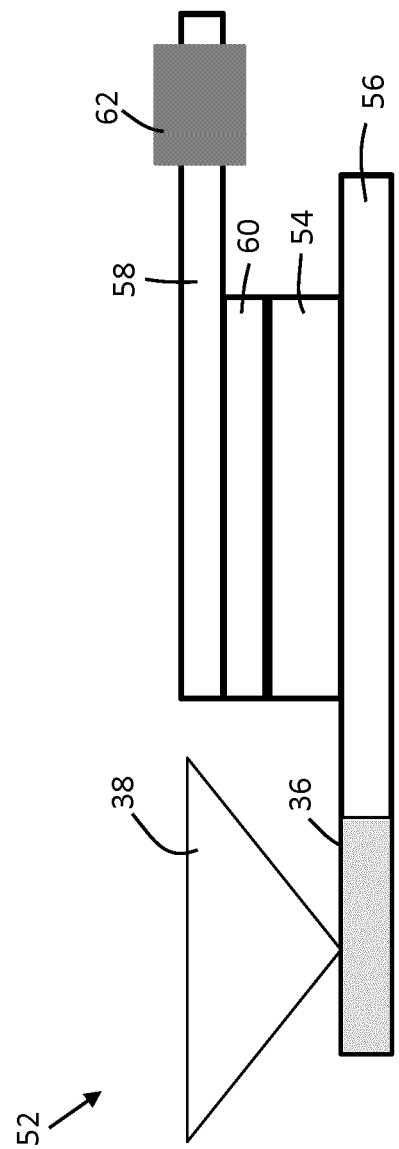

FIG. 17 is a block diagram showing approximate relative size and placement of components of a radar module 52 in accordance with aspects of the disclosure. Specifically, the radar module 52 includes the radar antenna 36, which is illustrated as a single device, but which may include two or more devices, and a heat source 54 disposed upon a printed circuit board (PCB) 56. The heat source 54 may include one or more microchips, such as one or more microprocessors or microcontrollers for controlling various aspects of the radar module 52. Alternatively or additionally, the heat source 54 may include one or more circuits configured to generate and/or receive radio frequency (RF) energy, such as a transceiver. The heat source 54 may include one or more electrical connections to the radar antenna 36 that may be carried by the PCB 56. As also shown in FIG. 17, a heat sink 58 overlies the heat source 54 and is configured to convey heat away from the heat source 54 to prevent overheating due to excess temperatures. The heat sink 58 may include one or more of: a solid block of metal, such as copper or aluminum; a block of metal, such as copper or aluminum with heat fins; one or more copper heat pipes; one or more copper heat pipes with heat fins attached thereto; a foam of aluminum and/or ceramic; a thermally conductive plastic; and/or a stamped metal plate, such as a part of an enclosure.

A thermal paste 60, such as a grease containing thermally conductive particles, is disposed between the heat source 54 and the heat sink 58 to improve thermal conduction therebetween. As shown in FIG. 17, the heat sink 58 extends generally parallel to the PCB 56 and protrudes in a direction away from the radar antenna 36 so that it does not block or interfere with the transmission of the RF radiation 38. One or more fins 62, which may be made of metal or other thermally conductive material, extends from the heat sink 58 at a portion thereof spaced away from the radar antenna 36 to further convey the heat away from the heat source 54 and to transfer that heat to the ambient atmosphere. One or more of the components, such as the thermal paste 60, may be shown larger than actual size for purposes of illustration.

Figure 18:
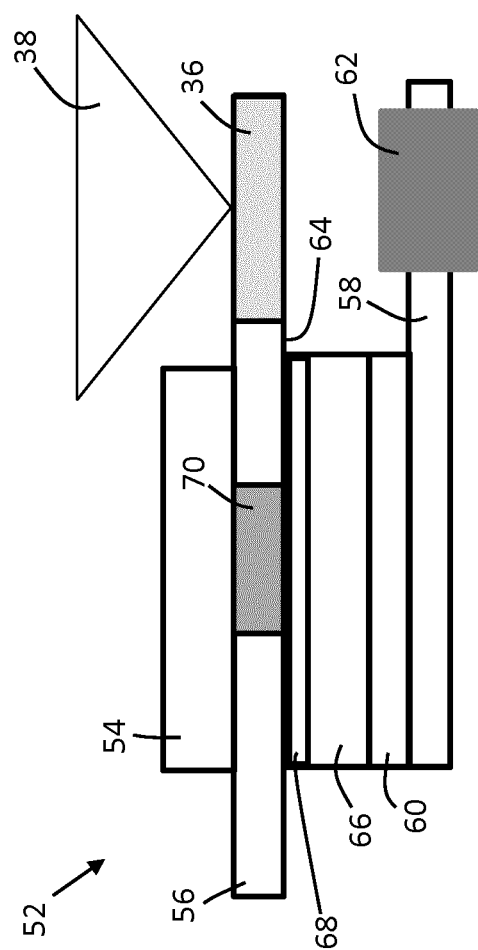

FIG. 18 is a block diagram showing approximate relative size and placement of components of a radar module 52 in accordance with aspects of the disclosure. The configuration shown in FIG. 18 is similar to the configuration of FIG. 17, but with a few differences. Specifically, the heat sink 58 is disposed upon an opposite side of the PCB 56 from the heat source 54. In other words, the heat sink 58 extends generally parallel to and spaced apart from the heat source 54, with the PCB 56 disposed therebetween. In this configuration, the heat sink 58 faces a rear side 64 of the PCB 56 that is opposite (i.e. facing away from) the RF radiation 38 projected from the radar antenna 36 through a field of view. A thermal foam 66 extends between the PCB 56 and the heat sink 58 for transmitting heat therebetween. The thermal foam 66 may be comprised of a material having a high thermal conductivity. In some embodiments, the thermal foam 66 may be an electrical insulator. The thermal foam 66, thus conducts heat away from the heat source 54 while filling gaps between components. In some embodiments, the thermal foam 66 may be slightly compressed when the radar module 52 is assembled, thus providing a biasing force to maintain thermal contact between the thermal foam 66 and each of the heat source 54 (or a thermally-conductive structure in contact therewith), and the heat sink 58. The thermal foam 66 may provide some mechanical flex while conducting heat therebetween. One or more electrical components 68, such as resistors, capacitors, etc. may be disposed upon the rear side 64 of the PCB 56. The PCB 56 includes a metal backing 70, that may include copper or other thermally conductive material, and which may extend through the PCB 56. The metal backing 70 increases thermal conductance through the PCB 56 from the heat source 54 to the heat sink 58. In some embodiments, the metal backing 70 may function as an electrical conductor within the PCB, such as a ground plane. Together, the thermal paste 60 and the thermal foam 66 between the metal backing 70 and the heat sink 58 may allow the heat sink 58 to be spaced away from the PCB 56, thus preventing the heat sink 58 from short circuiting or otherwise adversely interfering with electrical components on the PCB 56. In some embodiments, and as shown in FIG. 18, the fins 62 may be disposed directly beneath the radar antenna 36 opposite from the RF radiation 38 projected therefrom. One or more of the components, such as the thermal paste 60, may be shown larger than actual size for purposes of illustration.

Figure 19:
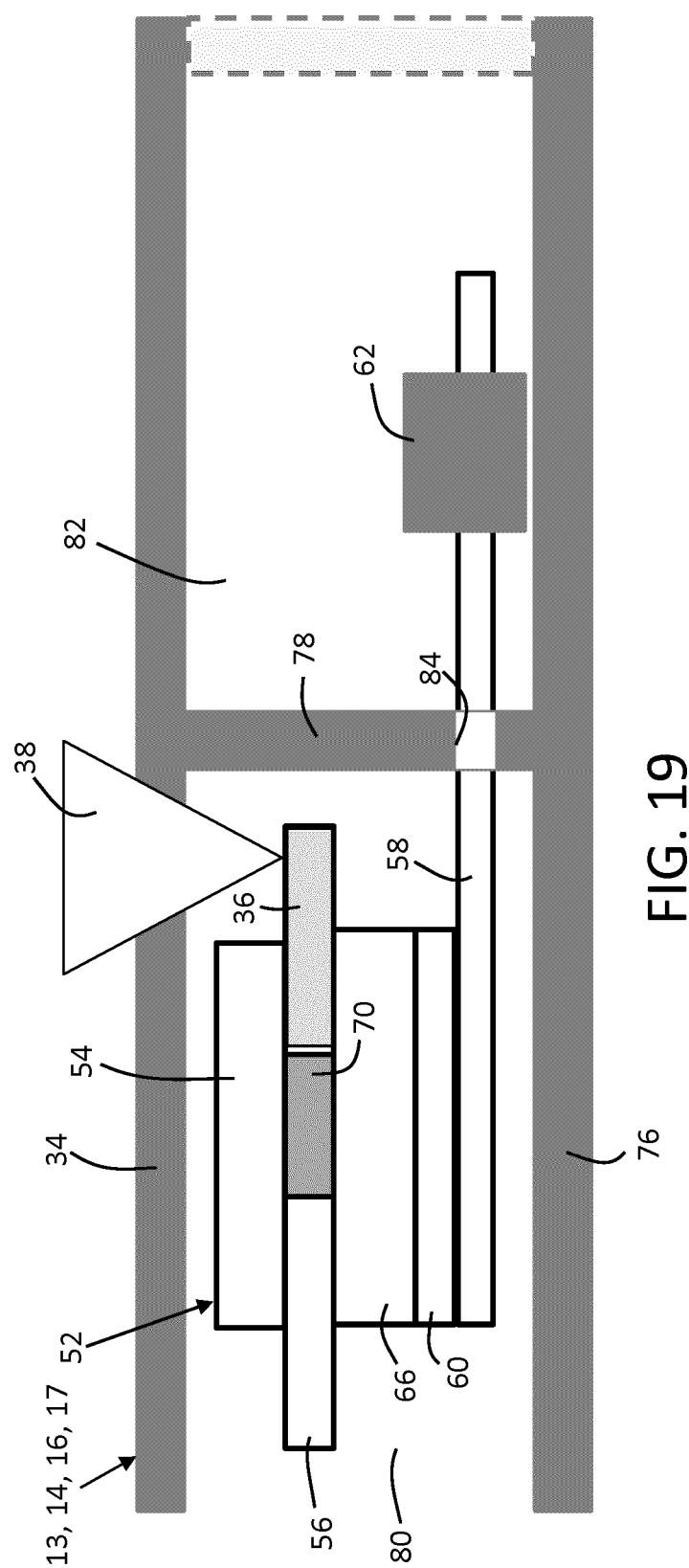

FIG. 19 is a block diagram showing approximate relative size and placement of components of a radar module 52 within a vehicle exterior component 13, 14, 16, 17 in accordance with aspects of the disclosure. FIG. 19 shows the radar module 52 disposed beneath a cover 34, such as a handle cover 34, where the exterior component 13, 14, 16, 17 is a handle assembly 14. Specifically, the radar module 52 is disposed between the cover 34 and a floor 76 that extends parallel to the cover 34. A partition 78 extends perpendicularly to the cover 34 between the cover 34 and the floor 76 to divide a main compartment 80 from a cooling compartment 82. Cooling compartment 82 may also be a sealed compartment illustrated by enclosed structure with a wall in phantom lines enclosing the compartment 82, to prevent debris, dust, dirt, and water, ice, and so forth, from entering into the compartment 82 to fill the compartment space and reduce the cooling volume. Sealing the cooling compartment 82 further prevents debris and the like from entering into contact (for example, cover or coat) with the heat dissipation elements 62, thereby reducing the heat dissipating effectiveness of the heat transfer device. Cooling compartment 82 may be further provided in a sealed relation to main compartment 80 so that any heat transferred from compartment 80 to cooing compartment by the heat transfer device does not return back into the main compartment 80. The partition 78 may take the form of a sealed dividing wall of an insulative material, and may be disposed in various locations within the vehicle exterior component 13, 14, 16, 17. The heat source 54 and the radar antenna 36 are disposed within the main compartment. The heat sink 58 extends through an aperture 84 in the partition 78 and into the cooling compartment 82 and is in thermal contact with one or more fins 62 that are located within the cooling compartment 82. Thus, the heat sink 58 functions to convey heat away from the heat source 54 in the main compartment 80 and to remove the heat into the cooling compartment 82. The fins 62 may dissipate the heat from the heat sink 58 to ambient air or another medium. The example configuration provided in FIG. 18 may provide for the main compartment 80 to be maintained at a lower temperature than would be possible if the fins 62 were in the main compartment 80. One or more of the components, such as the thermal paste 60, may be shown larger than actual size for purposes of illustration.

Figure 20:
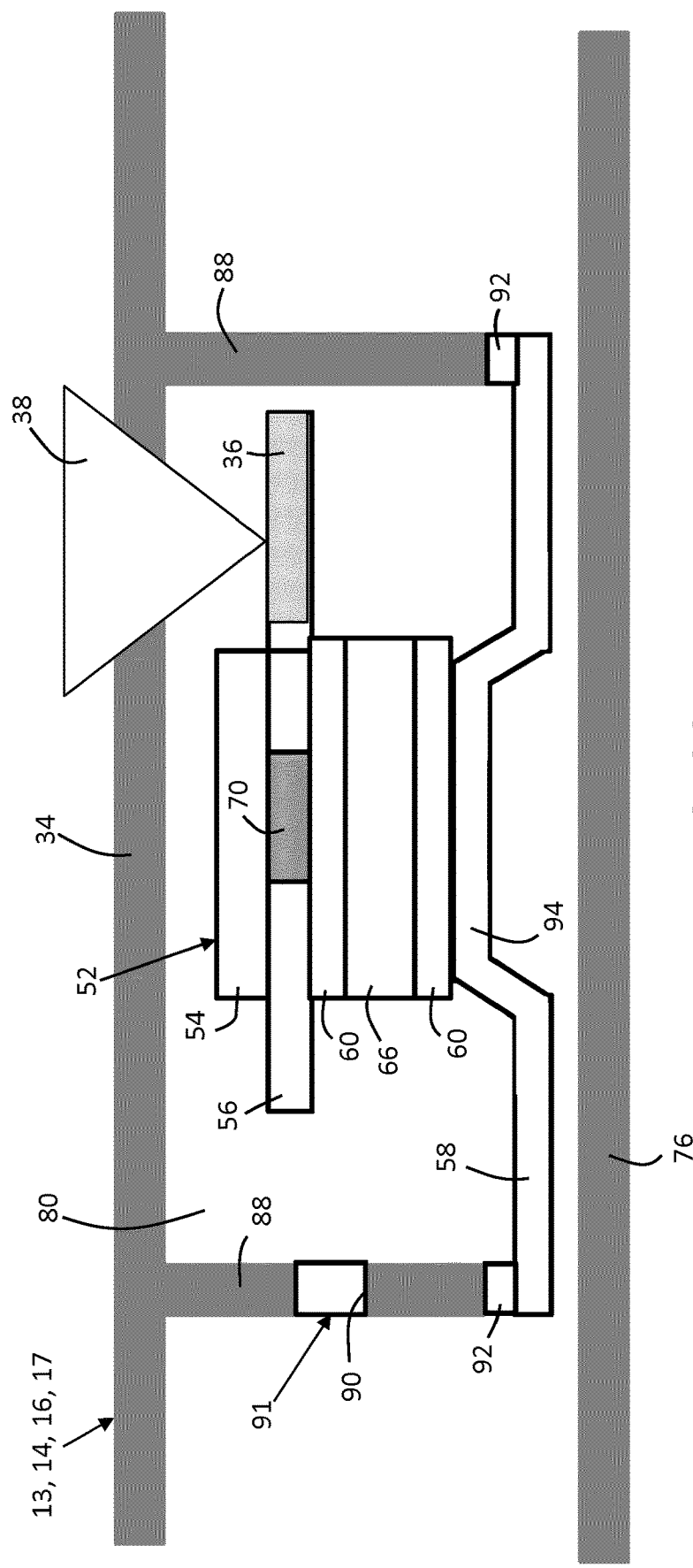

FIG. 20 is a block diagram showing approximate relative size and placement of components of a radar module 52 within a vehicle exterior component 13, 14, 16, 17 in accordance with aspects of the disclosure. FIG. 20 shows the radar module 52 disposed beneath a cover 34, such as a handle cover 34, where the exterior component 13, 14, 16, 17 is a handle assembly 14. Specifically, the radar module 52 is disposed between the cover 34 and a floor 76, such as a handle bottom where the exterior component 13, 14, 16, 17 is a handle assembly 14. A peripheral wall 88 extends perpendicularly to the cover 34 around the radar module 52 and defining the main compartment 80. The heat sink 58 functions as a back cover by spanning the peripheral wall 88 opposite from the handle cover 34 and thereby enclosing the main compartment 80 containing the radar module 52. Various different materials may be used for the heat sink 58 such as, for example, aluminum, copper, or cast magnesium. The peripheral wall 88 may define a hole 90 with a grommet for passing wires or other electrical conductors therethrough for connecting the radar module 52 to a power source and/or to external devices. A grommet 91 is disposed in the hole 90 for sealing with the wires and for protecting wires passing therethrough from scraping or chaffing on the peripheral wall 88. The grommet 91 may seal the hole 90, preventing moisture or other contaminants from entering the main compartment 80. A module seal 92, or gasket, extends between the peripheral wall 88 and the heat sink 58 to form a seal therebetween and for preventing moisture or other contaminants from entering the main compartment 80. The heat sink 58 may include an indented portion 94 that protrudes into the main compartment 80 and to contact the radar module 52 for conducting heat therefrom. One or more of the components, such as the thermal paste 60, may be shown larger than actual size for purposes of illustration.

Figure 20A:
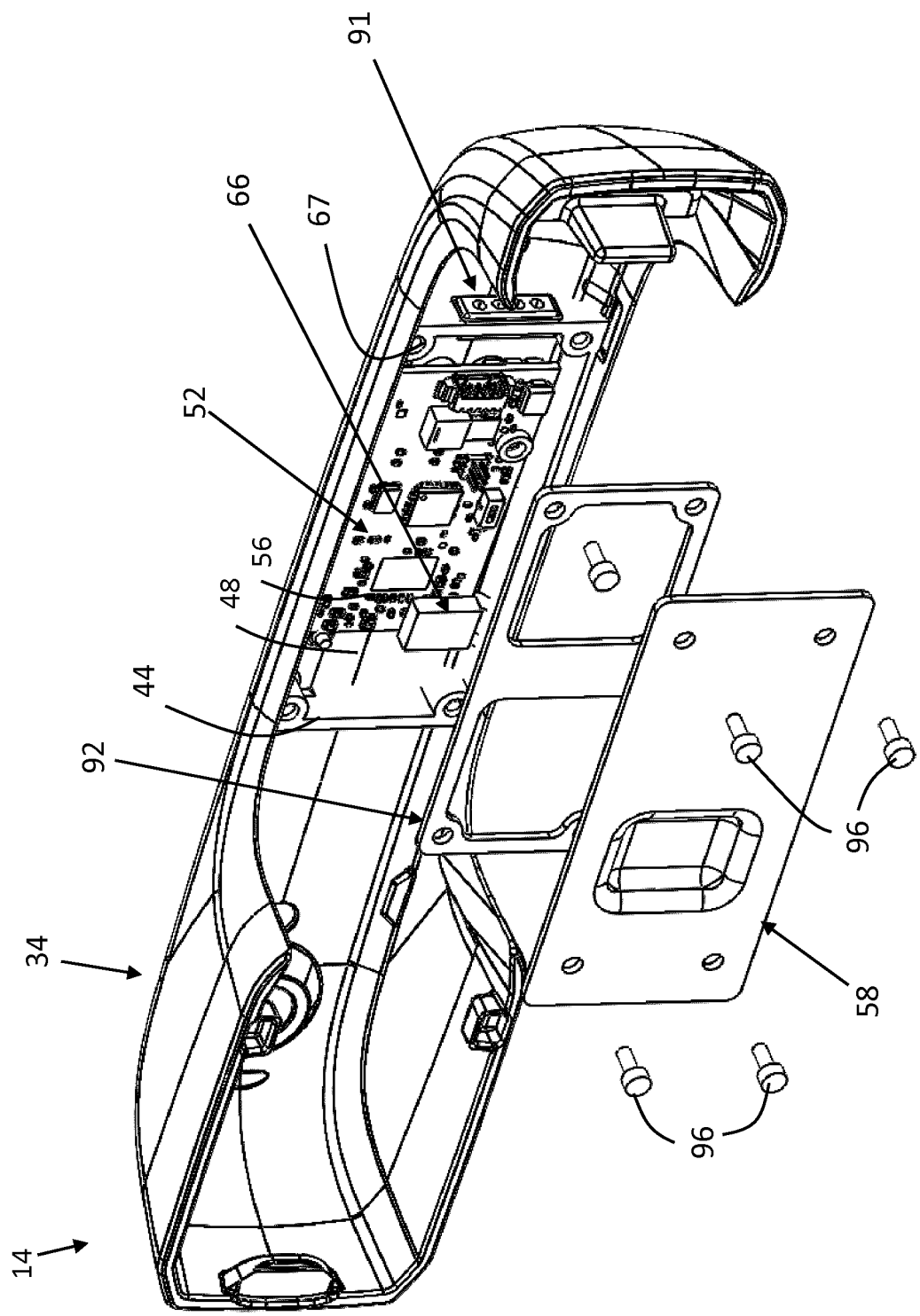

FIG. 20A is an exploded perspective view of a radar module 52 within a vehicle component 13, 14, 16, 17 in accordance with aspects of the disclosure. Specifically, FIG. 20A shows a radar module 52 within a handle assembly 14. The heat sink 58 serves as a cover for enclosing the housing 44 of the radar module 52. A module seal 92 is disposed between the heat sink 58 and the housing 44 sealing the radar module 52. The module seal 92 may be formed of a resilient material to deform and to form a seal between the heat sink 58 and the housing 44. The seal may be watertight or water resistant. In some embodiments, the seal may be configured to prevent dust or other particulate from entering the interior space 48 of the housing 44. The module seal 92 is shown as a flat gasket, but the module seal 92 may take other forms, such as an O-ring or a molded gasket. A plurality of fasteners 96, such as screws or bolts, secures the heat sink 58 to the housing 44. The housing 44 includes a plurality of bosses 67 configured to receive the fasteners 96. Additional bosses (not shown) may be provided for securing the PCB 56 within the interior space 48 of the housing 44. The housing 44 may be configured with an ability to adjust a tilt, such as the pitch, yaw, and/or roll of the PCB 56 within the housing 44. Additionally or alternatively, the housing 44 may be configured with an ability to adjust the positioning of the PCB 56 relative to a radome material.

Figure 20B:
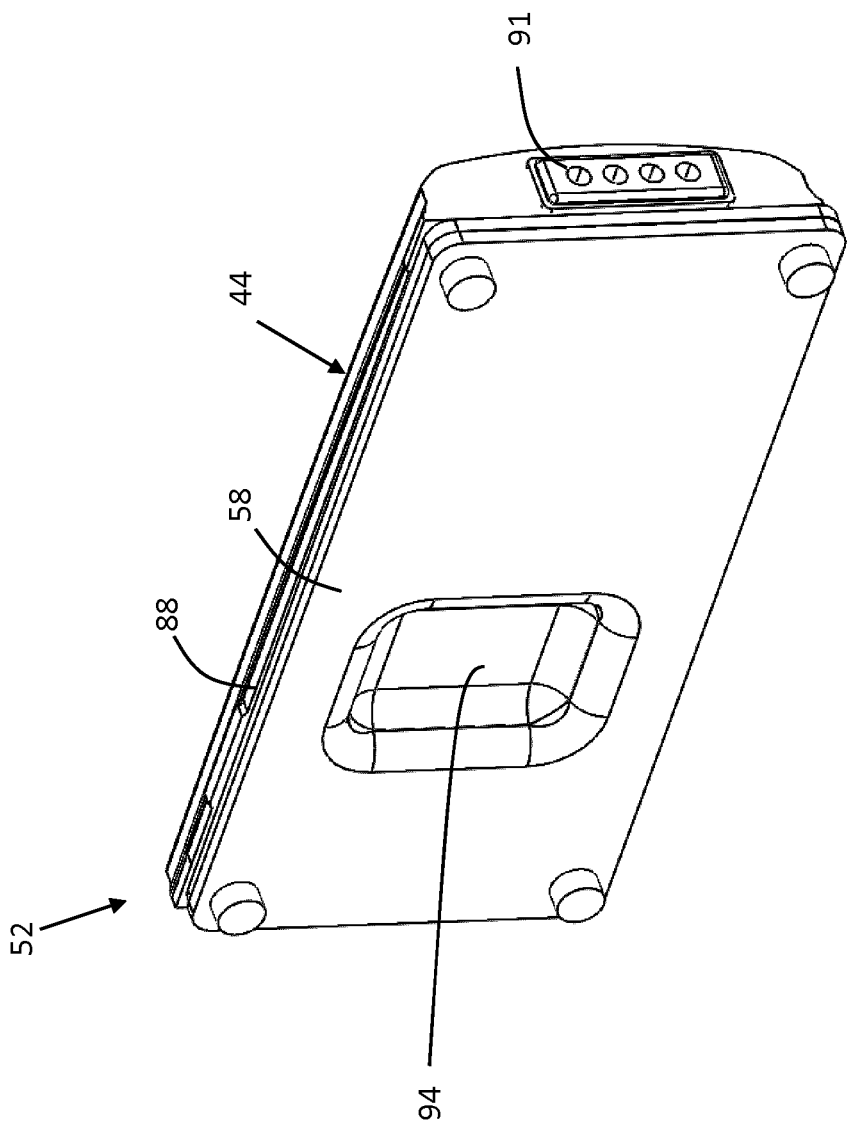

FIG. 20B is a perspective view of a radar module 52 in accordance with aspects of the disclosure. Specifically, the radar module 52 includes a housing 44 of molded material, such as plastic or Fiber-reinforced plastic (FRP). The housing 44 may be integrally formed with a molded part of a vehicle component 13, 14, 16, 17, such as a handle assembly 14. FIG. 20B shows the indented portion 94 of the heat sink 58. The indented portion may be integrally formed with the heat sink 58, for example, where the heat sink 58 is formed of stamped or cast metal, such as steel or aluminum. In some embodiments, and as shown in FIG. 20B, the heat sink 58 functions as a rear seal for enclosing the housing 44 of the radar module 52. In some embodiments, the heat sink 58 comprises two or more pieces of stamped aluminum.

Figure 20C:
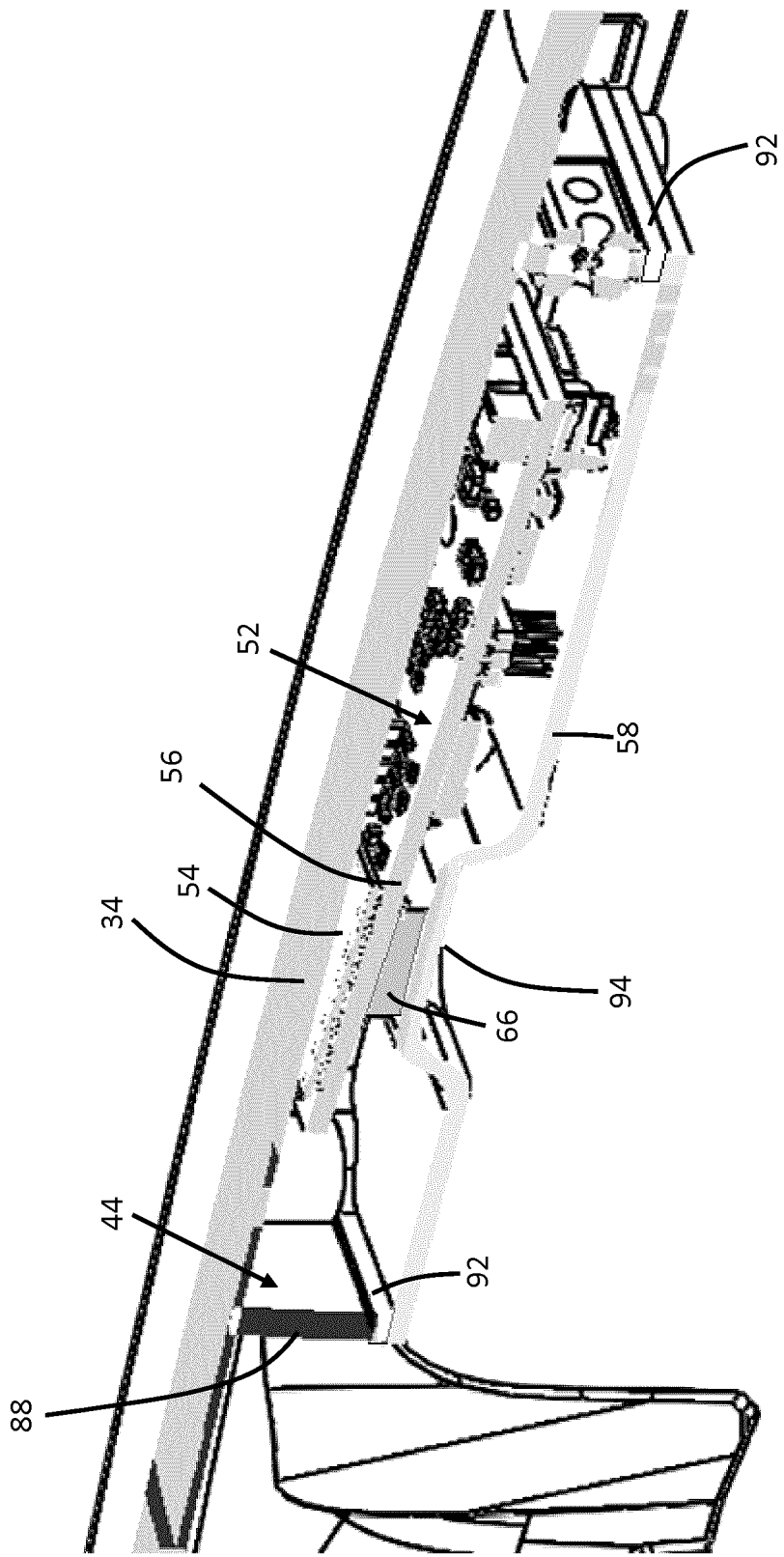

FIG. 20C is a sectional view of a radar module 52 within a vehicle component 13, 14, 16, 17 in accordance with aspects of the disclosure. Specifically, FIG. 20A shows a radar module 52 within a handle assembly 14. As shown in FIG. 20C, a piece of thermal foam 66 is compressed to conduct heat from the heat source 54, such as a radar transceiver, which may also be called a "radar chip". The thermal foam 66 is in thermal contact with the indented portion 94 of the heat sink 58. The thermal foam 66 provides for heat to be transferred to the heat sink 58, while allowing some variation in position of the PCB 56 within the housing 44. In some embodiments, the housing 44 is fully sealed, and ventilation is not required. For example, the radar module 52 is configured such that the heat sink 58 is able to dissipate sufficient heat from the heat source 54 to maintain the temperature of all components at or below rated temperatures for those components.

Figure 20D:
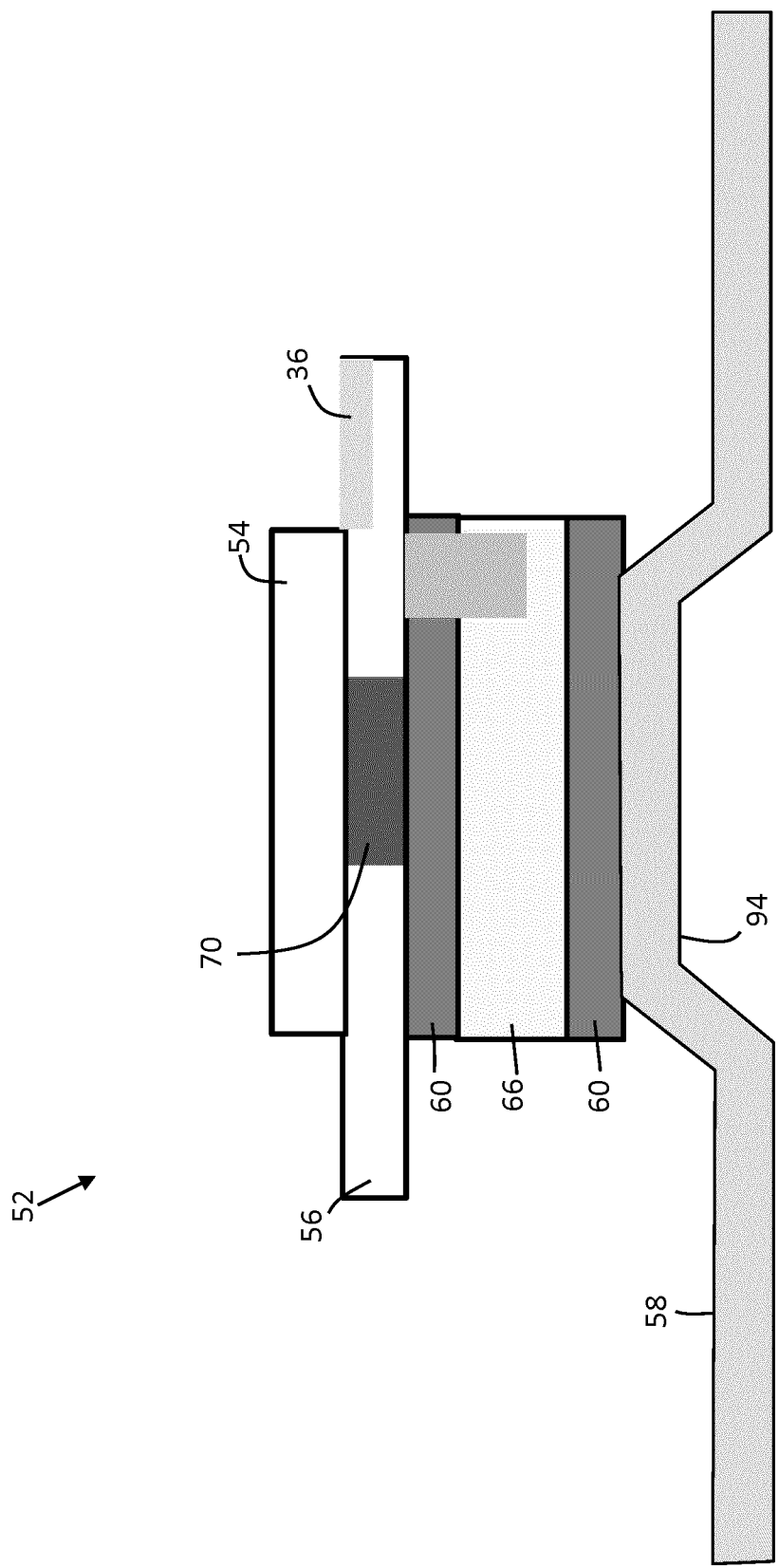

FIG. 20D is a sectional schematic diagram of a radar module 52 in accordance with aspects of the disclosure. FIG. 20D shows the metal backing 70, which may be formed using copper or a copper alloy that extends through the PCB 56 for conducting heat away from the heat source 54, such as a radar transceiver, which is mounted upon the PCB 56. In some embodiments, the metal backing 70 takes the form of a copper pad that is incorporated into the layout of the PCB 56. For example, the PCB 56 may include one or more cutouts or vias extending therethrough, which are filled with copper or another thermally-conductive material, such as metal, for conducting heat from one side of the PCB 56 to an opposite side. Thermal paste 60 and/or thermal foam 66 extends between the PCB 56 and the heat sink 58 for conducting heat therebetween. In some embodiments, the thermal foam 66 covers all or most of the metal backing 70 for conducting heat therefrom. In some embodiments, and as shown in FIG. 20D, the thermal foam 66 extends over a tallest component mounted to the PCB, thus covering the PCB and components attached thereto and bridging a gap therebeyond to the heat sink 58. In some embodiments, the heat sink 58 is formed of stamped aluminum. The heat sink may be formed of other thermally-conductive materials.

FIG. 20E is a front view of a PCB 56 of a radar module 52 in accordance with aspects of the disclosure. FIG. 20F is a rear view of the PCB 56 of FIG. 20E. Specifically, FIGS. 20E and 20F show the metal backing 70 on the rear side of the PCB directly opposite from a RADAR transceiver (i.e. the heat source 54).

Figure 21:
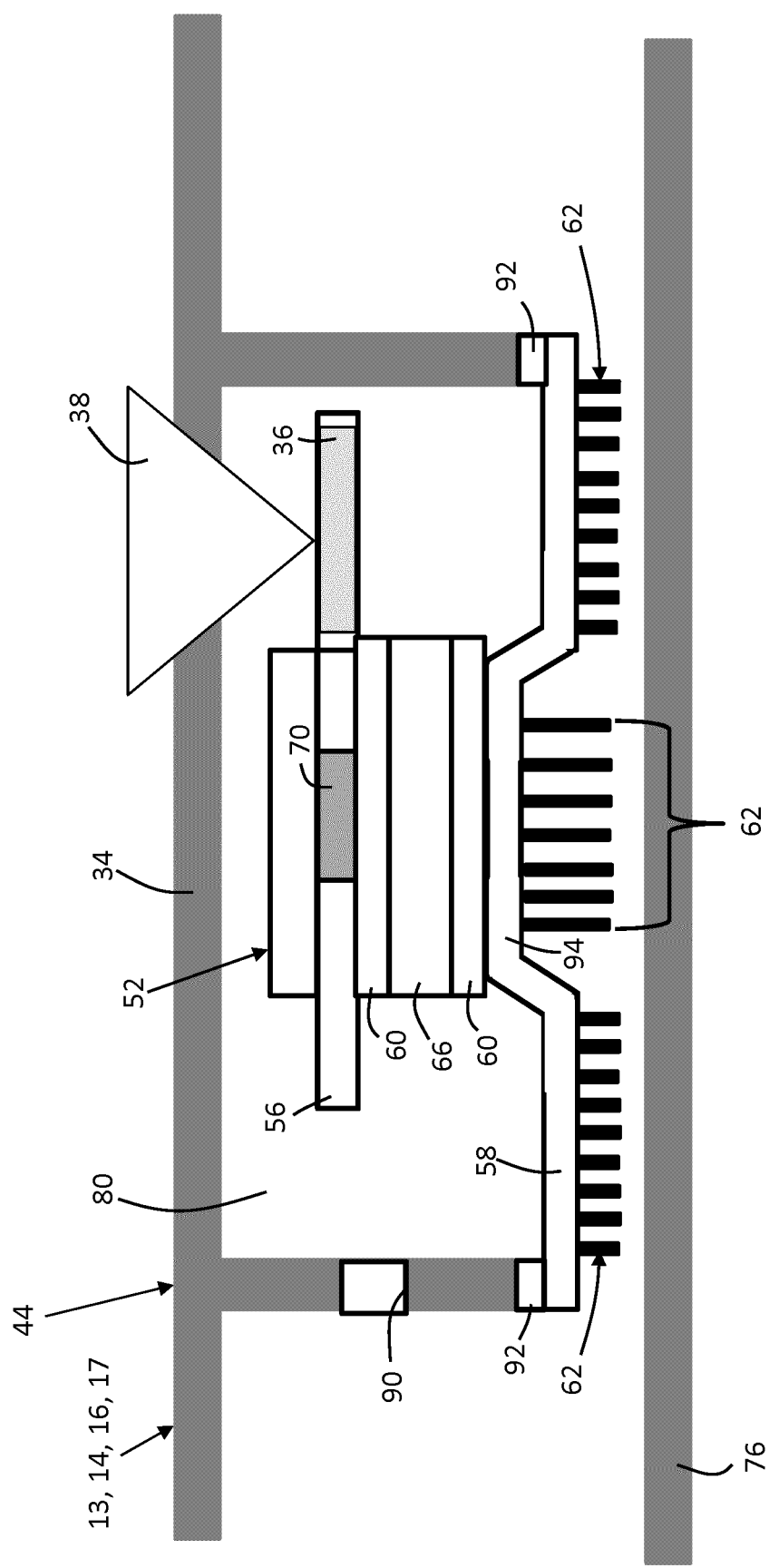
FIG. 21 is a sectional schematic diagram showing approximate relative size and placement of components of a radar module within a vehicle component in accordance with aspects of the disclosure.

FIG. 21 is a block diagram showing approximate relative size and placement of components of a radar module 52 within a vehicle exterior component 13, 14, 16, 17 in accordance with aspects of the disclosure. FIG. 21 is similar to the configuration of FIG. 20, but with the addition of fins 62 on an outside surface of the heat sink 58, outside of the main compartment 80 to convey heat therefrom and away from the radar module 52. In some embodiments, the fins 62 may be cast, cut, or otherwise manufactured to protrude from the heat sink 58 outside of the main compartment. As shown in FIG. 21, the fins 62 may protrude from a peripheral area of the heat sink 58 adjacent the peripheral wall 88 and/or from the indented portion 94 of the heat sink 58. One or more of the components, such as the thermal paste 60, may be shown larger than actual size for purposes of illustration.

In some embodiments, the vehicle exterior component 13, 14, 16, 17 includes a heat transfer device configured to transfer heat away from the radar module 52. In some embodiments, the radar module 52 includes a radar IC 36 and a printed circuit board 56, and the heat transfer device is a heat sink 58 disposed on an opposite side of the printed circuit board 56 from the radar IC 36.

Figure 22:
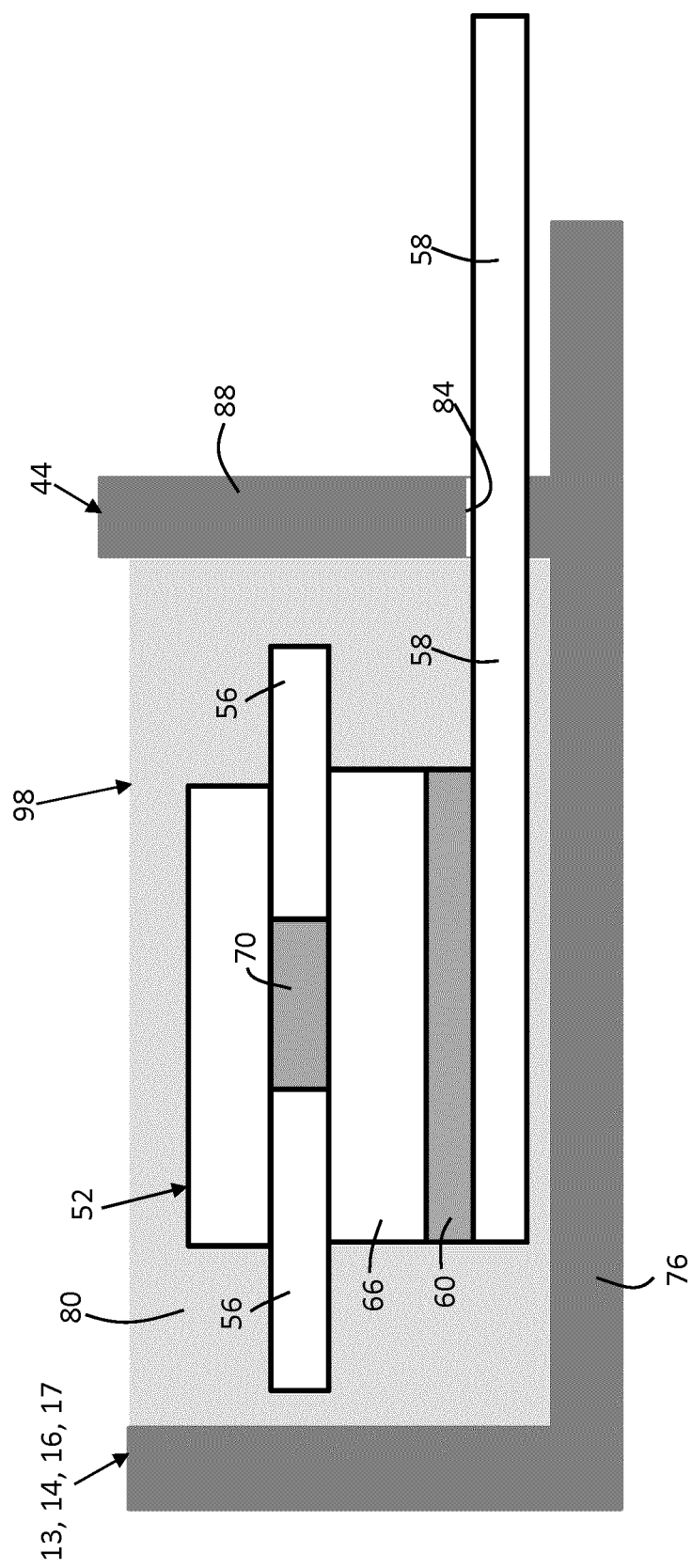
FIG. 22 is a sectional schematic diagram showing approximate relative size and placement of components of a radar module within a vehicle component in accordance with aspects of the disclosure.

FIG. 22 is a block diagram showing approximate relative size and placement of components of a radar module 52 within a vehicle component 13, 14, 16, 17 in accordance with aspects of the disclosure. FIG. 22 is similar to the configuration shown in FIG. 19, with the heat sink 58 extending through an aperture 84. However, the aperture 84 of FIG. 22 is defined by the peripheral wall 88. In other words, the heat sink 58 extends out of the main compartment 80 that contains the heat source 54 and the printed circuit board 56. In some embodiments, the radar module 52 may be coated with a conformal coating and/or a potting compound 98 to prevent moisture or other contaminants from contacting the radar module 52. FIG. 22 shows one configuration shown in FIG. 22, the main compartment 80 is filled with a potting compound 98, such as polyurethane, epoxy resin and/or silicone resin. The potting compound 98 may also function to hold the radar module 52 securely with the structure of the vehicle component 13, 14, 16, 17. One or more of the components, such as the thermal paste 60, may be shown larger than actual size for purposes of illustration.

Figure 23:
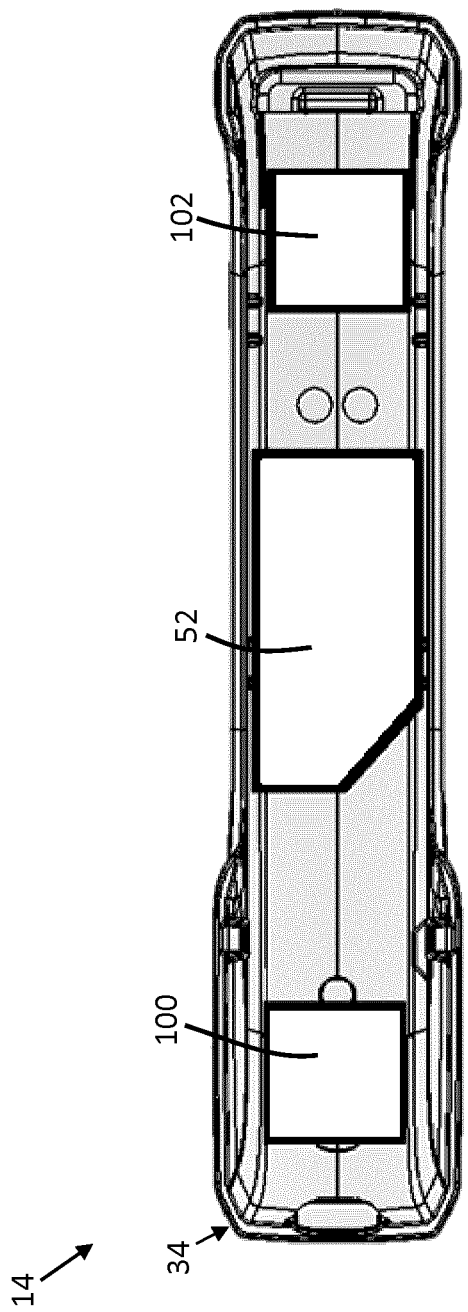
FIG. 23 is a side view of a handle assembly in accordance with aspects of the disclosure.

FIG. 23 is a side view of a handle assembly 14 with the handle cover 34 removed. Specifically, FIG. 23 shows the radar module 52, which may also be called the "Radar Board" disposed in a central portion of the handle assembly 14 between an unlocking button 100 and a force-sensitive button 102, which may be used, for example, to control an actuator for opening or closing a vehicle closure associated with the handle assembly 14. It should be appreciated that a similar handle assembly 14 may be provided without the either or both of the unlocking button 100 and/or the force-sensitive button 102. For example, the subject radar module 52 may be integrated within a handle assembly 14 without any other electronic or electrical user interface devices (such as buttons or lights). Also, either or both of the unlocking button 100 and/or the force-sensitive button 102 may have a different physical location or configuration. Furthermore, a different user interface device, such as a visual or audible feedback device (e.g. a light, a speaker, buzzer, or beeper) may be provided in place of either or both of the unlocking button 100 and/or the force-sensitive button 102 in the handle assembly 14.

In some embodiments, the radar module 52 may be combined with to complement functionalities of other systems or devices. For example, the small package size of the radar module 52 may allow for multiple sensors to be mounted inside of a handle. Those multiple sensors may include, for example, a force-sensitive button 102, a capacitive sensor, a traditional unlocking button 100, etc. The radar module 52 may function as a wakeup signal to activate unlocking features. In some embodiments, a signal from one or more of the other buttons 100, 102 may be used to activate NCOD functionality of the radar module 52.

FIGS. 23A and 23B show is a perspective views of a handle assembly 14 in accordance with aspects of the disclosure. Specifically, FIG. 23A shows a handle assembly 14 in which the housing 44 is integrally molded with the handle cover 34 as a single outer housing 44. This arrangement may provide for a reduced number of components when compared with other designs that have a housing that is formed separately from the handle cover 34. FIG. 23B shows a handle assembly in which the housing 44 is formed separately from the handle cover 34 and is attached thereto. For example, the housing 44 may be attached with an adhesive or by welding. In other words, the handle assembly shown in FIG. 23B includes fitting a fully-enclosed or partially-enclosed radar module 52 to an existing door handle 14. In some embodiments, and as shown in FIG. 23B, the door handle 14 does not include any special features for receiving the radar module 52. This arrangement may provide for a handle cover 34 with fewer modifications or custom design features to accommodate the radar module 52.

FIGS. 24-27 each show sectional schematic diagrams illustrating approximate relative size and placement of components of a radar module 52 in accordance with aspects of the disclosure. FIG. 24 shows a schematic cut-away view of a radar module 52 similar to the arrangement of FIG. 20, but with a coating of potting compound 98 that is thermally conductive, covering a rear side of the heat sink 58, opposite from the PCB (56). The potting compound 98 may function both as a sealing material to prevent moisture or other contaminants from contacting the radar module 52, and as a thermal conductor to conduct heat from the heat sink to the surroundings. In some embodiments, the potting compound 98 may be used to supplement or in place of the grommet 91 to seal the hole 90 in the housing 44.

FIG. 25 is similar to FIG. 24, but with the addition of a heat dissipation structure 62, 106, 108 in the form of a thermal mass 106 in contact with the heat sink 58 and extending from the rear side thereof for conducting heat away from the heat source 54. In some embodiments, and as shown on FIG. 25, the additional thermal mass 106 protrudes through the potting compound 98 and, thus, is able to transfer heat directly to another part and/or to ambient atmosphere.

FIG. 26 is similar to FIG. 25, but where the heat dissipation structure 62, 106, 108 takes the form of a protrusion 108 of the heat sink 58. More specifically, the protrusion 108 extends from the back of the heat sink 58, opposite from the direction of the indented portion 94 and through the potting compound 98. In some embodiments one or both of the indented portion 94 and/or the protrusion 108 are integrally formed with the heat sink 58. For example, the indented portion 94 and/or the protrusion 108 may be formed by stamping the heat sink 58. In some embodiments, either or both of the indented portion 94 and/or the protrusion 108 may be cast into the heat sink 58. In other words, a laddered heat transfer configuration, or the heat dissipation structure 62, 106, 108, is provided in communication with a heat source provided on a back side of a radar PCB 56, the heat dissipation structure 62, 106, 108 having a first portion, extending within a first plane for example, in communication with the heat source 54 and disposed within or below a sealing material, such as potting compound 98, and a second portion, extending within a different second plane than the first plane, and disposed outside of the sealing material, such as potting compound 98, or in communication with an external environment other than the sealing material, such as potting compound 98. Since the heat dissipation structure 62, 106, 108 is not in contact with the radar IC 36 on the front side of the radar PCB 56, any forces applied by the heat dissipation structure 62, 106, 108 is transferred to the radar PCB 56 and not to the radar IC 36. Since the heat dissipation structure 62, 106, 108 is provided on the back side of the radar PCB 56, any heat from the radar IC 36 absorbed by the radar PCB 56 may be also collected and transferred away from the radar PCB 56 due to the exposure to the heat dissipation structure 62, 106, 108 to the radar PCB 56 which is not covered by the radar IC 36.

FIG. 27 is similar to FIG. 25, but where the heat dissipation structure 62, 106, 108 takes the form of one or more fins 62 extending from the heat sink 58. More specifically, the fins 62 extend from the back of the heat sink 58, opposite from the direction of the indented portion 94 and through the potting compound 98. In some embodiments one or both of the indented portion 94 and/or the fins 62 are integrally formed with the heat sink 58. For example, the indented portion 94 and/or the fins 62 may be formed by stamping the heat sink 58, and/or by machining the heat sink 58. In some embodiments, either or both of the indented portion 94 and/or the fins 62 may be cast into the heat sink 58. In some embodiments, the fins 62 may be formed as a separate component mounted in thermal contact with the heat sink 58. The fins 62 may be attached to the heat sink 58, for example using one or more fasteners, adhesive, and/or by welding.

In some embodiments, the heat dissipation structure 62, 106, 108 does not protrude through the potting compound 98. For example, the potting compound 98 may cover the heat dissipation structure 62, 106, 108, or the heat dissipation structure 62, 106, 108 may be present on a heat sink 58 without any potting compound 98 disposed thereupon.

Figure 28:
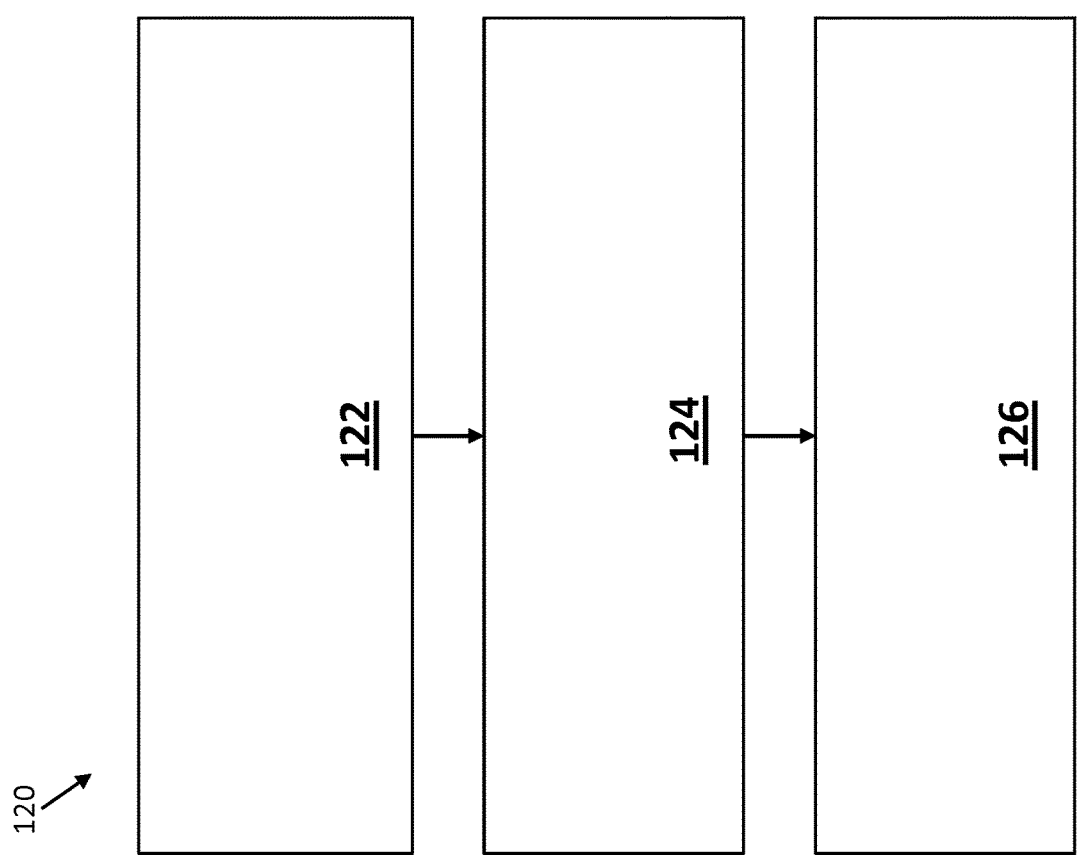
FIG. 28 is an illustrative example of a method of removing heat from a radar housing in accordance with an illustrative embodiment.

Now referring to FIG. 28, there is provided a method 120 of removing heat from a radar housing including the steps of: providing an enclosure configured to hold radar components within a first compartment 122, interconnecting the first compartment with a second compartment using a heat transfer device 124, and transferring heat from within the first compartment to the second compartment using the heat transfer device 126.

Figure 29:
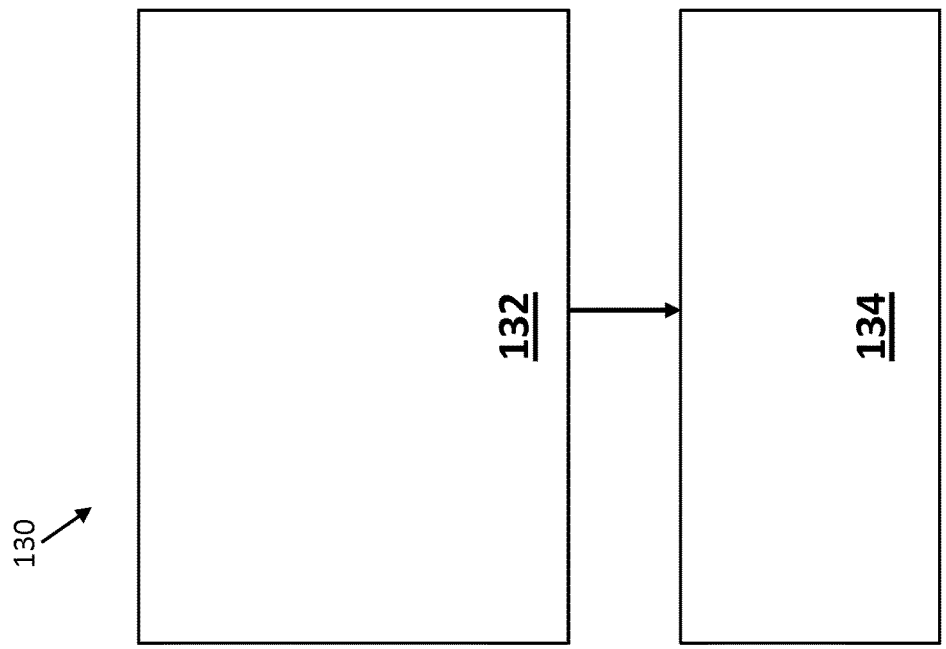
FIG. 29 is an illustrative example of a method of assembling a radar enclosure in accordance with an illustrative embodiment.

Now referring to FIG. 29, there is provided a method 130 of assembling a radar housing including: providing an enclosure configured to hold radar components, the enclosure defining an opening configured to convey RF radiation therethrough 132, and sealing the enclosure against an inner vehicle surface 134.

Packaging solutions are also provided that that can be leveraged for placing the radar in a sealed package that provides thermal solutions while fitting into small spaces within one or more vehicle exterior components 13, 14, 16, 16a, 16b, 17a, 17b, 20, 21, 22, such as in a handle assembly 14, in a light assembly 16, 16a, 16b, or behind an applique 22. In some applications the solution will carry RADAR functionality and the associated power, communication and sensing hardware, while providing connections to other systems. In some other applications the module will integrate with other functionality, such as hardware to support in handle switch work, capacitive or other sensing for access system controls.

FIGS. 30A and 30B show perspective views of a radar module 200 in accordance with aspects of the disclosure. Specifically, the radar module 200 is provided as a stand-alone sealed package that can be integrated into one or more different vehicle exterior components 13, 14, 16, 16a, 16b, 17a, 17b, 20, 21, 22 which may vary in side and position for use in the same vehicle and/or in different models or styles of vehicles. Specifically, the radar module 200 includes a module housing 202, which may be made of polymer, such as plastic or resin, and which defines an open top 204. The module housing 202 contains radar hardware components, which are sealed in a potting material 206. A wire dam 208 covers part of an end face 210 of the module housing 202 and provides for a wiring connection 212 to pass through the module housing 202. The wire dam 208 could be installed on other parts of the module housing 202 in other embodiments. A first side face 214 extends perpendicularly to radar field of view for transmitting RF radiation 38 (i.e. radar signals) through the module housing 202.

A heat sink 220 extends through the module housing 202 for dissipating heat generated within the radar module 200. As shown in FIGS. 30A-30B, the heat sink 220 is disposed in a slot 222 in a second side face 224 of the module housing 202, with the second side face 224 extending parallel to and spaced away from the first side face 214. In this way, the wire dam 208 and the heat sink 220 can be installed in the respective location in the module housing 202 before the interior space of the module housing 202 is filled with the potting material 206.

Figure 31A:
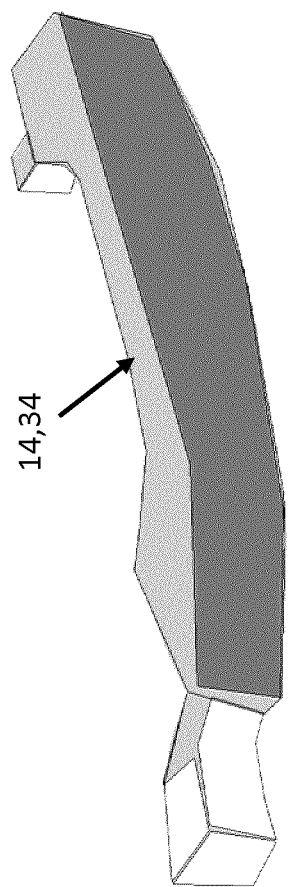
FIG. 31A is a perspective view of a handle assembly in accordance with aspects of the disclosure.
Figure 31B:
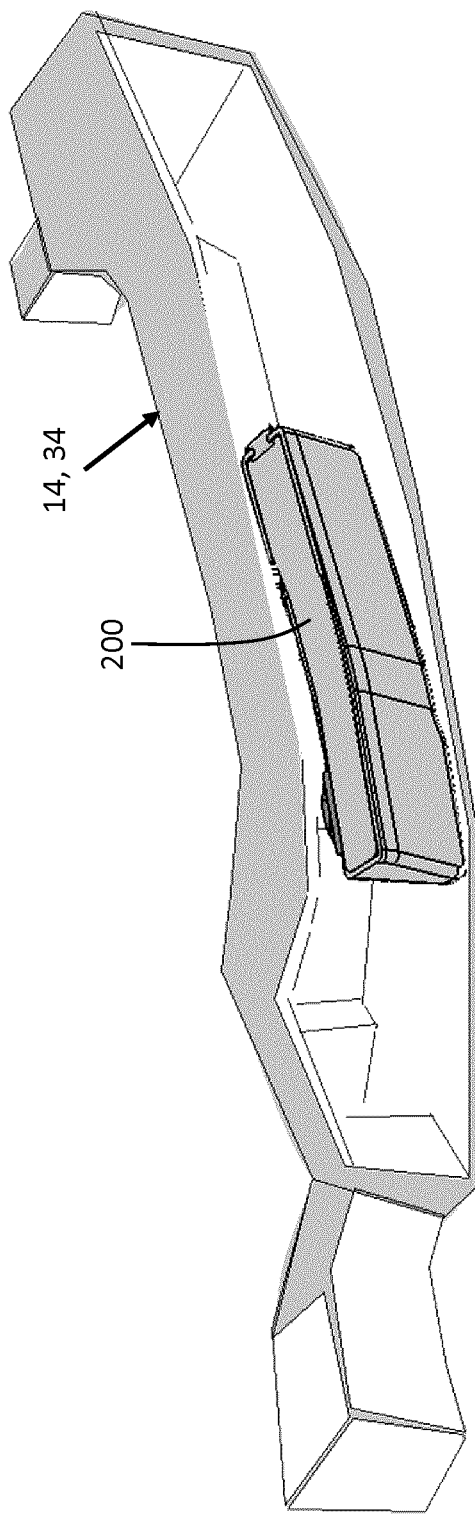
FIG. 31B is a cut-away perspective view of the handle assembly of FIG. 31A, showing a radar module disposed therein.

In some embodiments, and as shown in FIGS. 31A 31B, the radar module 200 is provided as in a stand alone sealed unit that is packaged in a handle cover 34 of a vehicle handle assembly 14 with other associated components that provide inputs and feedback to the customer for door and vehicle function.

For optimal performance the radar IC 36 should be placed at a particular angle or angles in two different dimensions (depending on the placement and objective of target FOV area). In some placements, such as in a handle assembly 14, there is limited space. This makes it a challenge to position the radar IC 36 to the necessary angles. Often there will be other components in the available space that further limit positioning. This disclosure provides solutions to optimize the packaging and orientation.

One solution for mounting radar IC 36 is on a planar board, such as a planar printed circuit board (PCB) but this limits how well the PCB and package can conform to available space such as the curvature of a handle. The packaging and heat sink solutions set forth in this disclosure can support this planer PCB application. To further optimize the packaging, the PCB can be separated allowing a radar portion of the PCB to have a particular orientation while the rest of the components can conform to the available space. This could be done with multiple boards connected by an electrical means, such as soldered wires, plug in connectors. This could be done with a board that has a flexible section, this can be done through varying the materials, geometry (thickness or varied cross-section). This could also be done with a flexible PCB where the geometry of the packaging holds the radar portion of the PCB in one orientation while the rest of the board is flexed in another orientation.

Figure 32:
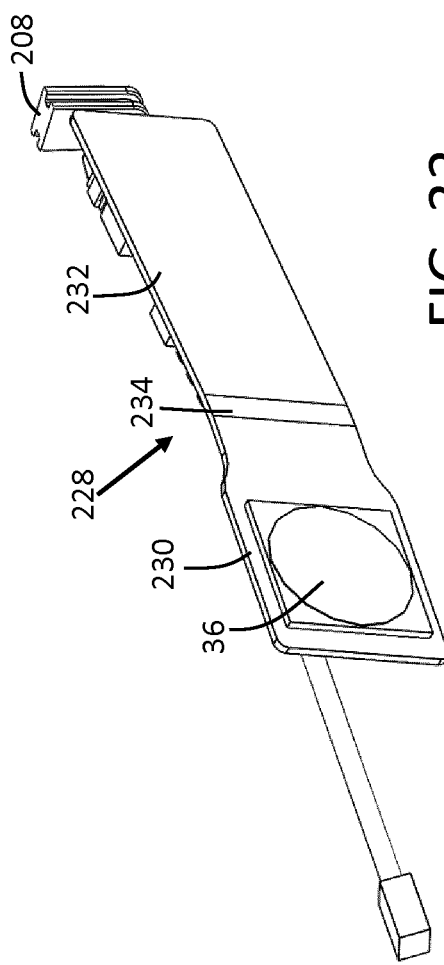
FIG. 32 is a perspective view of a bent radar Printed Circuit Board (PCB) for a radar module in accordance with aspects of the disclosure.

FIG. 32 is a perspective view of a bent one-piece radar Printed Circuit Board (PCB) 228 for a radar module 200 in accordance with aspects of the disclosure. Specifically, the one-piece PCB 228 includes a radar PCB portion 230 having a flat or planar shape and holding a radar IC 36, with the radar PCB portion 230 connected to a non-radar PCB portion 232 by a bent portion 234. The bent portion 234 may be rigid or semi-rigid and it may be integrally formed with the radar PCB portion 230 and the non-radar PCB portion 232. For example, the bent portion 234 may be a gradual bend controlled by one or more external supports, such as ribs or other structures of the module housing 202. In some embodiments, the bent portion 234 may include one or more relieving structures, such as holes or slots (e.g. kerfs) in the PCB material to facilitate bending. In some embodiments, the PCB 228 may be partially or entirely flat or planar. In some embodiments, the PCB 228 may be non-planar. For example, the PCB 228 may be bent or curved in one or more dimensions. In some embodiments, the PCB 228 may be bent or curved at one or more locations and/or across an entire length thereof. In some embodiments, the PCB 228 may have a bend or curve that is consistent across a length thereof. In some embodiments, the PCB 228 may have a bend or curve that varies across a length thereof. The PCB 228 may have bend or curve that is continuous or non-continuous (e.g. interrupted with planar portions).

Figure 33:
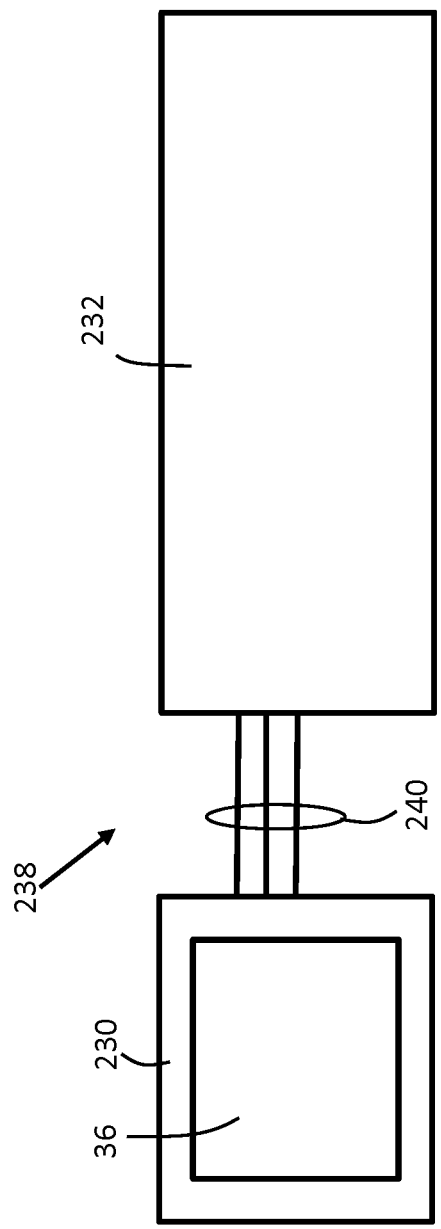
FIG. 33 is a plan view of a two-piece radar PCB for a radar module in accordance with aspects of the disclosure.

FIG. 33 is a plan view of a two-piece radar PCB 238 for a radar module 200 in accordance with aspects of the disclosure. Specifically, the two-piece radar PCB 238 includes a radar PCB portion 228 holding a radar integrated circuit (IC) 36, with the radar PCB portion 230 connected to a non-radar PCB portion 232 by a bent portion 234. The radar IC 36 may be, for example, an Antenna on Package (AoP) integrated circuit (IC). The radar antenna 36 may include other components, such as radar transmitter and/or receiver circuitry.

Figure 34:
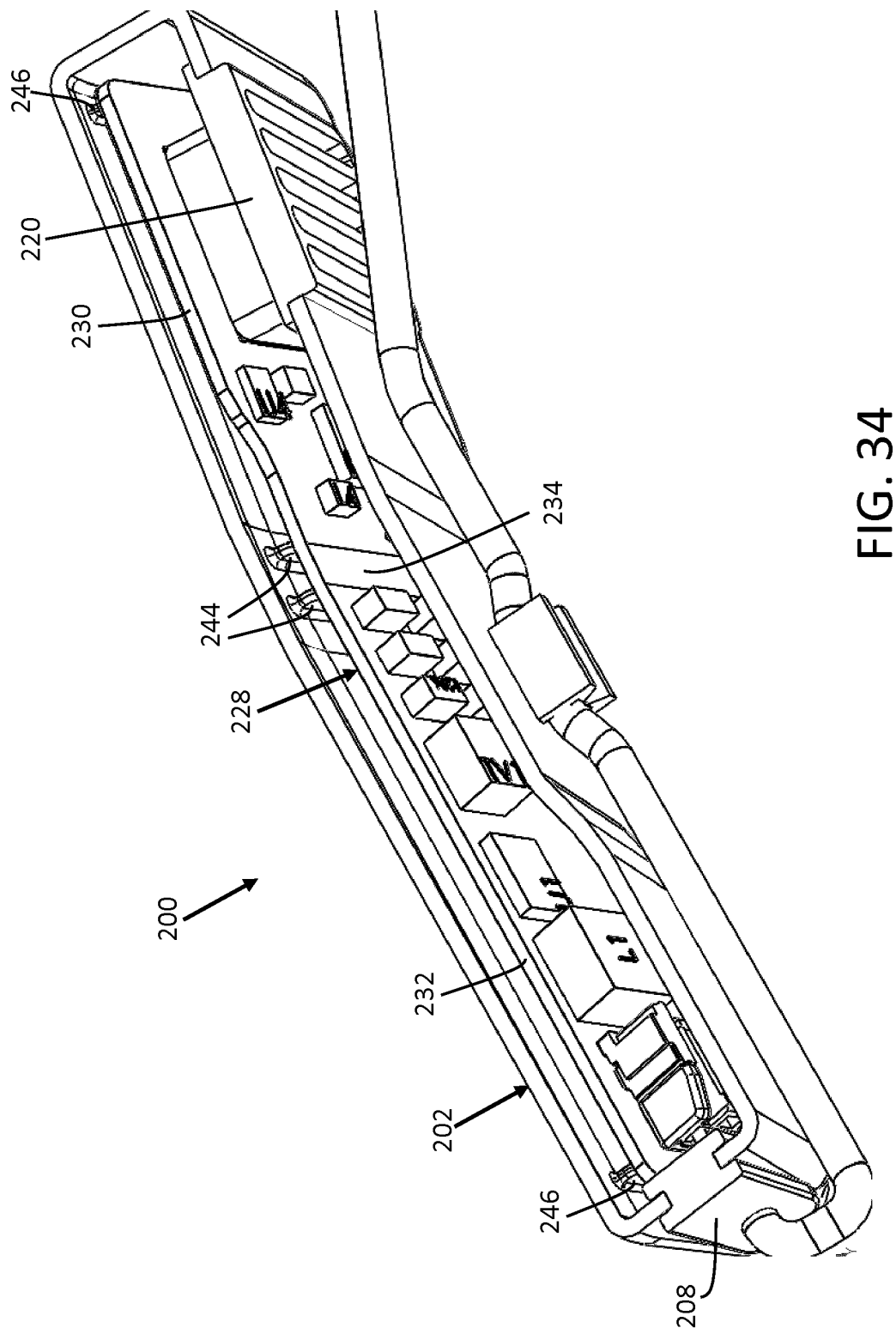
FIG. 34 is a perspective view of a radar module in accordance with aspects of the disclosure.

FIG. 34 is a perspective view of a radar module 200 in accordance with aspects of the disclosure. FIG. 34 shows the interior of the module housing 202 holding a one-piece PCB 228. The module housing 202 includes a pair of bend control ribs 244 interacting with and supporting the bent portion 234 of the PCB 228. The module housing 202 also includes end support ribs 246 configured to support the two opposite ends of the PCB 228.

The heat sink 220 is thermally connected to the rear of the radar PCB portion 230 opposite the radar chip/radar IC 36 to ensure that the heat sink 220 does not interfere with the field of view (FOV). FIGS. 35A-35C show four different example arrangements for connecting the heat sink 220 with the radar PCB portion 230 opposite the radar chip/radar IC 36 for transmitting heat away from the radar chip/radar IC 36. Each of the four different example arrangements includes one or more thermally-conductive layers 250, 252, which may include a pad or a paste of thermally-conductive material and/or a thermally-conductive compliant material such as a foam FIG. 35A is a schematic cut-away of a first arrangement of the heat sink 220 in thermally-conductive communication with a radar IC 36. A first copper pad 254 is disposed within the PCB 230 between the radar IC 36 and the heat sink 220 adjacent to the heat sink 220. A second copper pad 256 is disposed within the PCB 230 between the radar IC 36 and the heat sink 220 adjacent to the radar IC 36. Either or both of the copper pads 256 may function as ground plane conductors within the PCB 230. Both of the copper pads 254, 256 are configured to transmit heat from the radar IC 36 to the heat sink 220. In some embodiments, the PCB 230 may have a different number of one or more of the copper pads 254, 256. Either or both of the copper pads 254, 256 may be on exposed sides of the PCB 230 to facilitate transmission of heat through the PCB 230. The copper pads 254, 256 may be made of metal other than pure copper, such as a copper alloy or a non-copper metal.

FIG. 35B is a schematic cut-away of a second arrangement of a heat sink 220 in thermally-conductive communication with a radar IC 36. Specifically, FIG. 35B includes an insert 260 of thermally-conducting material disposed within the PCB 230 between the radar IC 36 and the heat sink 220 and configured to transmit heat from the radar IC 36 to the heat sink 220. The insert 260 may be made of metal or other material having high thermal conductivity. In some embodiments, and as shown in FIG. 35B, the insert 260 extends through an aperture 262 in the PCB 230. In some embodiments, the insert 260 is integrally formed with the PCB.

FIG. 35C is a schematic cut-away of a third arrangement of a heat sink 220 in thermally-conductive communication with a radar IC 36 using a plurality of vias 266 extending through the PCB 230 between the radar IC 36 and the heat sink 220 and configured to transmit heat from the radar IC 36 to the heat sink 220. The vias 266 are holes in the PCB that are partially or completely filled with copper or other metal. Such vias 266 are traditionally used in PCB construction to conduct electricity from one electrical plane to another. These vias 266 can either be hollow or filled with a thermally conductive material such as solder or copper, filled vias 266 may have more mass for thermal conduction FIG. 35D is a schematic cut-away of a fourth arrangement of a heat sink 220 in thermally-conductive communication with a radar IC 36. Specifically, the heat sink 220 includes a protruding portion 268 that extends through an aperture 262 in the PCB 230, which may be similar or identical to the aperture 262 shown in FIG. 35B. FIG. 35D also includes a radar-transparent pad 270 overlying the radar IC 36. Such a radar-transparent pad 270 may be used with any or all of the different heat sink arrangements. The radar-transparent pad 270 may be disposed between the radar IC 36 and the module housing 202 for preventing intrusion of moisture or contaminants therebetween. The radar-transparent pad 270 can also serve to block potting material 206 from between the radar IC 36 and the module housing 202, where the potting material 206 could otherwise form and have a negative effect, such as attenuating RF energy passing therethrough. In some embodiments, the radar-transparent pad 270 is made of a closed-cell foam, which may be, for example polyurethane material. However, the radar-transparent pad 270 is made of other materials that are sufficiently transmissive to RF radiation which are otherwise mechanically suitable.

Figure 35E:
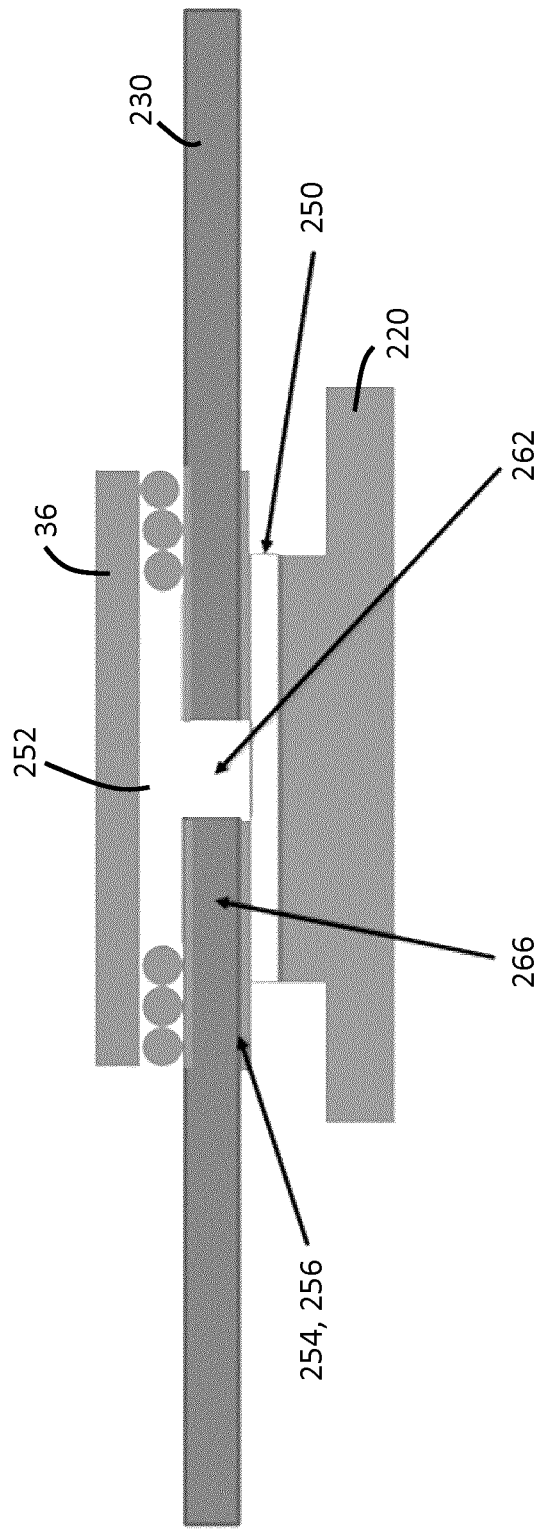
FIG. 35E is a schematic cut-away of a fifth arrangement of a heat sink in thermally-conductive communication with a radar IC.

FIG. 35E is a schematic cut-away of a fifth arrangement of a heat sink 220 in thermally-conductive communication with a radar IC 36. Specifically, the fifth arrangement shown in FIG. 35E includes at least one thermally-conductive layer 250, 252 extending through one or more holes or apertures 262 in the PCB 230. The thermally-conductive layers 250, 252 may include a pad or a paste of thermally-conductive material and/or a thermally-conductive compliant material such as a foam. In some embodiments, the thermally-conductive layers 250, 252 may be an electrical insulator. In some embodiments, the thermally-conductive layers 250, 252 may be electrically isolated or insulated from electrical conductors on and/or within the PCB 230. FIG. 35E shows the fifth arrangement with two of the thermally-conductive layers 250, 252; however, the arrangement may include only one of the thermally-conductive layers 250, 252 on either side of the PCB 230 and extending through one or more holes or apertures 262 in the PCB 230.

The heat sink 220 may be installed and connected to the PCB 230 by any suitable connection means such as, for example, push contact with a thermally conductive paste or foam; soldered directly to a conductive surface of the PCB 230; connected to posts or other structures that are soldered to s conductive surface of the PCB 230. Alternatively or additionally, a nesting geometry or thermally-conductive medium could ensure a connection between the heat sink 220 and the PCB 230.

FIG. 36A is a perspective view of a radar module 200 with a heat sink 220 in accordance with aspects of the disclosure. Specifically, FIG. 36A shows the heat sink 220 extending through an opening, such as a hole or slot 222 in the module housing 202 near a top of the module housing 202. The heat sink 220 may extend through a different opening or an opening in a different position of the module housing 202. FIG. 36B shows a similar radar module 200 with two heat sinks 220, which may be used to dissipate heat from different heat-generating components such as power supplies, processors, etc. It should be appreciated that these are merely examples, and the radar module 200 may include any number of heat sinks 220. The heat sinks 220 may be installed from the top of the module housing 202. The heat sinks 220 may be installed horizontally in a hole or slot 222 in the module housing 202 prior to potting.

The module housing 202 has an open top 204 to support the curvature required to fit in a handle 14 or other vehicle exterior component in combination with potting. If alternative means of sealing such as using a plate, the heat sink(s) 220 and/or a plastic cover could attach from the side. As the radar module 200 is placed on the exterior of the vehicle (even if in another enclosure, such as a handle, light, or applique) the PCB 228, 238 needs to be sealed to protect against moisture or other contaminants (e.g. dust, oil, etc.)

Figure 37A:
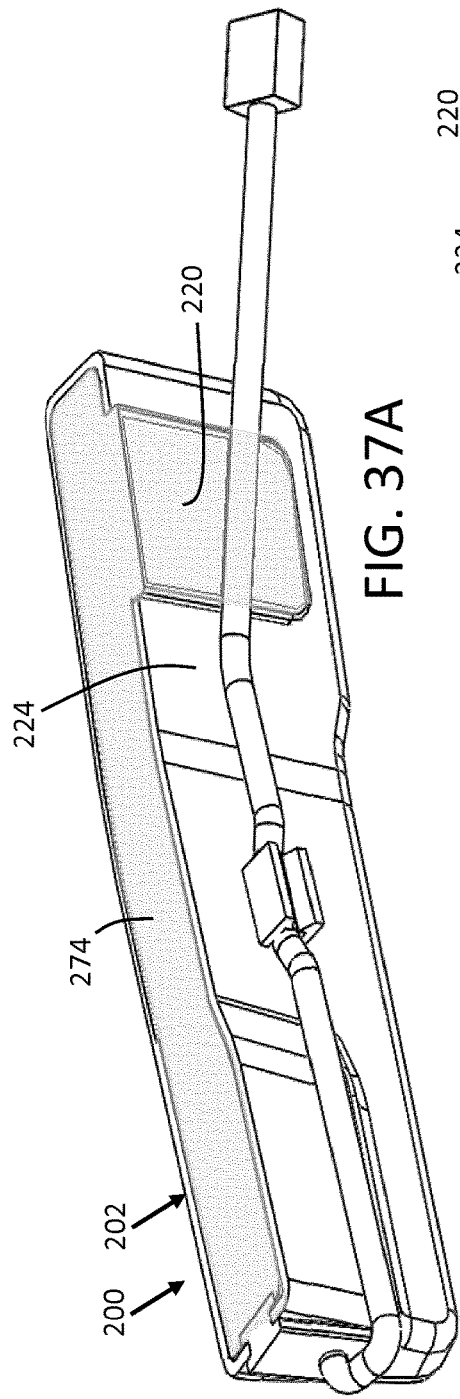
FIG. 37A is a perspective view of a radar module with a first wrap-around heat sink in accordance with aspects of the disclosure.
Figure 37C:
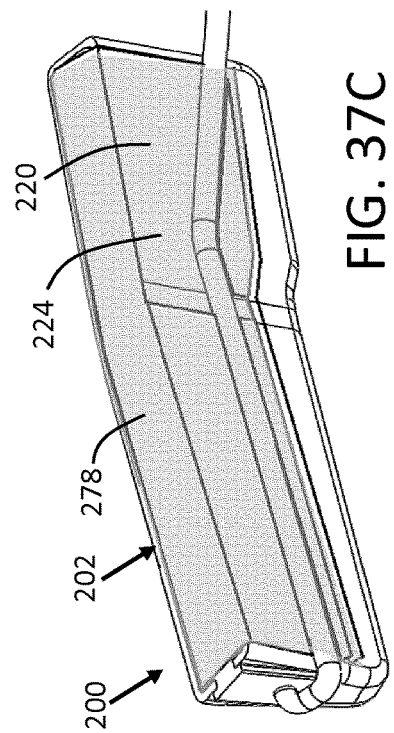
FIG. 37C is a perspective view of a radar module with a third wrap-around heat sink in accordance with aspects of the disclosure.
Figure 37B:
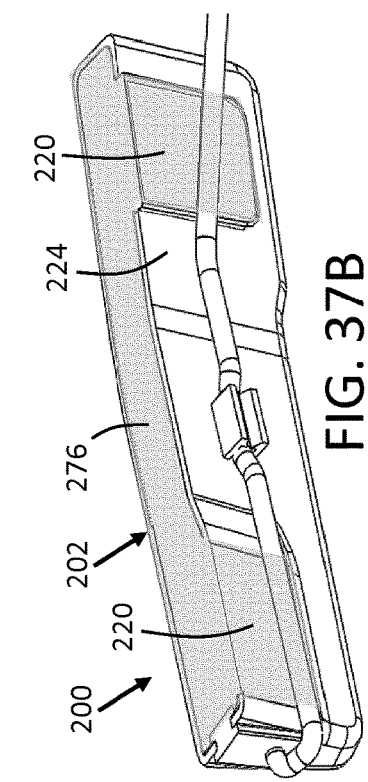
FIG. 37B is a perspective view of a radar module with a second wrap-around heat sink in accordance with aspects of the disclosure.
Figure 37D:
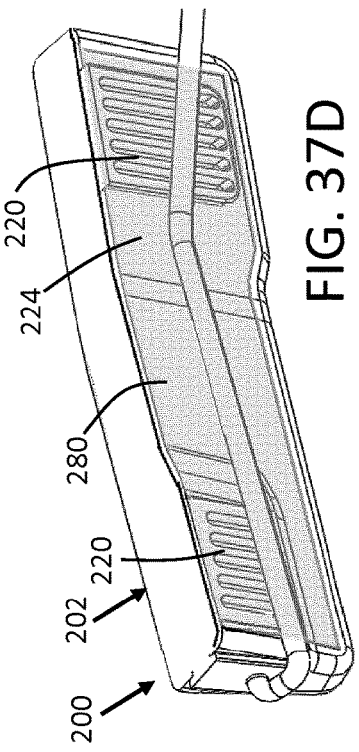
FIG. 37D is a perspective view of a radar module with a fourth wrap-around heat sink in accordance with aspects of the disclosure.

FIG. 37A is a perspective view of a radar module 200 with a first wrap-around heat sink 274 in accordance with aspects of the disclosure. The first wrap-around heat sink 274 defines the heat sink 220 on an upright portion thereof. FIG. 37B is a perspective view of a radar module 200 with a second wrap-around heat sink 276 in accordance with aspects of the disclosure. The second wrap-around heat sink 274 defines two heat sink portions 220 on corresponding upright portions thereof. FIG. 37C is a perspective view of a radar module 200 with a third wrap-around heat sink 278 in accordance with aspects of the disclosure. FIG. 37D is a perspective view of a radar module 200 with a fourth wrap-around heat sink 280 in accordance with aspects of the disclosure. Each of the first through third wrap-around heat sinks 274, 276, 278 conform with the top 204 and the second side face 224. The fourth wrap-around heat sink 280 conforms with the second side face 224 and an adjacent, upright end face (not shown). Each of the wrap-around heat sinks 274, 276, 278, 280 is a plate or casting that wraps-around two adjacent edges of the module housing 202 to form the heat sink 220 or heat sinks 220. In some embodiments, the wrap-around heat sinks 274, 276, 278, 280 may function to seal the module housing 202, which may obviate the need for potting within the module housing 202. The wrap-around heat sinks 274, 276, 278, 280 may provide increased cooling ability compared to one-sided heat sinks, also allowing the connection to multiple points or heat generating devices within the radar module 200.

Figure 38A:
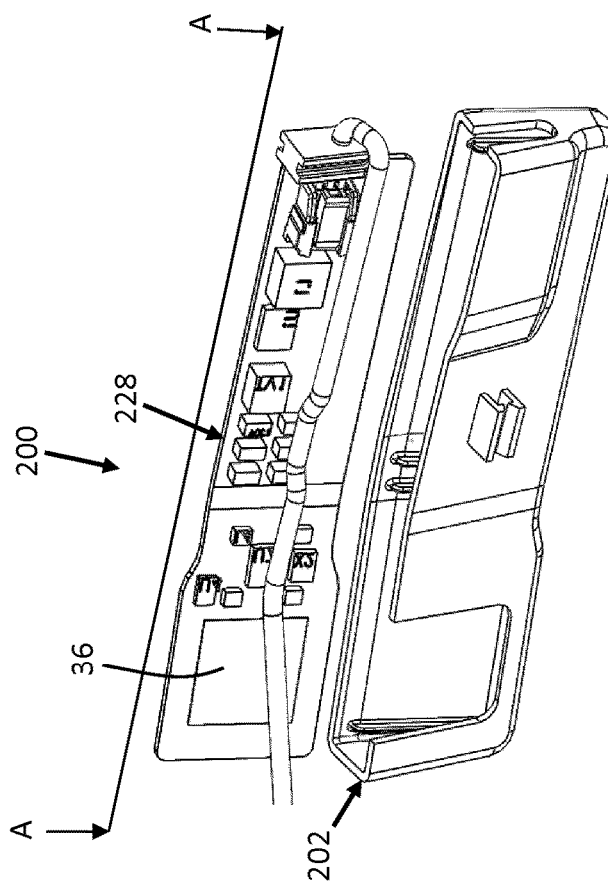
FIG. 38A is an exploded perspective view of a radar module assembly in accordance with aspects of the disclosure.
Figure 38C:
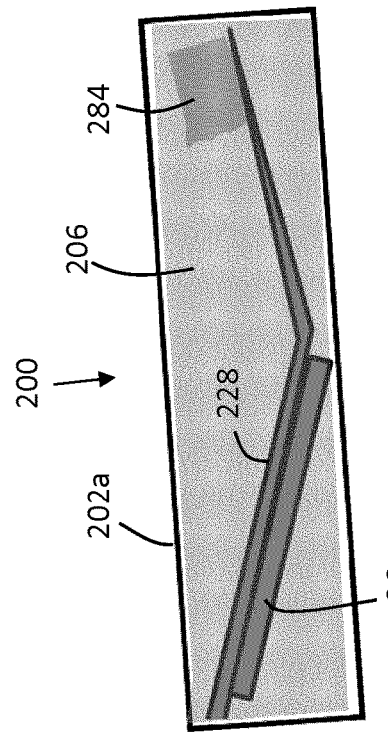
FIG. 38C is a section view of the radar module assembly of FIG. 38A with potting material filled from a side in accordance with aspects of the disclosure.
Figure 38B:
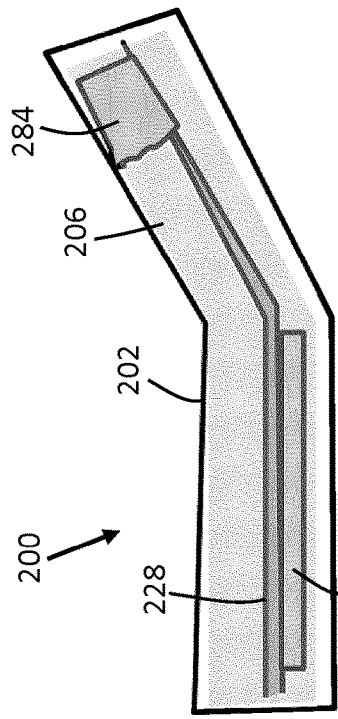
FIG. 38B is a section view of the radar module assembly of FIG. 38A with potting material filled from a top in accordance with aspects of the disclosure.

FIG. 38A is an exploded perspective view of a radar module assembly 200 in accordance with aspects of the disclosure. FIG. 38B is a section view of the radar module assembly 200 of FIG. 38A with potting material 206 filled from a top 204 in accordance with aspects of the disclosure. FIG. 38C is a section view of an alternative module housing 202a filled with potting material 206 from a side in accordance with aspects of the disclosure. The alternative module housing 202a may be similar to the module housing 202 shown in FIG. 38A, but without a bend to conform with the bent or angled PCB 228.

As the PCB 228 is angled, and there are components of various heights, and in some embodiments the PCB 228 is curved there is an advantage to packaging space and material usage to fill the module housing 202 with the potting material 206 from a top vs a side. Filling the module housing 202 from the top (direction of the section A-A view, and as shown in as shown in FIG. 38B) reduces the packaging. Filing from a side (as shown in FIG. 38C) forces a linear packaging volume (as potting is a liquid and fills to near level). As the module housing 202, 202a is filled, the tallest component 284 becomes the limiting factor for the overall geometry with a linear line between the two extremes. Filling from the top allows the module housing 202 to closely conform to the shape of the PCB 228 with components, such as the radar IC 36 attached thereto. By incorporating a bent or contoured shape into the module housing 202 to closely conform to the shape of the PCB 228 with components, the amount of potting material 206 can be minimized while still sufficiently enclosing the PCB 228.

FIG. 39A is a side-view schematic flow diagram showing filling of potting material 206 from the top 204 of the module housing 202. FIG. 39A corresponds to filling the housing 202 shown in FIG. 38B. FIG. 39B is a top-view schematic flow diagram showing a filling of potting material 206 from a side of the radar module assembly of FIG. 38A. FIG. 39B corresponds to filling the alternative housing 202a shown in FIG. 38C. FIG. 39C shows a filling of potting material 206 flowing around a radar-transparent pad 270 disposed over the radar IC 36 on the radar PCB 228 such that potting material guided away from the volume located in front of the radar IC 36 and within its field of view.

Figure 40A:
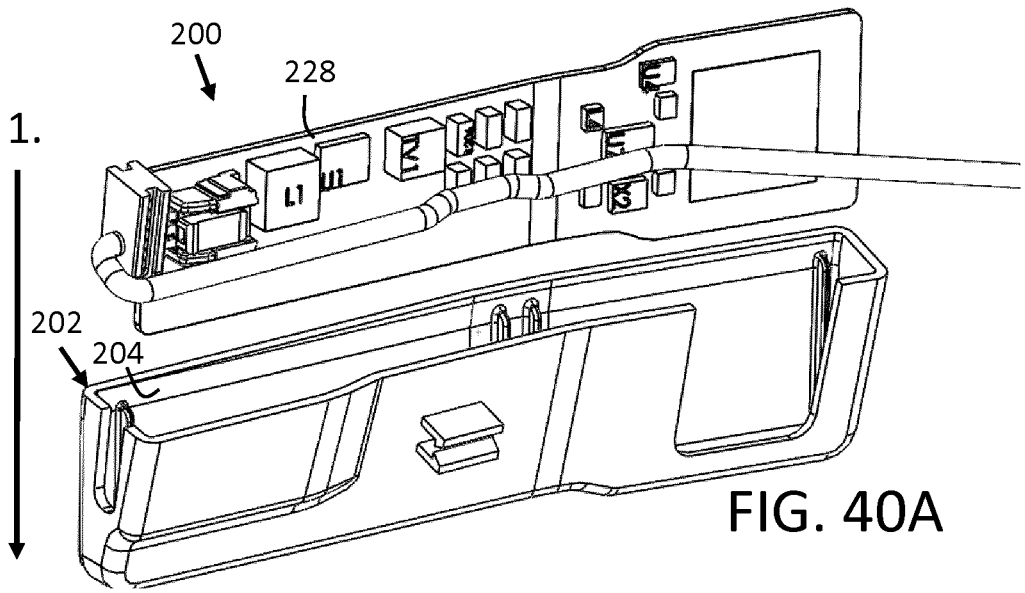
FIG. 40A is a perspective view of a radar module at a first assembly step.
Figure 40B:
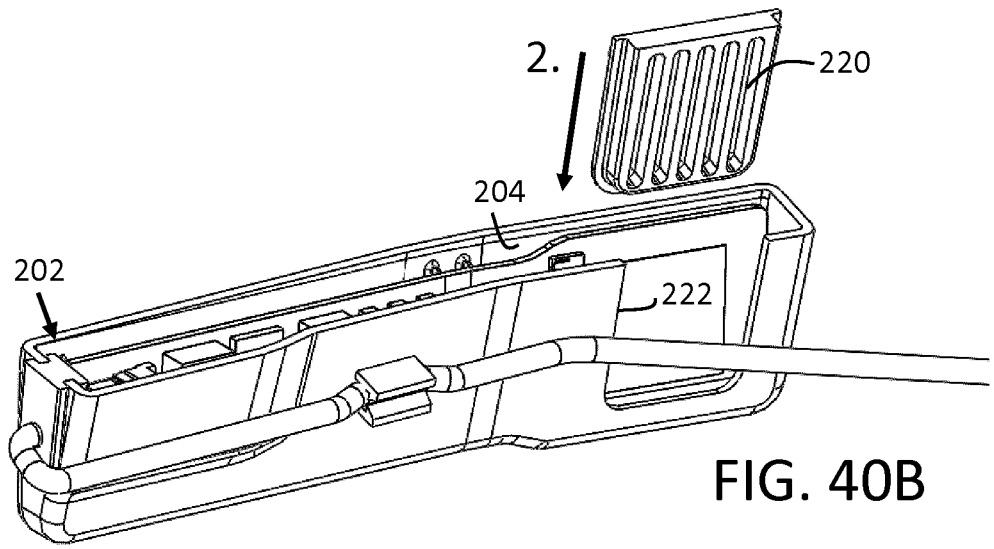
FIG. 40B is a perspective view of a radar module at a second assembly step.
Figure 40C:
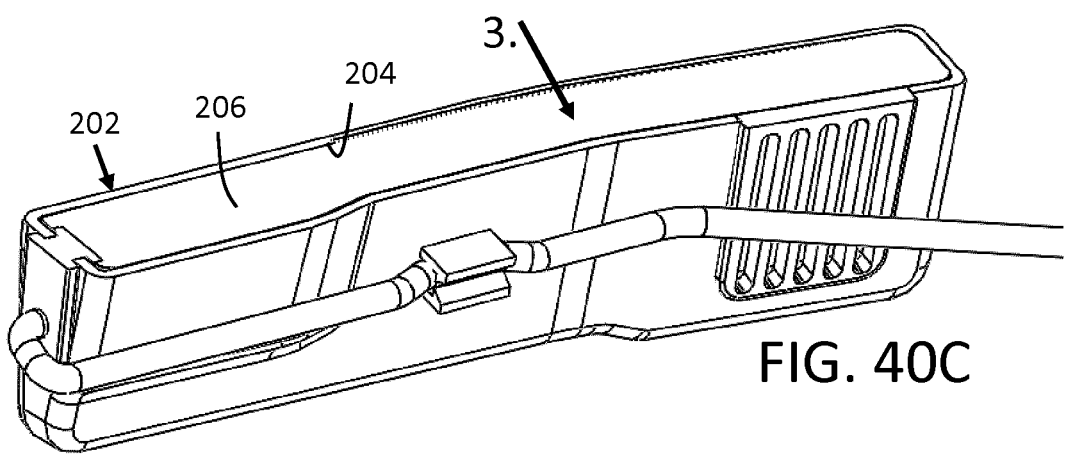
FIG. 40C is a perspective view of a radar module at a third assembly step.

FIG. 40A is a perspective view of a radar module 200 at a first assembly step of installing a PCB 228 in an upright orientation through an open top 204 of a module housing 202. FIG. 40B shows the radar module 200 at a second assembly step of inserting a heat sink 220 through the open top 204 and within a slot 222 in a side of module housing 202 the heat sink in thermal contact with the PCB 228 directly opposite a radar IC. In some embodiments, the heat sink 220 may be affixed to the PCB 228 and installed together with the PCB 228. The heat sink 220 may, in some embodiments, have an interference fit with the module housing 202 to seal sufficiently to retain potting material 206, in a liquid state within the module housing 202. FIG. 40C shows the radar module 200 at a third assembly step of sealing the PCB 228 within the module housing 202 by filling the module housing 202 with a potting material 206 through the open top 204. Alternatively or additionally, the step of sealing the PCB 228 within the module housing 202 may further comprise covering the open top 204 with a top plate having a seal. The top plate may include, for example, a lid or one of the wrap-around heat sinks 274, 276, 278. Therefore, a method of assembling a radar module includes installing a printed circuit board in an upright orientation through an open top of a module housing, inserting a heat sink through the open top and within a slot in a side of the module housing the heat sink in thermal contact with the printed circuit board directly opposite a radar IC, and sealing the printed circuit board within the module housing. The sealing of the printed circuit board within the module housing may further include filling the module housing with a potting material through the open top. The sealing of the printed circuit board within the module housing may further include covering the open top with a top plate having a seal.

Figure 42A:
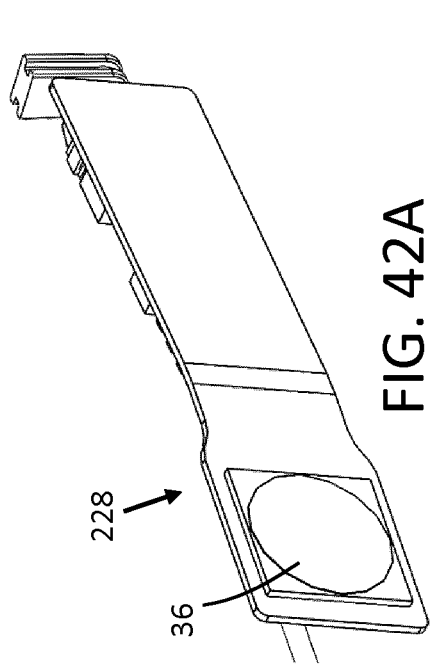
FIG. 42A is a perspective view showing a front side of the radar PCB of FIG. 41.
Figure 42B:
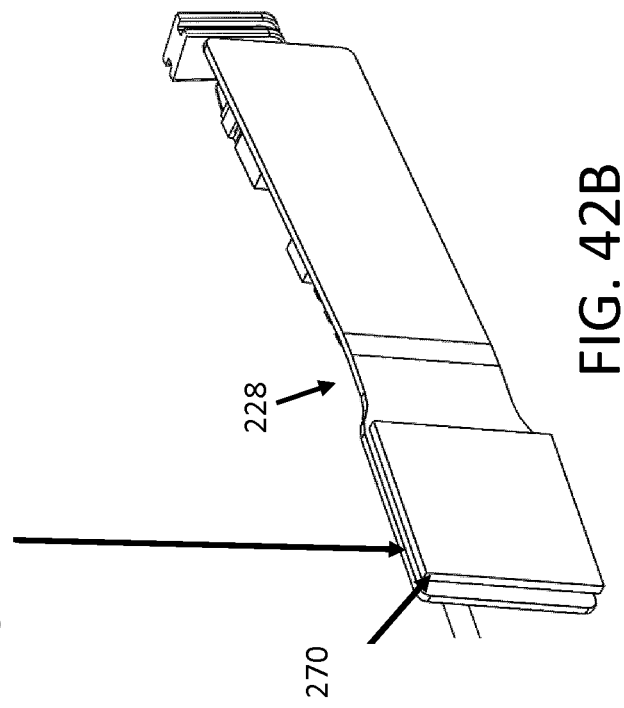
FIG. 42B is a perspective view showing a front side of the radar PCB of FIG. 41 with a radar-transparent pad disposed over a radar antenna on the radar PCB.
Figure 42C:
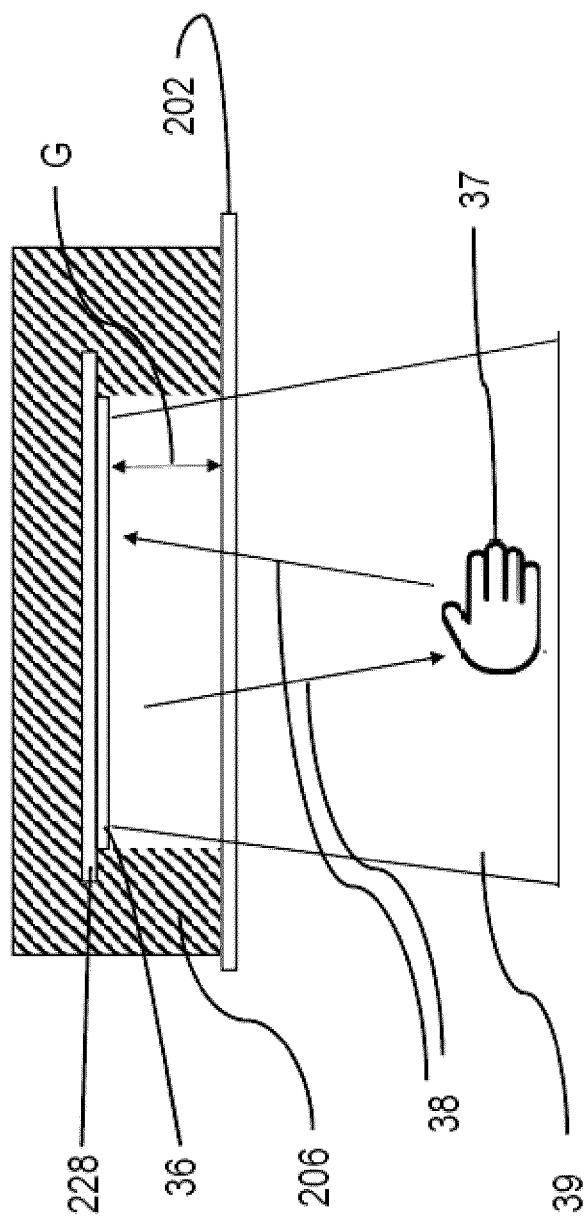
FIG. 42C is a side cross sectional view illustrating a field of view of the radar antennas through a uniformly distributed medium.

Inside the module housing 202 there is a gap G between the radar antennas 36 and the module housing 202 (see FIG. 42C for example). The gap G may be filled with a uniformly distributed material or medium. Such a material having a uniform distribution may present to the electromagnetic waves emitted and/or received by the radar antennas 36 so as not to effect the propagation of the electromagnetic waves emitted and/or received by the radar antennas 36, which may include but not be limited to attenuation or deflection of the electromagnetic waves emitted and/or received by the radar antennas 36 propagation through the medium provided within the gap which may effect detection of obstacles and gesture 37. The uniformly distributed material may be provided within a field of view 39 of the radar antennas 36. In one possible configuration, the gap G may be provided with a uniformly distributed material as air having been sealed against between the radar antennas 36 and the module housing 202 for preventing the ingress of sealing material between into the field of view 39 of the radar antennas 36. In another possible configuration, the gap G may be provided with a uniformly distributed material as a material having been provided between the radar antennas 36 and the module housing 202 for preventing the ingress of sealing material between into the field of view 39 of the radar antennas 36. Therefore, there is provided a sealing material, such as a non-uniformly distributed material, provided to surround and seal the electronics of a radar module assembly 200 having a radar antenna 36 with a field of field 37, where the field of view 37 of the radar antenna 36 is free of non-uniformly distributed material. In a possible configuration, the field of view 37 of the radar antenna 36 is free of potting 206. In one possible configuration, the field of view 37 of the radar antenna 36 is free of a non-uniformly distributed material, for example the volume in front of the radar antenna 36 and within the handle cover 34 and/or within the housing 202 through which the field of view extends is free, or may be mostly or substantially free, of a non-uniformly distributed material. In a configuration, a uniformly distributed material is provided within the field of view 37 between the radar antenna 26 and the housing 202 for preventing sealing material or a material having a non-uniformly distributed material, for example potting 206 having irregular densities and/or air pockets, from entering into the field of view 37, such as flowing therein during a sealing process. For example, the field of view 37 between the radar antenna 26 and the walls of the housing 202 and/or handle 34 may be free or substantially free of air pockets, or air bubbles. In some embodiments where the module housing 202 is filled with potting material 206, it may be important to have an even coat of the potting material 206 over this area. Potting material 206 can also create possibility of inconsistent filling or bubbles. Alternatively, a substrate that can be controlled such as a foam (or other radar-transmissive material) could be placed between the radar IC 36 and the module housing 202. Such a substrate may be provided having a uniformly distributed material, which may include for example no air gaps or voids, or inconsistent densities provided within or throughout the substrate. This will ensure that the potting material 206 does not fill this space, providing a more consistent function of the radar transmission. Such a foam material may take the form of the radar-transparent pad 270, which may be fixed to the PCB 228 or the module housing 202 to ensure it holds position. Such a radar-transmissive material also ensures that no contaminants (e.g. dust, dirt, water, moisture) are between the Antennas 36 and the module housing 202. There is therefore provided, with further reference to FIG. 53, a method of assembling a radar module 300, the method 300 including the steps of providing a module housing defining an interior space configured to hold a radar module including a radar antenna having a field of view 302, and providing a sealing material within the interior space for sealing the radar module 304, such that the sealing material provided within the field of view is of uniform distribution.

The radar-transmissive material used should have some compliance to ensure that it is able to seal against the surfaces. Alternatively the radar-transmissive material could be rigid and the PCB 228 could be heavily biased to contact it. In this condition the tolerances of assembly would be taken up elsewhere while the antenna area of the PCB 228 is pressed to seal on the surface.

This radar-transmissive material would ideally have the same transmissive or reflective properties as the module housing 202 or as air, as the radar IC 36 functions best with an air gap of a set distance. Another possible solution is for this radar-transmissive material to have similar properties as the module housing 202 to limit the variations and therefore limit the lensing effects.

In embodiments where the radar module 200 is not potted, but is sealed through other means, there is a possibility of moisture build up (or other contamination) in the module housing 202, and this could find its way between the radar IC 36 and the module housing 202. Therefore, inclusion of the radar-transmissive material to seal that area between the radar IC 36 and the module housing 202 would help to keep moisture or other contaminants out of that area, and therefore ensure consistent transmissive properties.

This same concept may applied to the outside of the module housing 202a s an interface to a next external material. This could be the handle outer surface, or an applique 22. A compliant substrate such as a foam could be used to fill the gap for similar reasons. This material would ideally have the same transmissive or reflective properties as the module housing 202 or exterior surface to minimize the number of lensing surfaces. Alternatively, this could be transparent to radar (function similar to air)

Figure 41:
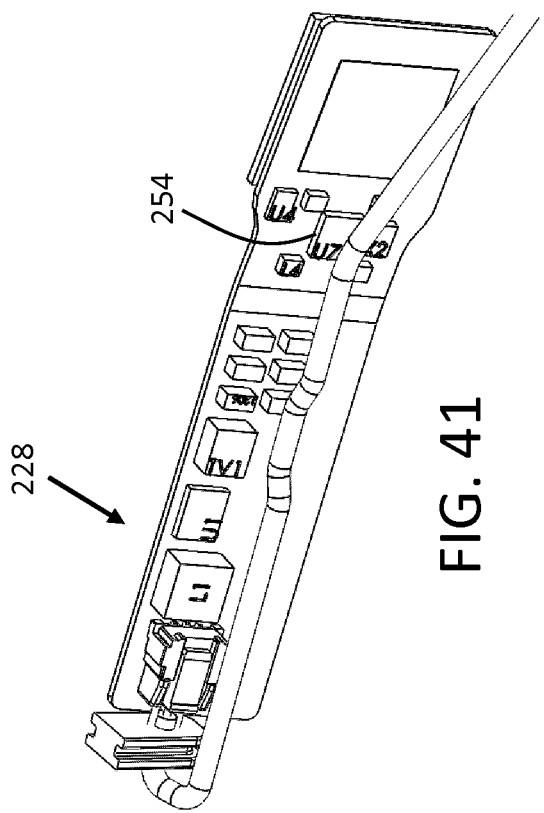
FIG. 41 is a perspective view showing a rear side of a radar PCB assembly.

FIG. 41 is a perspective view showing a rear side of a radar PCB 228 with a first copper pad 254 on the radar PCB 228 behind the radar IC 36. FIG. 42A is a perspective view showing a front side of the radar PCB 228 of FIG. 41. FIG. 42B is a perspective view showing a front side of the radar PCB 228 of FIG. 41 with a radar-transparent pad 270 disposed over the radar IC 36 on the radar PCB 228.

FIG. 43A is a perspective view of a handle cover 34 of a vehicle handle assembly 14 in accordance with aspects of the disclosure. FIG. 43B is a cut-away perspective view of the handle assembly 14 of FIG. 43A, showing a radar module 200 and a sealing block 286 of deformable and radar-transparent material disposed therein. More specifically, the sealing block 286 fills the space between the module housing 202 overlying the radar IC 36 and a portion of the handle cover 34 overlying the radar IC 36. In some embodiments, the sealing block 286 is made of a closed-cell foam, which may be, for example polyurethane material. However, the sealing block 286 may be made of other materials that are transparent to radar and which are otherwise mechanically suitable. Furthermore, FIG. 43C is a cut-away perspective view of the handle assembly 14 of FIG. 43B in accordance with another possible configuration, showing a radar module 200 and a sealing block 286 of radar-transparent material disposed therein and extending through a port or aperture 287 formed in the module housing 202 for allowing the sealing block 286 to extend outside of the housing 202. More specifically, the sealing block 286 fills the space between the radar IC 36 and an inner surface 35 of the handle 34 to provide a consistent medium for the electromagnetic waves emitted and/or received by the radar antennas 36 to propagate through, and further without having to propagate through the wall of the module housing 202. The sealing block 286 is sealed against the port 287.

Figure 44C:
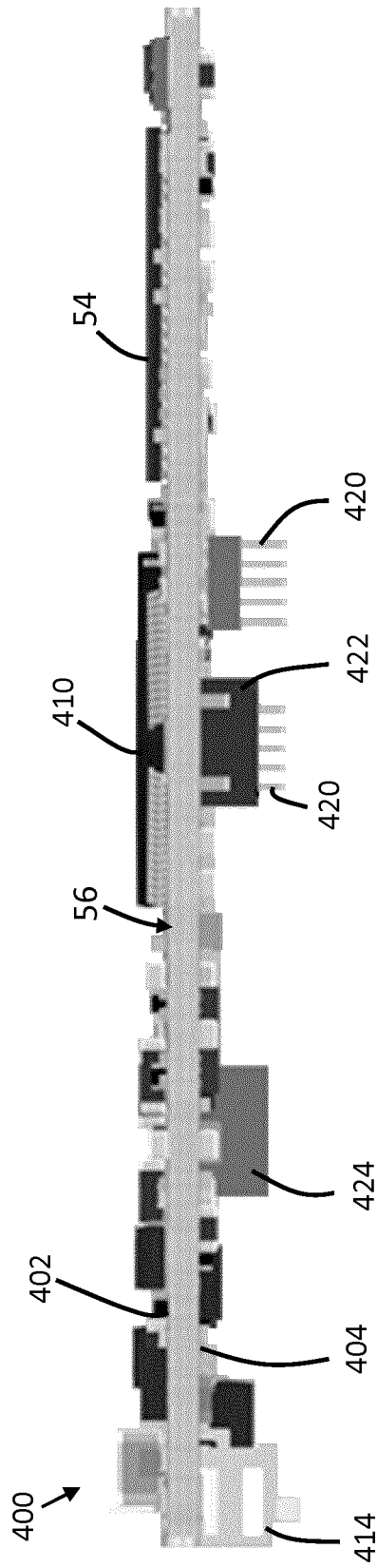
FIG. 44C is a side view of the illustrative example circuit card assembly of in accordance with aspects of the disclosure.

Now referring to FIGS. 44A-44C, there is provided an example circuit card assembly (CCA) 400 of a radar module in accordance with aspects of the disclosure. Specifically, FIG. 44A is a top view of the example CCA 400, FIG. 44B is a bottom view of the example CCA 400, and FIG. 44C is a side view of the example CCA 400. The CCA 400 includes the printed circuit board (PCB) 56 together with components affixed thereto. The PCB 56 defines a top surface 402 and a bottom surface 404 opposite the top surface 402. The CCA 400 also includes a radar transceiver 54 mounted to the top surface 402 of the PCB 56. The CCA 400 includes a number of other electrical components which may include a microcontroller unit (MCU) 410 and one or more components comprising a power supply unit 412. It should be appreciated that this is merely an example, and that the CCA 400 may include different components and/or components having different physical dimensions or configurations.

As best shown in FIG. 44C, no other components of the CCA 400 extend from the top surface 402 of the PCB 56 substantially above the radar transceiver 54. This arrangement allows the CCA 400, and the radar transceiver 54 to be mounted very close to any radome covering to minimize or eliminate any gap between the radar transceiver 54 and the housing. Minimizing or eliminating the second distance $d_2$ between the radar transceiver 54 and the housing may help to optimize transmission of RF radiation through the radome. In some embodiments, for example, any and all electrical components of the CCA 400 that have a z-height dimension (i.e. a height perpendicular to the respective one of the surfaces 402, 404 to which the component is mounted) which is substantially greater than a z-height of the radar transceiver 54 are mounted to the bottom surface 404 of the PCB 56. Examples of such taller components include, for example, wiring header pins 420, switches 422, and inductors or transformers 424, as shown in FIG. 44C.

In some embodiments, the radar transceiver 54 is the tallest component on the top surface 402 and no components extend above the radar transceiver 54. In other words, the radar transceiver 54 may extend in a z-height direction from the top surface 402 of the PCB 56 farther than any other component mounted thereto.

In some embodiments, and as shown in FIG. 44B, the CCA 400 also includes a power supply unit 412, which may be a multi-rail power supply configured to generate a regulated DC power upon each of a plurality of different power rails. For example, such a multi-rail power supply 412 may be configured to generate both 5.0 VDC power and 3.3 VDC power. As shown in FIGS. 44A-44B, the multi-rail power supply 412 includes a plurality of first power components 416 disposed upon the bottom surface 404 of the PCB 56. The first power components 416 may include one or more integrated circuits, and/or one or more inductors and/or transformers 424 that may have a height in the z-dimension that is greater than the height of the radar transceiver 54.

In some embodiments, and as shown in FIG. 44B, the CCA 400 also includes a power wiring connector 414 disposed upon the PCB 56 adjacent to the multi-rail power supply 412 and in electrical communication with the multi-rail power supply 412 for receiving electrical power. The power wiring connector 414 may have a height in the z-dimension that is greater than the height of the radar transceiver 54. The power wiring connector 414 may be disposed upon the bottom surface 404 of the PCB 56, as shown in FIG. 44B.

In some embodiments, and as also shown in FIGS. 44A-44B, the multi-rail power supply 412 includes a plurality of second power components 418 disposed upon the top surface 402 of the PCB 56 and aligned substantially with corresponding ones of the first power components 416 that are electrically connected thereto. The second power components 418 may include components that have a height in the Z-dimension that is less than the height of the radar transceiver. The second power components 418 may include, for example, surface-mounted resistors, capacitors, and/or integrated circuits.

In some embodiments, and as also shown in FIG. 44B, the bottom surface 404 of the PCB 56 defines a heat-dissipation region 428 opposite of the radar transceiver 54. All components mounted to the bottom surface 404 of the PCB 56 within heat-dissipation region 428 have a z-height dimension less than a predetermined height to provide clearance for a heat sink or some other heat dissipating device (e.g. a heat pipe) that is configured to remove heat generated by the radar transceiver 54.

In some embodiments, the radar transceiver 54 has a location and an orientation configured to minimize a width of the PCB 56. For example, the radar transceiver 54 may be oriented with its edges parallel to the edges of the PCB 56 as shown in FIG. 44A. Alternatively, the radar transceiver 54 may be oriented with its edges at an oblique angle to the edges of the PCB, similarly to the MCU 410 of the example CCA 400 shown in FIG. 44A.

In some embodiments, the CCA 400 is disposed within a vehicle exterior component or a vehicle accessory, such as a door handle assembly, a side rear view mirror assembly, a trim assembly, an applique assembly, a bumper assembly, a light assembly, etc. In some embodiments, the CCA 400 is disposed behind a class A vehicle surface of the vehicle accessory or the vehicle exterior component.

Figure 45:
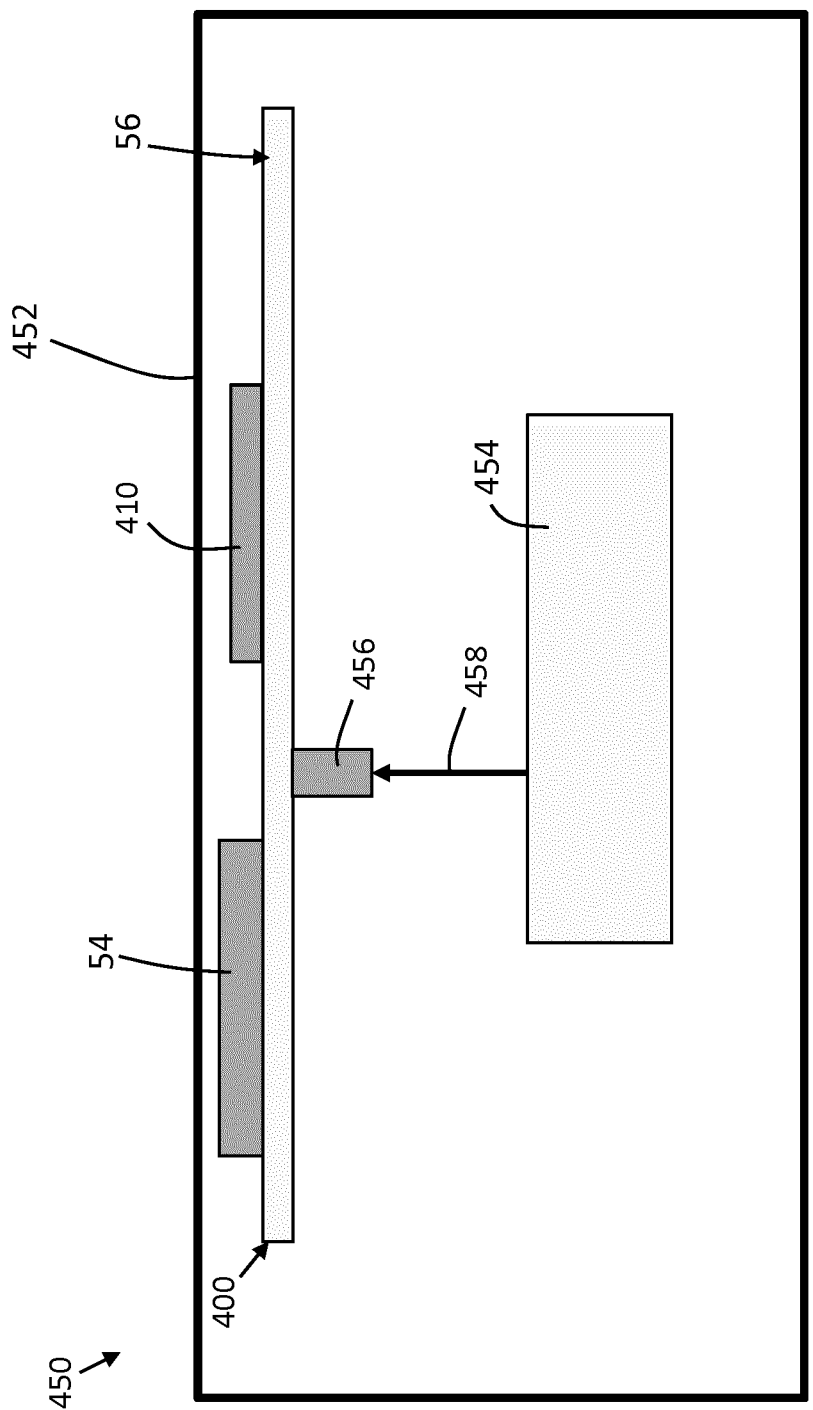
FIG. 45 is a schematic block diagram of an example radar sensor assembly in accordance with aspects of the disclosure.

Now referring to FIG. 45, a schematic block diagram of an example radar sensor assembly 450 is provided. The example radar sensor assembly 450 includes a housing 452 and a circuit card assembly (CCA) 400 having a radar transceiver 54 mounted to a printed circuit board (PCB) 56. The example radar sensor assembly 450 also includes a power supply 454 configured to generate a regulated DC power for operating the radar transceiver 54. The regulated DC power may include one or more of a regulated 5.0 VDC power and/or a regulated 3.3 VDC power. However the power supply 454 may supply regulated and/or unregulated power having different voltages. The power supply 454 is located physically separate from the CCA 400 and electrically connected thereto. The power supply 454 may include its own power supply printed circuit board that is separate and independent from the PCB 56 of the CCA 400.

As shown in FIG. 45, the CCA 400 may include a power wiring header 456 configured to connect the PCB 56 to a power wiring conductor 458 to receive the regulated DC power from the power supply 454. The regulated DC power may then be supplied, for example, to the radar transceiver 54. The power wiring conductor 458 may include one or more wires or cables, or a flexible circuit board, which may allow some flex or relative motion between the CCA 400 and the power supply 454. Alternatively, the power wiring conductor 458 may include a plurality of rigid pins, providing for the power supply 454 to be rigidly mounted to the CCA 400. For example, the power supply 454 may be configured as a daughter board that is rigidly fixed to the CCA or to a common mounting structure.

In some embodiments, the power supply 454 may be configured to generate the regulated DC power from a 12 V DC source. However, the power supply 454 may be supplied from other sources, such as a 36 V or 42 V DC source or a high-voltage (HV) DC source, such as a HV battery pack and/or an AC source. In some embodiments, the CCA 400 includes no connection to any external power source except for the power wiring conductor 458 coupling the CCA 400 to the power supply 454. For example, the CCA 400 may have no connection to any external source of 12 V DC power.

Figure 47:
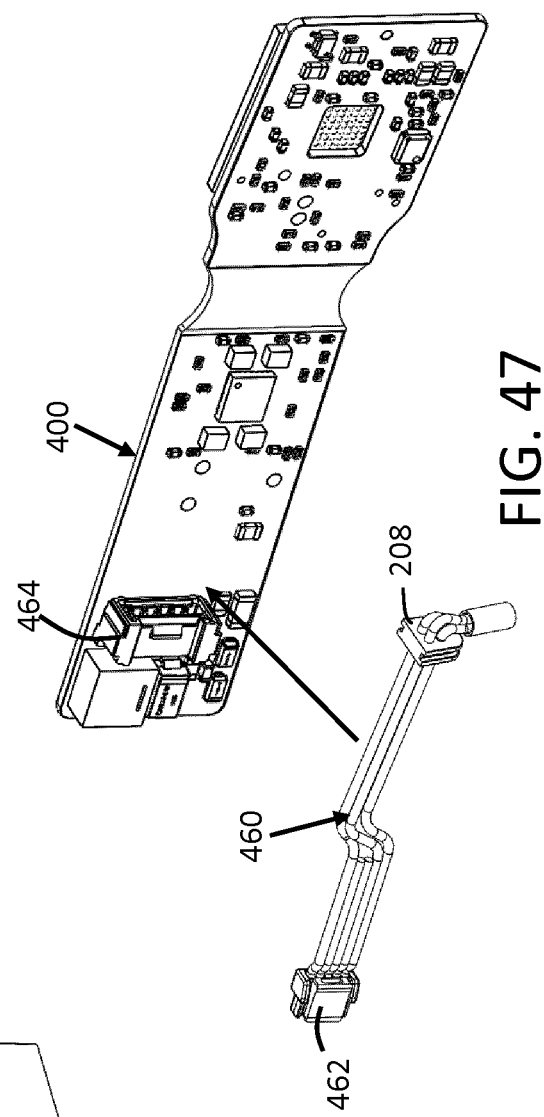
FIG. 47 is a perspective view showing a second assembly step of the radar module assembly in accordance with aspects of the disclosure.
Figure 46:
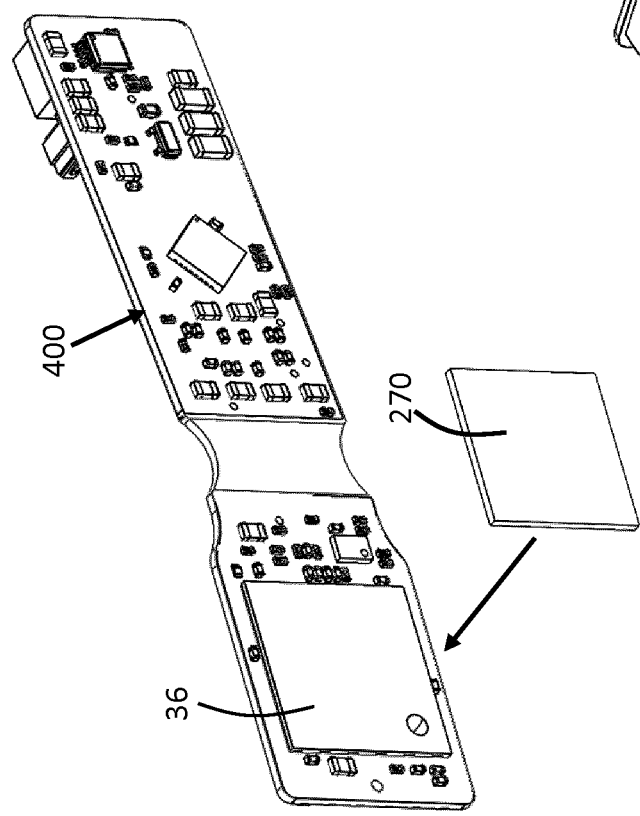
FIG. 46 is a perspective view showing a first assembly step of a radar module assembly in accordance with aspects of the disclosure.

FIGS. 46-49, 50A-50C, 51, and 52A-52B show a graphic representation of steps in assembling a radar module assembly in accordance with aspects of the disclosure. Specifically, FIG. 46 shows a first assembly step of a radar module assembly including installing a radar-transparent pad 270, such as a foam pad onto a front face of the radar IC 36 on the circuit card assembly (CCA) 400. Specifically, FIG. 46 shows a first assembly step of installing a wire assembly 460 onto a back surface of the circuit card assembly (CCA) 400, with a connector 462 plugged into a corresponding receptacle 464 on the CCA 400. In some embodiments, and as shown in FIG. 47, the wire assembly 460 includes the wire dam 208 for sealing the wires passing through the module housing.

Figure 48:
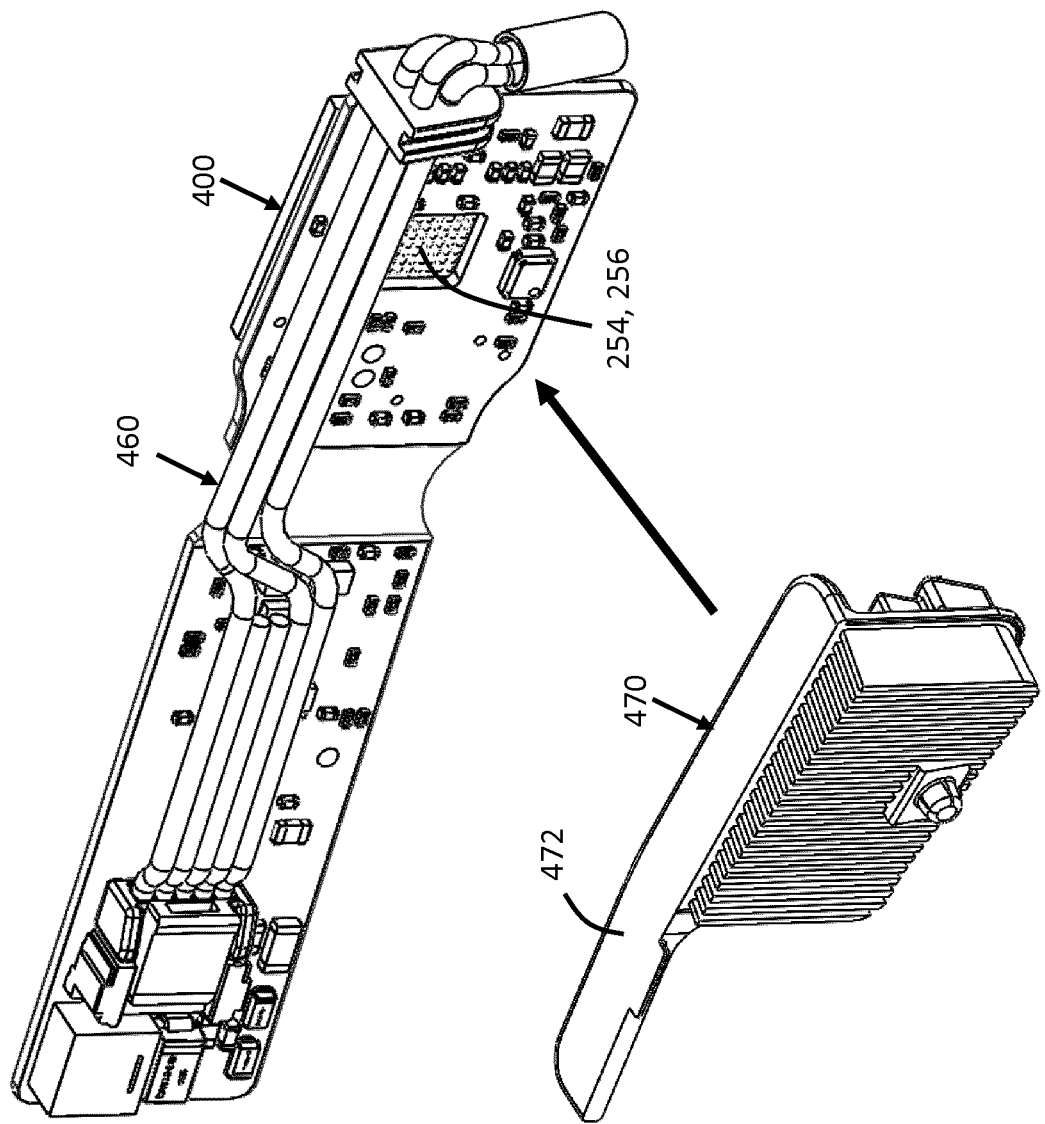
FIG. 48 is a perspective view showing a third assembly step of the radar module assembly in accordance with aspects of the disclosure.

FIG. 48 shows a third assembly step of installing a heat sink 470 onto a back surface of the CCA 400, directly opposite of the radar IC 36 for conveying heat therefrom. In some embodiments, and as shown in FIG. 48, the heat sink 470 is in thermal communication with one or more copper pads 254, 256 of the CCA 400 for transmitting heat from the radar IC 36 to the heat sink 470. In some embodiments, and as shown in FIG. 48, the heat sink 470 includes a protruding cover portion 472 that overlies the wire assembly 460 when the heat sink 470 is installed to the CCA 400. FIG. 49 shows a fourth assembly step of the radar module assembly, including installing the combination CCA 400, radar-transparent pad 270, wire assembly 460, and heat sink 470 into a module housing 202, through an open top 204 of the module housing 202.

FIGS. 50A-50C show the assembled radar module assembly 200 after the fourth assembly step and before potting material is added to enclose the CCA 400. FIG. 50A shows the assembled radar module assembly 200 with the heat sink 470, and FIG. 50B shows the assembled radar module assembly 200 without the heat sink 470 in place to illustrate components otherwise obstructed from view. FIG. 50C shows a front view of the assembled radar module assembly 200. FIG. 51 is a front perspective view showing the radar module assembly after a fifth assembly step of filling the module housing 202 with potting material 206 through the open top 204, thereby enclosing the CCA 400 within the module housing 202.

FIG. 52A shows a sixth assembly step of the radar module assembly 200, including attaching a sealing block 286 onto a front surface of the module housing 202 overlying the radar IC 36 to provide a barrier between the module housing 202 and an interior surface of a vehicle exterior component, such as a handle, a bumper, an outer panel of a composite door, a trim piece, an applique, a side mirror, a light assembly, or a trim piece. In other words, the sealing block 286 may help to prevent moisture or other contaminants, such as dirt or dust, from entering a space between the module housing 202 and the interior surface of the vehicle exterior component. Such moisture or other contaminants could otherwise adversely affect performance of the radar module assembly 200. FIG. 52B shows the radar module assembly 200 after the sixth assembly step, with the sealing block 286 attached thereto.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicular component comprising:
a housing;
a printed circuit board accommodated by the housing, the printed circuit board having a processor;
a radar sensor accommodated by the housing;
wherein the radar sensor comprises (i) at least one antenna and (ii) a heat dissipating element thermally conductively connected to the processor;
a sealing material disposed in the housing for blocking moisture and other contaminants;
wherein the sealing material includes a radar-transparent pad disposed between the at least one antenna and the housing;
a potting material at least partially filling the housing, wherein the heat dissipating element passes from within the housing through the potting material, through an aperture formed through the housing and exterior the housing to dissipate heat to exterior of the vehicular component; and
wherein the heat dissipating element comprises a flange that extends at least partially along an interior surface of the housing at or near the aperture, and wherein the flange of the heat dissipating element engages the interior surface of the housing at or near the aperture to seal the aperture formed through the housing.

2. The vehicular component of claim 1, wherein, with the vehicular component disposed at a vehicle, the radar sensor has a field of sensing exterior of the vehicle.

3. The vehicular component of claim 1, wherein the radar-transparent pad comprises a uniformly distributed material.

4. The vehicular component of claim 1, wherein the radar-transparent pad comprises a closed-cell foam.

5. The vehicular component of claim 1, wherein an interior space of the housing is sealed from an external environment.

6. The vehicular component of claim 1, wherein the printed circuit board comprises a non-planar substrate.

7. The vehicular component of claim 6, wherein the non-planar substrate of the printed circuit board includes a bent portion.

8. The vehicular component of claim 1, wherein the printed circuit board includes a first planar substrate connected to a second planar substrate via a flexible connector.

9. The vehicular component of claim 8, wherein the printed circuit board is supported in a bent configuration by structure of the housing.

10. The vehicular component of claim 1, wherein the potting material is poured into the housing from an upper portion of the housing that extends perpendicularly to the printed circuit board.

11. The vehicular component of claim 1, wherein the potting material is poured into the housing from a side portion that extends parallel to at least a portion of the printed circuit board.

12. The vehicular component of claim 1, wherein the vehicular component comprises a vehicular exterior component.

13. The vehicular component of claim 1, wherein the vehicular component comprises a vehicular exterior door handle.

14. The vehicular component of claim 1, wherein the vehicular component comprises a vehicular exterior light assembly.

15. A vehicular component comprising:
a housing;

a printed circuit board accommodated by the housing, the printed circuit board having a processor;

a radar sensor accommodated by the housing;

wherein the radar sensor comprises (i) at least one antenna and (ii) a heat dissipating element thermally conductively connected to the processor;

a sealing material disposed in the housing for blocking moisture and other contaminants;

wherein the sealing material includes a radar-transparent pad disposed between the at least one antenna and the housing;

a potting material at least partially filling the housing, wherein the heat dissipating element passes from within the housing through the potting material, through an aperture formed through the housing and exterior the housing to dissipate heat to exterior of the vehicular component;

wherein the heat dissipating element comprises a flange that extends at least partially along an interior surface of the housing at or near the aperture, and wherein the flange of the heat dissipating element engages the interior surface of the housing at or near the aperture to seal the aperture formed through the housing;

wherein the vehicular component comprises a vehicular exterior light assembly; and wherein, with the vehicular exterior light assembly disposed at a vehicle, the radar sensor has a field of sensing exterior of the vehicle.

16. The vehicular component of claim 15, wherein the radar-transparent pad comprises a closed-cell foam.

17. The vehicular component of claim 15, wherein the printed circuit board comprises a non-planar substrate.

18. The vehicular component of claim 15, wherein the printed circuit board includes a first planar substrate connected to a second planar substrate via a flexible connector.

19. The vehicular component of claim 18, wherein the printed circuit board is supported in a bent configuration by structure of the housing.

20. The vehicular component of claim 15, wherein the potting material is poured into the housing from an upper portion of the housing that extends perpendicularly to the printed circuit board.

21. The vehicular component of claim 15, wherein the potting material is poured into the housing from a side portion that extends parallel to at least a portion of the printed circuit board.

22. The vehicular component of claim 15, wherein the vehicular exterior light assembly comprises a vehicular headlight assembly.

23. The vehicular component of claim 15, wherein the vehicular exterior light assembly comprises a vehicular taillight assembly.

24. The vehicular component of claim 15, wherein the vehicular exterior light assembly is configured to be disposed at a vehicular exterior rearview mirror assembly.

25. A vehicular component comprising:

a housing;

a printed circuit board accommodated by the housing, the printed circuit board having a processor;

a radar sensor accommodated by the housing;

wherein the radar sensor comprises (i) at least one antenna and (ii) a heat dissipating element thermally conductively connected to the processor;

a sealing material disposed in the housing for blocking moisture and other contaminants;

wherein the sealing material includes a radar-transparent pad disposed between the at least one antenna and the housing;

a potting material at least partially filling the housing, wherein the heat dissipating element passes from within the housing through the potting material, through an aperture formed through the housing and exterior the housing to dissipate heat to exterior of the vehicular component;

wherein the heat dissipating element comprises a flange that extends at least partially along an interior surface of the housing at or near the aperture, wherein the flange of the heat dissipating element engages the interior surface of the housing at or near the aperture to seal the aperture formed through the housing;

wherein the vehicular component comprises a vehicular exterior door handle; and wherein, with the vehicular exterior door handle disposed at a vehicle, the radar sensor has a field of sensing exterior of the vehicle.

26. The vehicular component of claim 25, wherein the radar-transparent pad comprises a closed-cell foam.

27. The vehicular component of claim 25, wherein the printed circuit board comprises a non-planar substrate.

28. The vehicular component of claim 25, wherein the printed circuit board includes a first planar substrate connected to a second planar substrate via a flexible connector.

29. The vehicular component of claim 28, wherein the printed circuit board is supported in a bent configuration by structure of the housing.

30. The vehicular component of claim 25, wherein the potting material is poured into the housing from an upper portion of the housing that extends perpendicularly to the printed circuit board.

31. The vehicular component of claim 25, wherein the potting material is poured into the housing from a side portion that extends parallel to at least a portion of the printed circuit board.

* * * * *